(12) United States Patent
Otobe et al.

(10) Patent No.: US 7,990,471 B1
(45) Date of Patent: Aug. 2, 2011

(54) INTERLACED-TO-PROGRESSIVE VIDEO

(75) Inventors: Masanori Otobe, Matsudo (JP); Osamu Koshiba, Ibaraki-ken (JP); Akira Osamoto, Ibaraki-ken (JP)

(73) Assignee: Texas Instruments Incorporated, Dallas, TX (US)

( * ) Notice: Subject to any disclaimer, the term of this patent is extended or adjusted under 35 U.S.C. 154(b) by 1127 days.

(21) Appl. No.: 11/550,100

(22) Filed: Oct. 17, 2006

Related U.S. Application Data

(60) Provisional application No. 60/727,298, filed on Oct. 17, 2005, provisional application No. 60/727,304, filed on Oct. 17, 2005, provisional application No. 60/727,369, filed on Oct. 17, 2005, provisional application No. 60/727,362, filed on Oct. 17, 2005, provisional application No. 60/727,818, filed on Oct. 17, 2005.

(51) Int. Cl.
*H04N 7/01* (2006.01)
*H04N 11/20* (2006.01)

(52) U.S. Cl. .......... 348/448; 348/701; 348/452
(58) Field of Classification Search .......... 348/441–458, 348/699–701; 375/240.16
See application file for complete search history.

(56) References Cited

U.S. PATENT DOCUMENTS

| | | | | |
|---|---|---|---|---|
| 6,630,961 B1 * | 10/2003 | Shin et al. | ...... | 348/448 |
| 6,867,814 B2 * | 3/2005 | Adams et al. | ...... | 348/448 |
| 7,098,957 B2 * | 8/2006 | Kim et al. | ...... | 348/452 |
| 7,113,544 B2 * | 9/2006 | Tanase et al. | ...... | 375/240.16 |
| 7,379,120 B2 * | 5/2008 | Kondo et al. | ...... | 348/448 |
| 2006/0152620 A1 * | 7/2006 | Morita | ...... | 348/448 |

\* cited by examiner

*Primary Examiner* — M. Lee
(74) *Attorney, Agent, or Firm* — Mirna Abyad; Wade J. Brady, III; Frederick J. Telecky, Jr

(57) ABSTRACT

Interlaced-to-progressive conversion with (1) 3-2 pulldown detection, (2) pre-filtering for field motion detection, (3) field motion detection with feedback, (4) field edge detection including direction angle detection by comparison of pixel differences with sets of more than pairs of pixels and a lateral edge detection probability by a lack of non-lateral angle detection, and (5) blending moving pixel interpolation and still pixel interpolation using field uniformity.

3 Claims, 43 Drawing Sheets

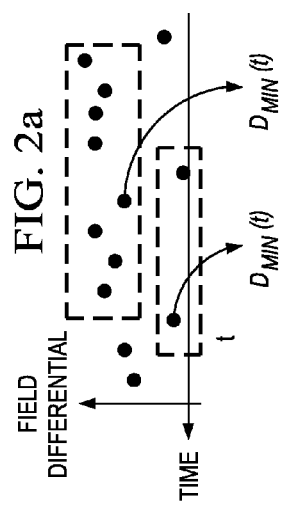
FIG. 2a
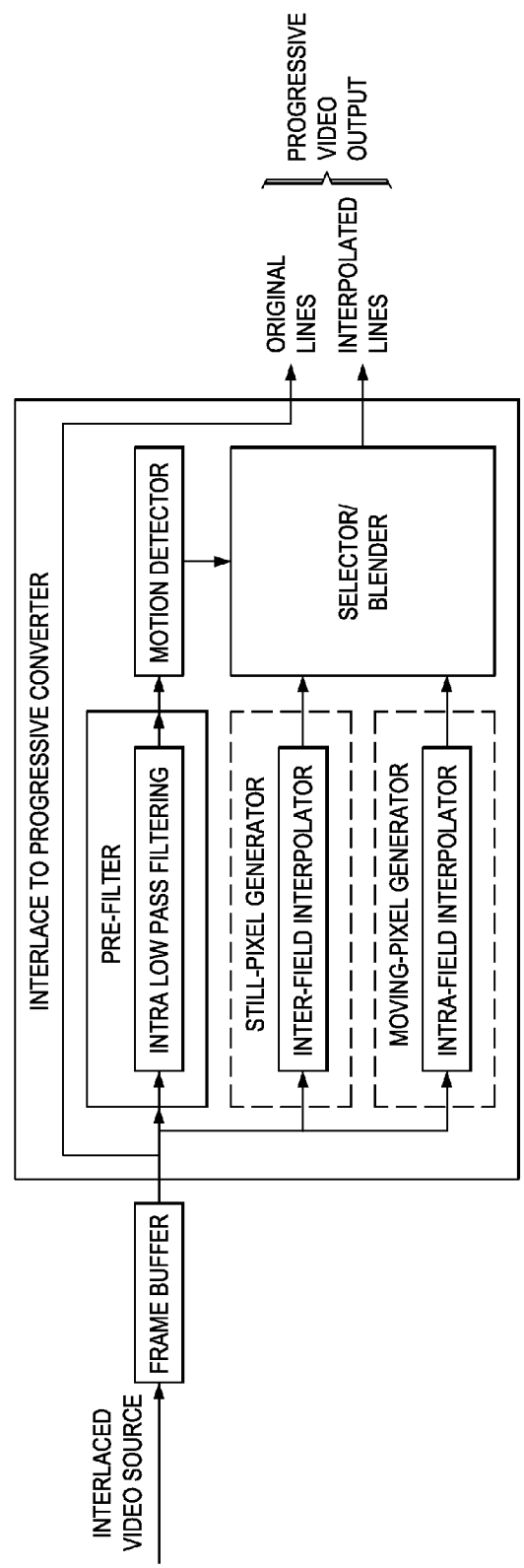
FIG. 2b
FIG. 3a

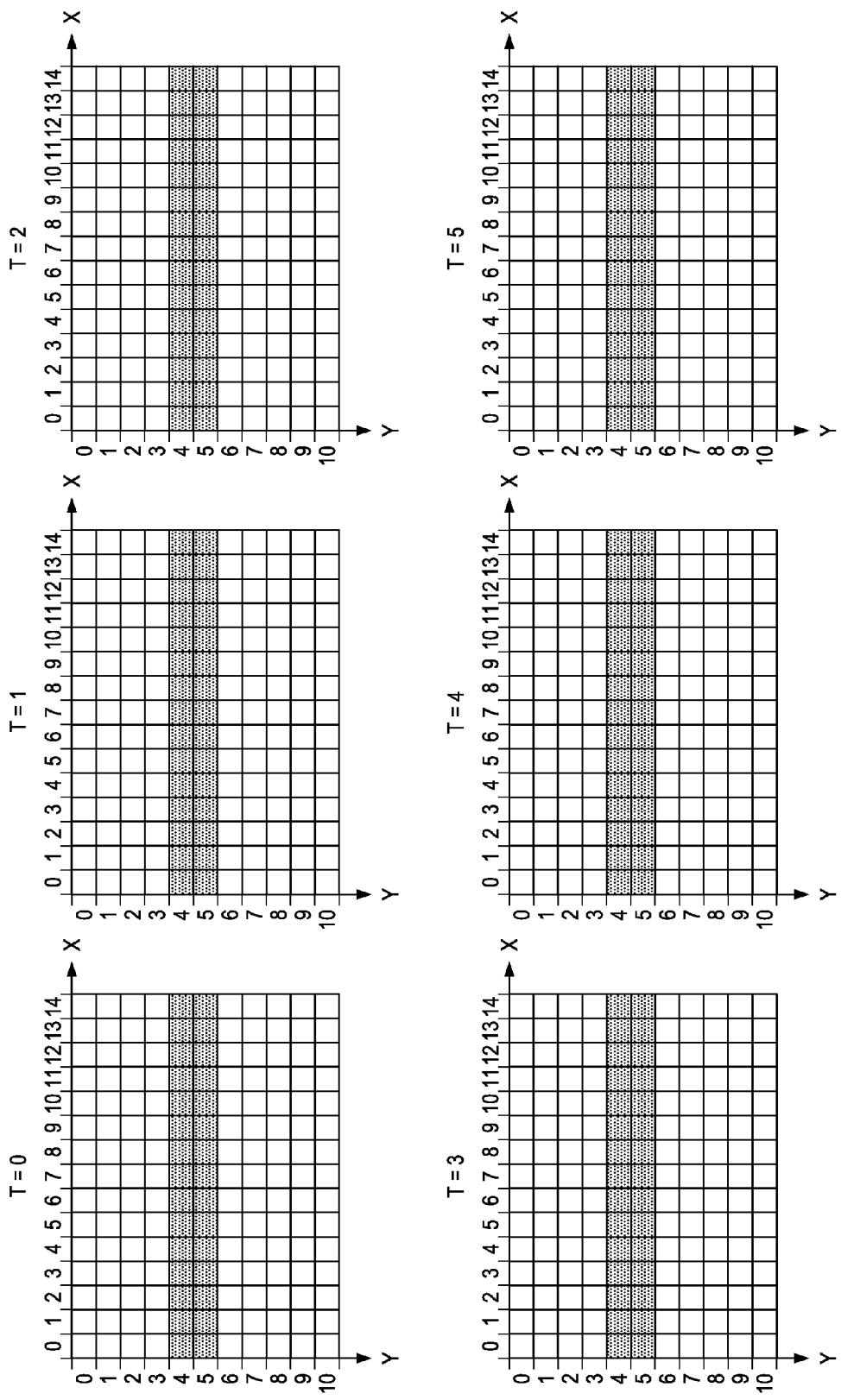

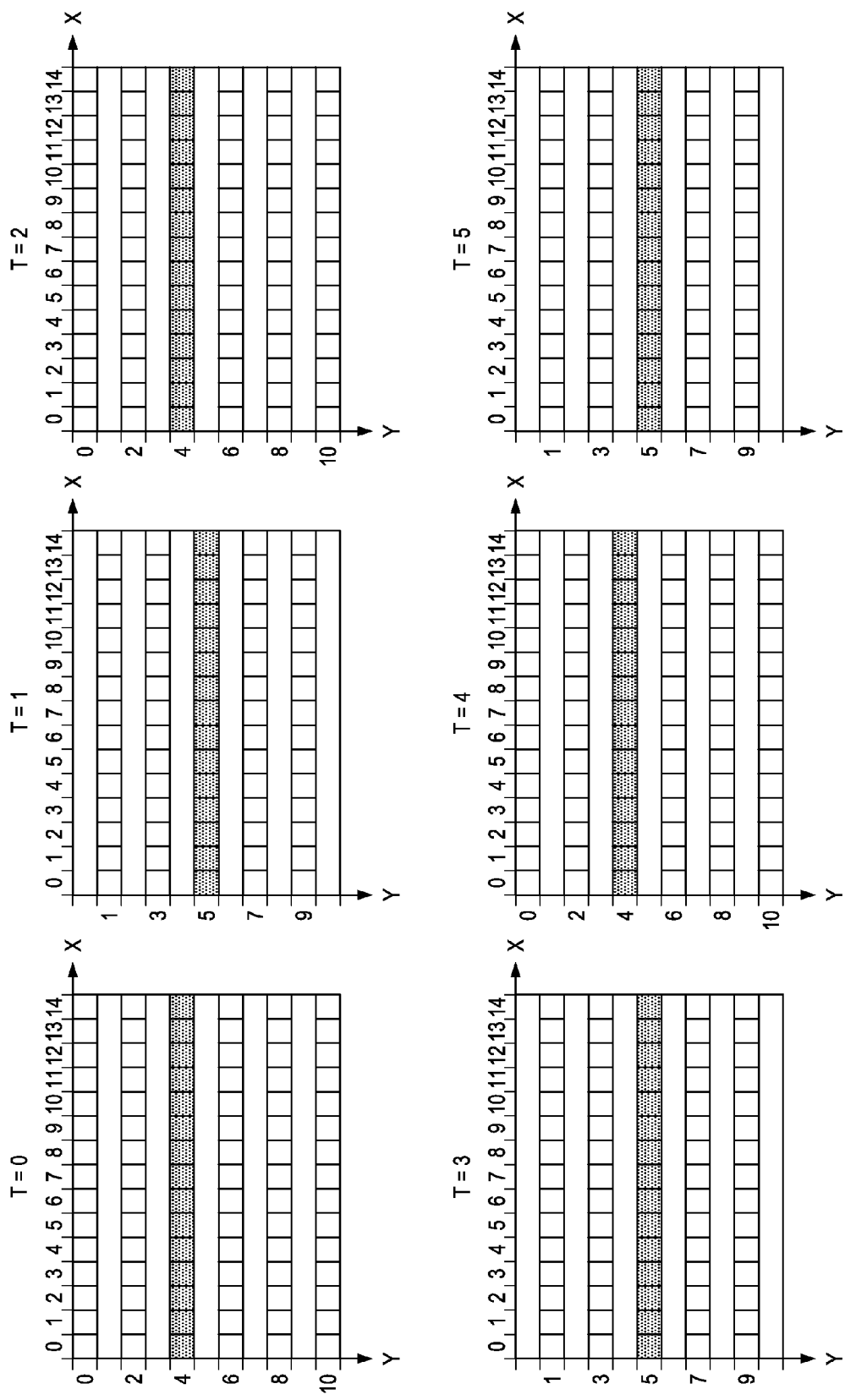

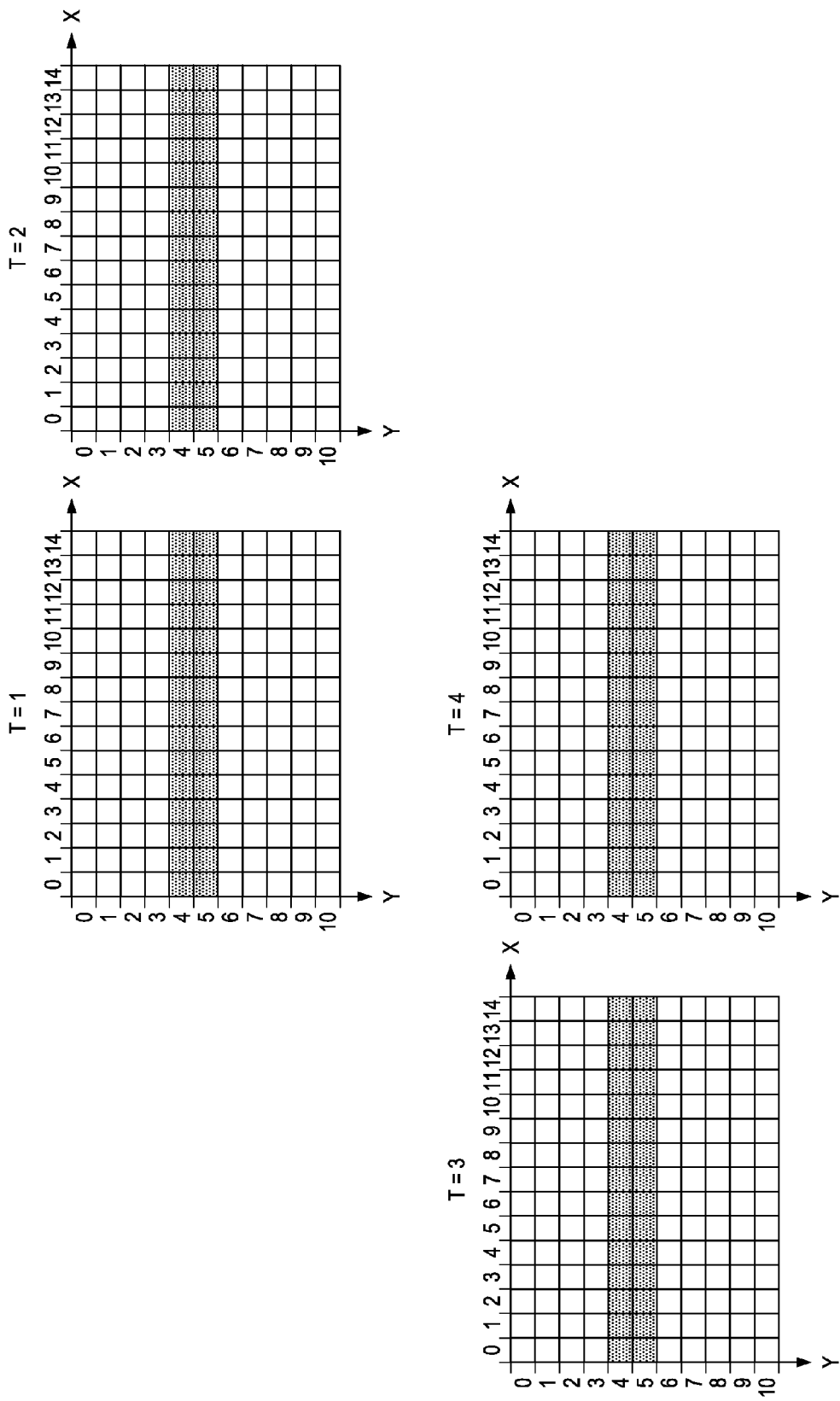

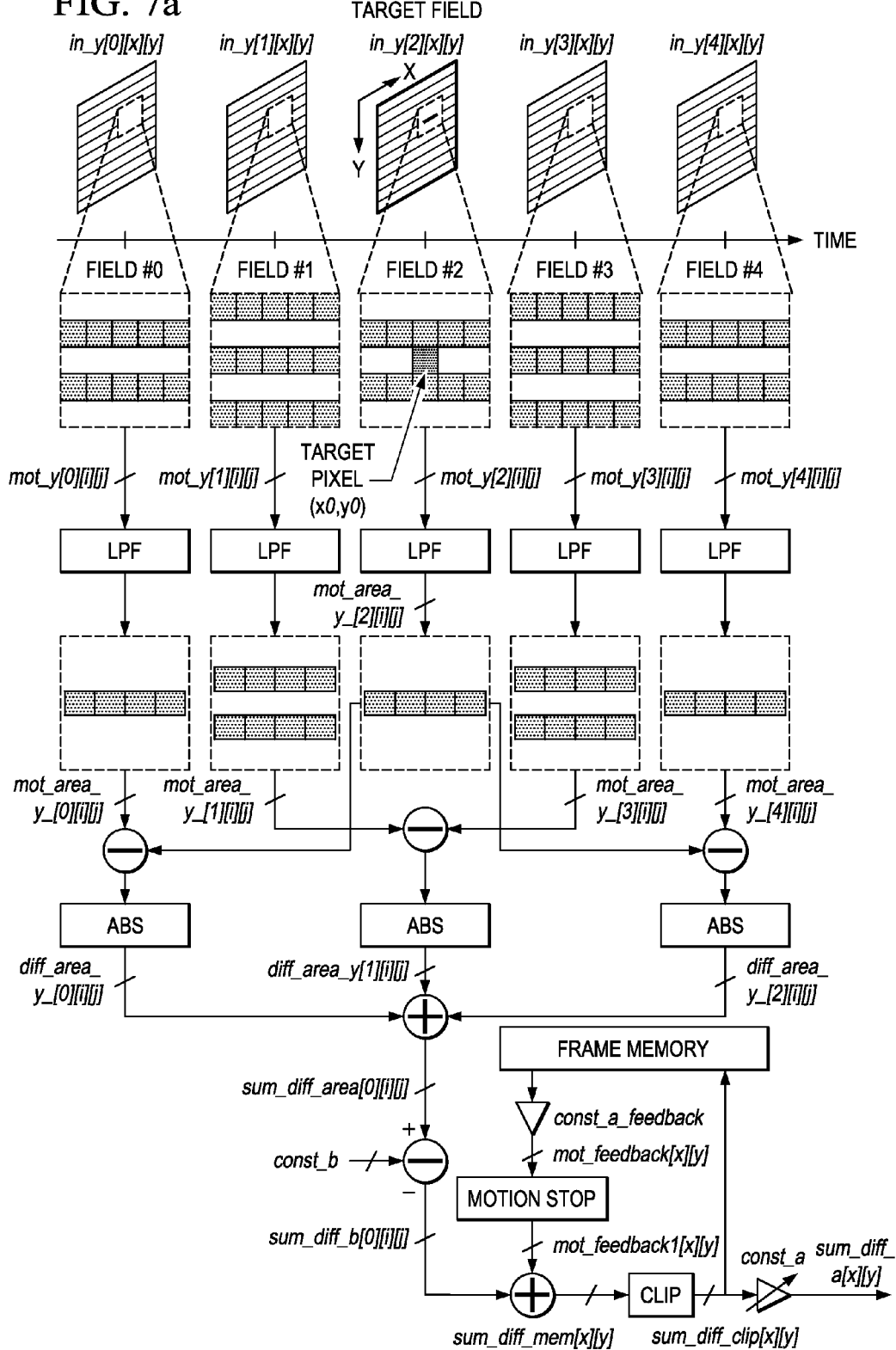

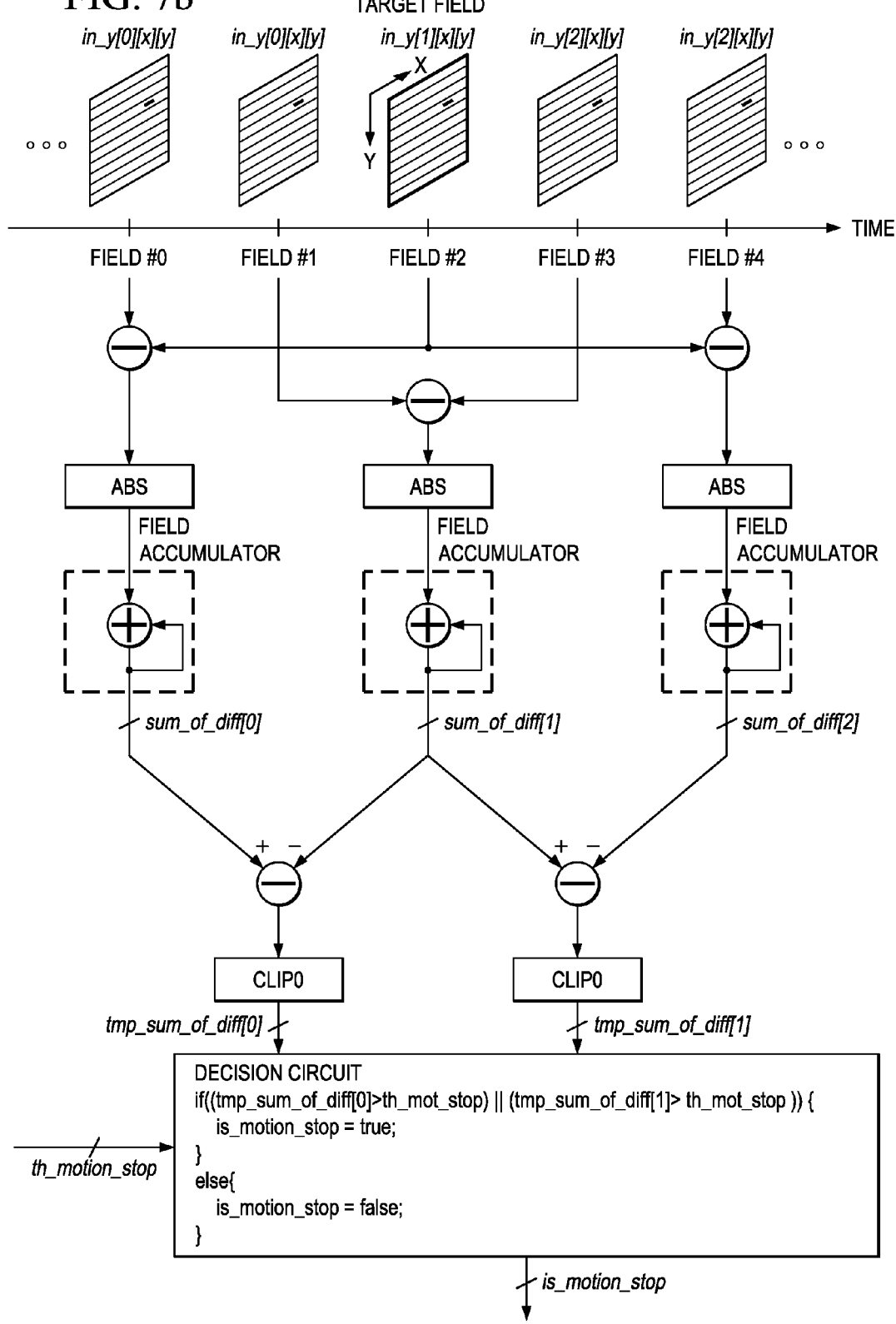

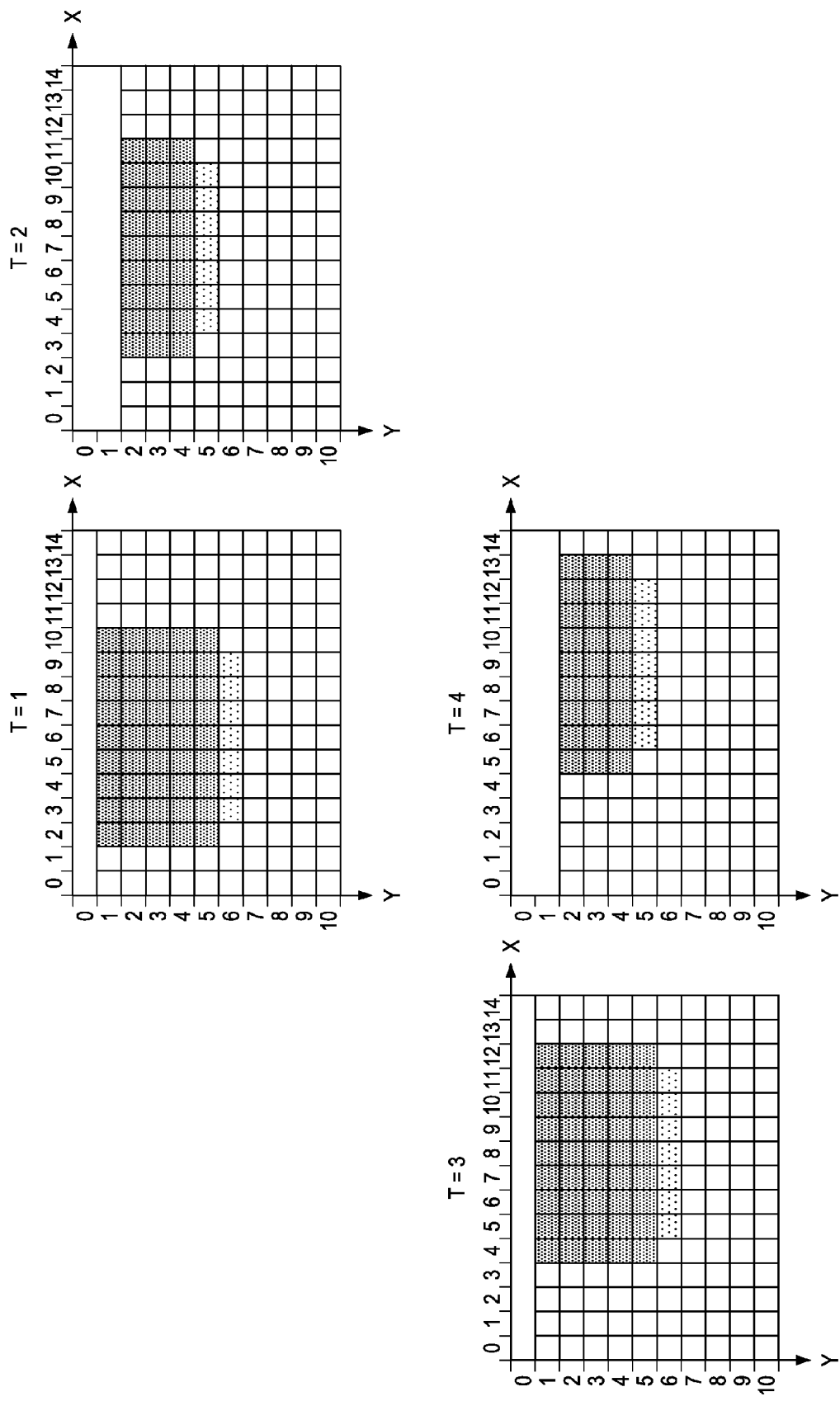

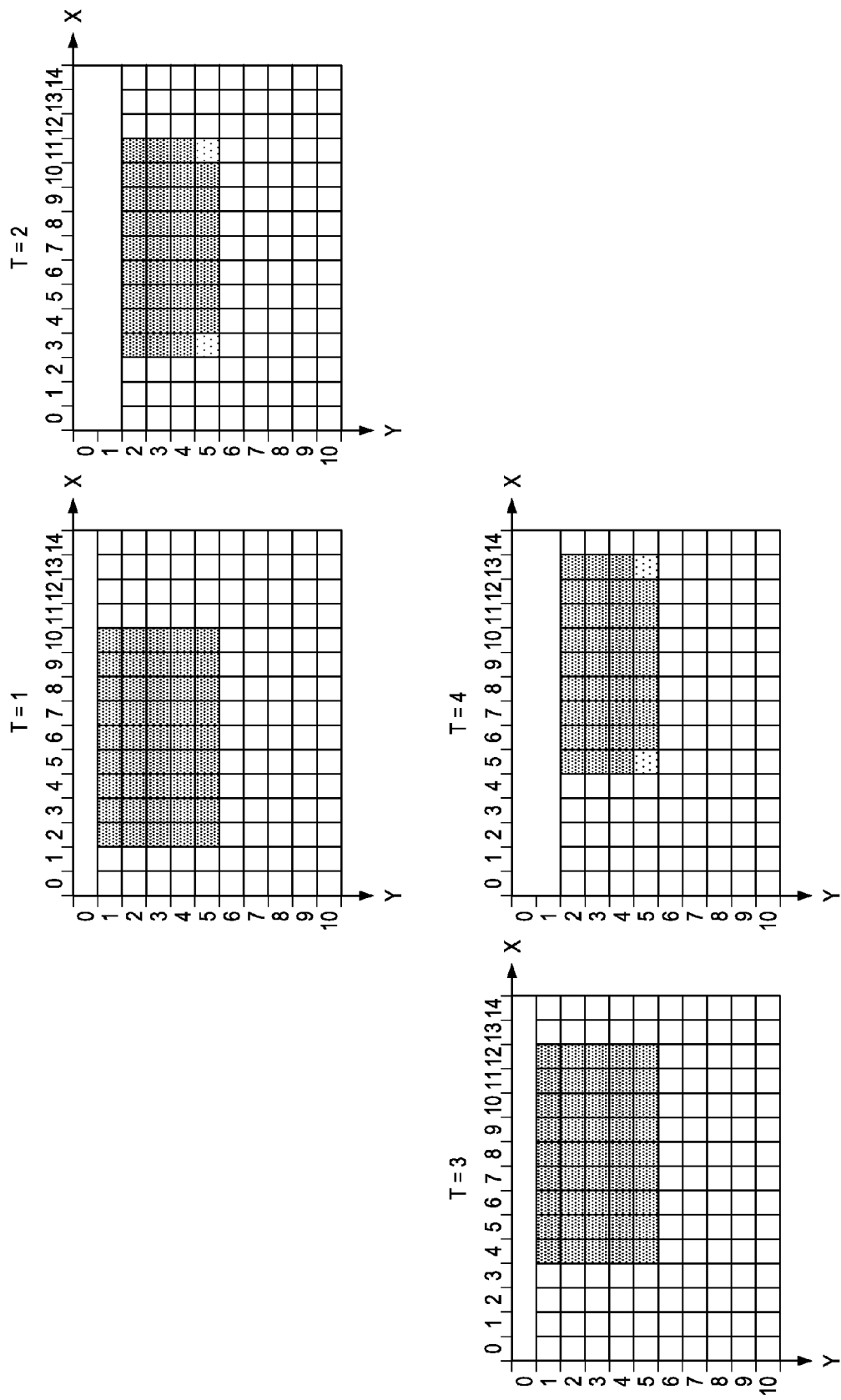

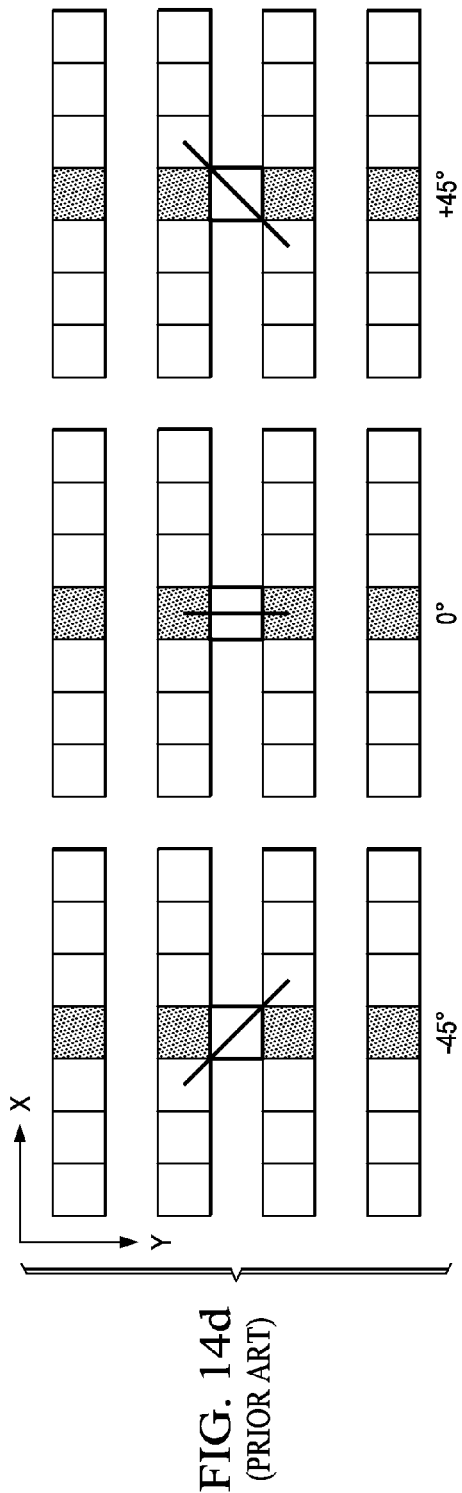
FIG. 14d (PRIOR ART)
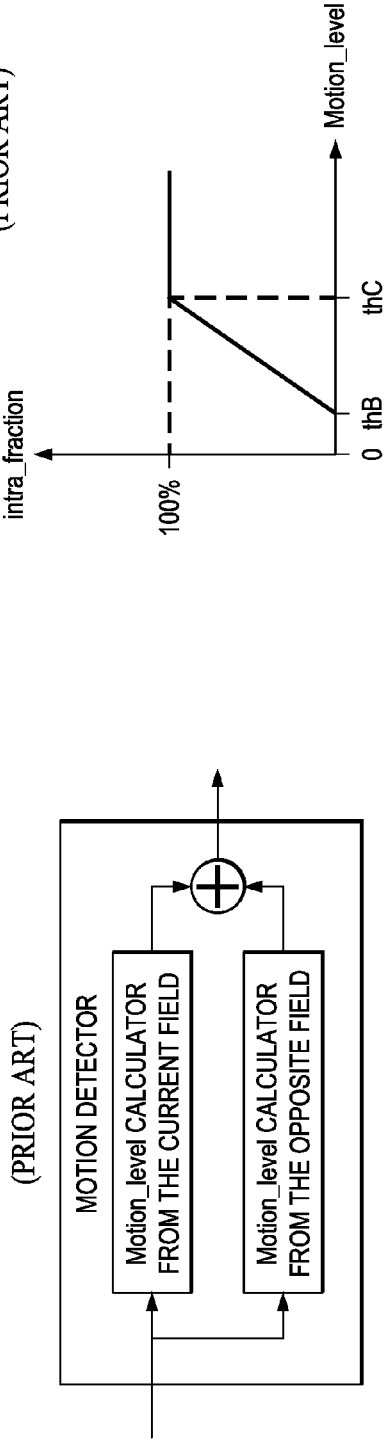
FIG. 14f (PRIOR ART)
FIG. 14e (PRIOR ART)

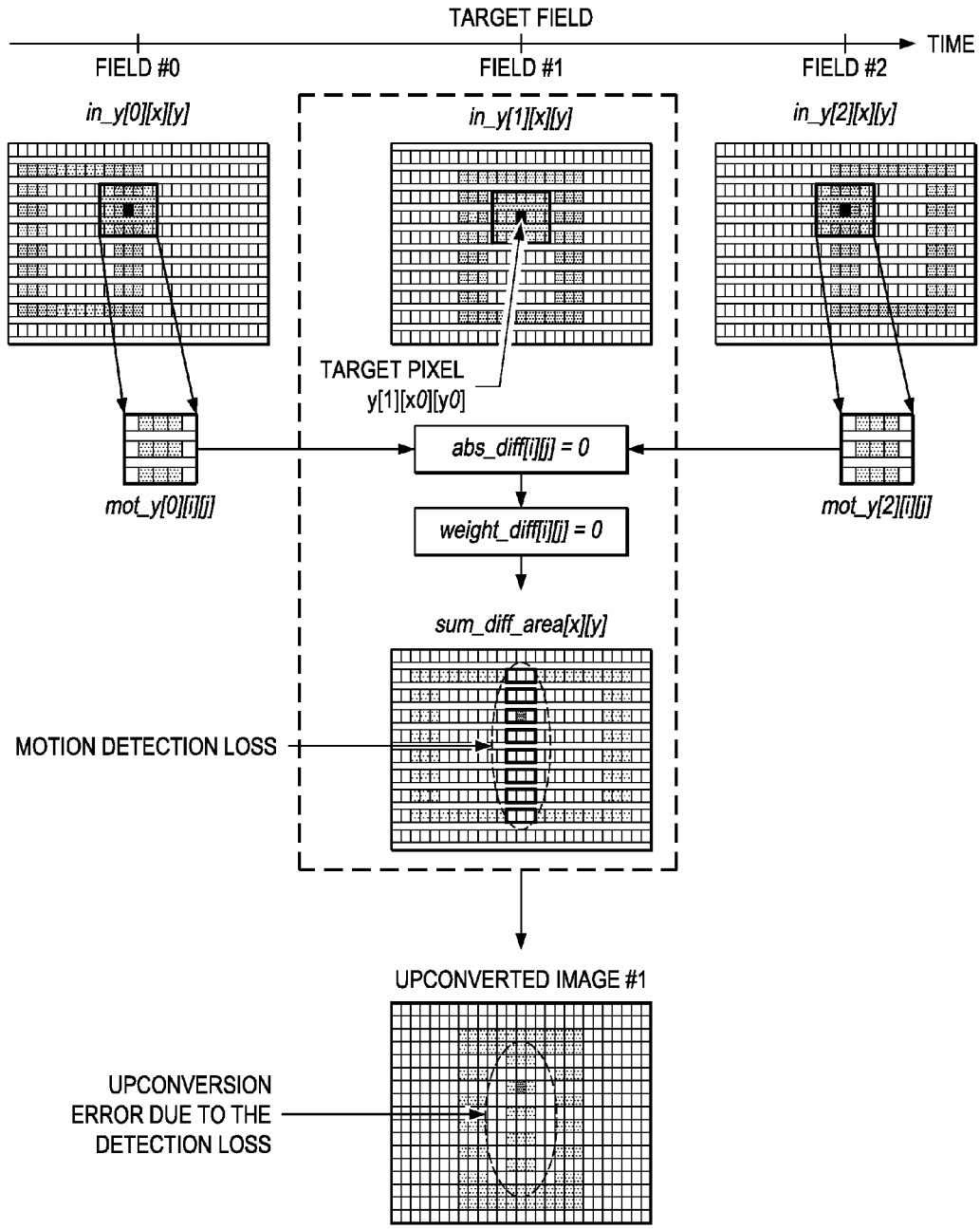

INTERLACED-TO-PROGRESSIVE VIDEO

CROSS-REFERENCE TO RELATED APPLICATIONS

This application claims priority from the following provisional patent applications all filed Oct. 17, 2005: 60/727,298; 60/727,304; 60/727,362; 60/727,369; and 60/727,818.

BACKGROUND OF THE INVENTION

The present invention relates to digital video signal processing, and more particularly to interlace-to-progressive conversion.

For moving picture systems, interlaced video format is widely used to reduce data rate. The interlaced video format is illustrated in FIG. 15a, where t is the time, x horizontal position, and y vertical position. A video signal consists of a sequence of two kinds of fields. One of the two fields contains only lines with even line numbers, i.e., y=even ("Top Field"), and the other field contains those with odd line numbers ("Bottom Field"). For example, NTSC interlaced television sets display 60 fields per second.

FIG. 15b shows a progressive video format, which recent high-quality TV sets use to display video programs. In the progressive format, a frame which contains all of the line data (progressive frame) is displayed at a time. NTSC progressive TV sets display 60 progressive frames per second. Most video programs are broadcast in interlaced format. Then interlace-to-progressive (IP) conversion is required to display the TV program on the progressive TV, i.e., skipped lines in interlaced fields need to be filled in by interpolation.

Interlace-to-progressive conversion appears in various systems as illustrated in FIGS. 16a-16c; and FIG. 14a illustrates an interlace-to-progressive converter. The systems may have digital or analog video input or both, which may be encoded. The system may have digital or analog video output or both. For the system of FIG. 16a the analog input is A/D (analog to digital) converted to get a digital input signal. The digital video input signal is stored in a memory. The stored video signal is sent to the IP converter block. An OSD (on-screen display) block may be placed before or after the IP converter, or the OSD block may be omitted. The input signal may also sent to the IP converter directly. In the IP converter the input signal is digitally processed by a digital circuit or a processor with program code. The digital video output of the IP converter is sent to the outside directly or output as analog video out through a D/A (digital to analog) converter.

The system of FIG. 16b has an encoded video stream (e.g., MPEG2, MPEG4, H.264, et cetera) input which is decoded by the decoder. The decoded video signal is stored in a memory. The stored video signal is sent to the IP converter block. Again, an OSD block may be placed before or after the IP converter, or the OSD block may be omitted. The decoded video data may also sent to the IP converter directly. In the IP converter the input signal is digitally processed by a digital circuit or a processor with program code. The digital video output of the IP converter is sent to the outside directly or output as analog video out through D/A converter.

The system of FIG. 16c has input from any of encoded video, digital, video or analog video. The system has any of digital video, analog video, or encoded video output. The system has both decoder and encoder (e.g., decoder and encoder for MPEG2, MPEG4, H.264, et cetera). The encoded video stream is decoded by the decoder. The decoded video signal is stored in a memory. As in the other systems, the analog input is A/D converted to get digital input signal. The digital input signal is also stored in a memory. The encoder encodes the input video signal and outputs encoded video stream. The stored video signal is sent to the IP converter block. The decoded video data or digital video input signal may also sent to the IP converter directly. An OSD block may be placed before or after the IP converter, or the OSD block may be omitted. In the IP converter the input signal is digitally processed by a digital circuit or a processor with program code. The digital video output of the IP converter is sent to the outside directly or output as analog video out through a D/A converter.

FIG. 14a is a block diagram of a generic motion adaptive IP converter. The converter converts input interlaced video source to progressive video format that contains the original interlaced lines plus interpolated lines. The frame buffer stores several interlaced fields. The motion detector detects moving objects in the input fields pixel-by-pixel. The detector calculates the amount of motion (Motion_level) at every pixel location where the pixel data needs to be interpolated. The more obvious the motion is, the higher Motion_level becomes. The still-pixel and moving-pixel generators interpolate pixels by assuming the pixel being interpolated is a part of a still and moving object, respectively. The selector/blender block selects or blends the outputs of the still-pixel and moving-pixel generators using Motion_level. When Motion_level is low, the output of the still-pixel generator is selected or the blending fraction of the output of the still-pixel generator in the interpolated output data becomes high. The still-pixel generator is realized by the inter-field interpolator. The moving-pixel interpolator consists of the intra-field interpolator and the edge-direction detector. The edge-direction detector detects the direction at the detection pixel in the pattern of an object in the field and outputs the detected direction to the intra-field interpolator. The intra-field interpolator calculates a pixel value using the detected direction, by interpolating pixels along in the detected direction. (Without a direction, the interpolator could simply interpolate using the two closest pixels in the field.) The spatial resolution of the inter-field interpolator is higher than that of the intra-field interpolator. But when an object which includes the pixel being generated by interpolation is moving, i.e., Motion_level is high, the inter-field interpolator causes comb-like artifacts and the output of the intra-field interpolator is selected or the blending fraction of the output of the intra-field interpolator is set as high.

FIG. 14b shows a schematic diagram of an edge-direction detector. The edge-direction detector consists of the "directional index generator" and the "direction determiner". The directional index generator generates index values for various edge angles. The direction determiner chooses the most probable direction using the output of the directional index generator. The directional index generator consists of many index generators: one for the edge angle #0, one for the edge angle #1, and so forth.

FIG. 19a shows an example flow of a traditional motion detection method for interlace-to-progressive up-conversion processing. First, let field#1 be a target field to be up-converted to progressive format, and define two input pixel (luminance) data arrays in the two neighbor opposite fields#0 and #2, in_y[0][x][y] and in_y[2][x][y] where x=0, . . . , IMAGE_SIZE_X−1; y=0, 2, 4, . . . , IMAGE_SIZE_Y−2 (top field) or y=1, 3, 5, . . . , IMAGE_SIZE_Y−1 (bottom field). To each pixel at (x,y) in the target field#1, two two-dimensional M×N pixel arrays, mot_y[0][i][j] and mot_y[2][i][j] (i=

$0, \ldots, M-1; j=0, \ldots, N-1$), around the pixel are extracted from the two neighbor fields of the target field as follows:

mot_y[k][i][j]=in_y[k][x+i−(M−1)/2][y+2j−(N−1)]
($k=0, 2; i=0, 1, \ldots, M-1; j=0, 1, \ldots, N-1$)

Second, compute the M×N array of absolute values of differences, abs_diff[i][j], from the two extracted M×N pixel arrays, mot_y[0][i][j] and mot_y[2][i][j], as follows:

abs_diff[i][j]=|mot_y[0][i][j]−mot_y[2][i][j]|
($i=0, 1, \ldots, M-1; j=0, 1, \ldots, N-1$)

Third, each resultant absolute difference value in M×N array abs_diff[i][j] is multiplied by a weight factor weight_factor[i][j] at each pixel with the weight factor based on spatial distance from the target pixel:

weight_diff[i][j]=abs_diff[i][j]×weight_factor[i][j]
($i=0, \ldots, M-1, j=0, \ldots, N-1$)

Note that typically the sum of the weight factors is taken to equal 1 and thereby normalize for the size of the M×N array.

Finally, the elements of the weighted M×N array are added together and a representative value sum_diff_area[x][y] is output as a degree of motion of the target pixel for motion detection processing:

$$\text{sum\_diff\_area}[x][y] = \sum_{i=0}^{M} \sum_{j=0}^{N} \text{weight\_diff}[i][j]$$

($x=0, \ldots$, IMAGE_SIZE_X−1, $y=0,2,4, \ldots$, IMAGE_SIZE_Y−2) or ($x=0, \ldots$, IMAGE_SIZE_X−1, $y=1,3,5, \ldots$, IMAGE_SIZE_Y−1)

The value sum_diff_area[x][y] is used in a decision circuit for interpolation processing. If the value sum_diff_area[x][y] is low, the state of the target pixel at (x,y) is taken to be "still" and the pixel y'[x][y] is produced using temporal interpolation of the two pixels at the same position as the target pixel at (x,y) in field#0 and field#2. For example, $$y'[1][x][y] = \frac{\text{in\_y}[0][x][y] + \text{in\_y}[2][x][y]}{2}$$

And if the value sum_diff_area[x][y] is high, the state of the target pixel at (x,y) is estimated as "moving", and the pixel is interpolated spatially using only the neighbor pixels in the same field. For example, $$y'[1][x][y] = \frac{\text{in\_y}[1][x][y-1] + \text{in\_y}[1][x][y+1]}{2}$$

For pixel values in the range of 0 to 255, a typical decision would be sum_diff_area[x][y]≦50 indicates the state of (x,y) is still and sum_diff_area[x][y]>50 indicates the state of (x,y) is moving.

This basic strategy for interpolation method decision leads to a progressive format image prog_y[x][y] as follows:

prog_y[1][x][y] =
$$\begin{cases} \text{in\_y}[1][x][y] & (y = 0, 2, 4, \ldots, \text{IMAGE\_SIZE\_Y} - 2) \\ y'[1][x][y] & (y = 1, 3, 5, \ldots, \text{IMAGE\_SIZE\_Y} - 1) \end{cases}$$

or prog_y[1][x][y] =
$$\begin{cases} \text{in\_y}[1][x][y] & (y = 1, 3, 5, \ldots, \text{IMAGE\_SIZE\_Y} - 1) \\ y'[1][x][y] & (y = 0, 2, 4, \ldots, \text{IMAGE\_SIZE\_Y} - 2) \end{cases}$$

($x = 0, \ldots$, IMAGE_SIZE_X − 1)

This traditional motion detection scheme has the following weak points:
1) A simple expansion of this method for more accurate motion detection consumes memory work space for field buffering, its access bandwidth on the memory bus and computation load for calculating the motion degree is proportional to the number of fields to be stored.
2) It is difficult to detect especially fast motion and periodic motion in interlaced image sequences.

FIG. 19b shows a typical interlaced image sequence which causes motion detection loss as described in 2). In this example sequence, a rectangular box is moving at a constant speed from left side to right side. Let the value of white pixels in all fields be 255, and that of black pixels be 0. And let the size of the extracted arrays be M=5, N=3. Under these conditions, the degree of motion of a pixel (x0,y0) at the center of target field#1 using above traditional detection method is considered. First, the two two-dimensional M×N pixel arrays mot_y[0][i][j] and mot_y[2][i][j] ($i=0, \ldots, 4; j=0, 1, 2$) are extracted as follows:

$$\text{mot\_y}[0][i][j] = \begin{cases} 255 & (i = 0, 4) \\ 0 & (\text{otherwise}) \end{cases} (j = 0, \ldots, 2)$$

$$\text{mot\_y}[2][i][j] = \begin{cases} 255 & (i = 0, 4) \\ 0 & (\text{otherwise}) \end{cases} (j = 0, \ldots, 2)$$

Note that left side of the rectangular box in field#0 and right side of the rectangular box in field#2 overlap each other at this target pixel (x0,y0). Therefore, all absolute values of difference between two sets of the extracted M×N pixel array abs_diff[i][j], are zero:

abs_diff[i][j]=|mot_y[0][i][j]−mot_y[2][i][j]|=
$0 (i=0, \ldots, 4, j=0, \ldots, 2)$ Hence, the weighted absolute difference value weight_diff[i][j] and the sum of difference value sum_diff_area[x0][y0] also result in all zeroes:

weight_diff[i][j] = abs_diff[i][j] × weight_factor[i][j] = 0

($i = 0, \ldots, 4, j = 0, \ldots, 2$)

$$\text{sum\_diff\_area}[x0][y0] = \sum_{i=0}^{4} \sum_{j=0}^{2} \text{weight\_diff}[i][j] = 0$$

As a result that the degree of motion at (x0,y0), sum_diff_area[x0][y0], is zero, and the target pixel is treated as "still" and interpolated using temporal interpolation as follows:

$$y'[1][x0][y0] = \frac{\text{in\_y}[0][x0][y0] + \text{in\_y}[2][x0][y0]}{2} = \frac{255 + 255}{2} = 255$$

Thus, in this example sequence, the interlace-to-progressive processing with the traditional motion detection method causes noticeable noise at the center of the up-converted progressive image.

Theater movies (film) provide 24 progressive format frames per second, and the 3-2 pulldown process illustrated in FIG. 18a converts such a sequence of progressive format frames into a sequence of interlaced format fields with a field rate of 60 fields per second. Note that some fields are repeated, and that the overall process is periodic with a period of four progressive frames and ten fields (five top fields including one repetition and five bottom fields with one repetition). And precise detection of whether a received interlace format field sequence was originally generated as a 3-2 pulldown sequence can have great beneficial effect in the quality of several kinds of subsequent video processing of the field sequence, including IP conversion and video compression.

Note that 3-2 pulldown sequences have a repeated field every five fields; therefore 3-2 pulldown sequences can be detected by detecting this regular pattern (called a 3-2 pattern hereinafter). There are, however, several difficulties in accurate detection of the 3-2 pattern in actual environments:

Difficulty #1: Some sequences may have small parts of image segments with different formats within them. A typical example is a 3-2 pulldown film material that is overlaid by a 60-interlace-fields-per-second telop for subtitles. Thus the major portion of each of the images is 3-2 pulldown, so very small field differences appear once every five fields. Handling them as a 3-2 pulldown sequence, however, will result in undesirable quality, especially at the part with the different format.

Difficulty #2: The 3-2 pattern becomes unclear when a 3-2 pulldown sequence is compressed by a lossy compression method such as MPEG for transmission and/or storage. Transmission noise is also the source of noise if the transmission is performed in analog format.

Difficulty #3: The 3-2 pattern disappears in case of still sequences.

Difficulty #4: The 3-2 pattern becomes subtle if the area of moving objects is relatively small compared to the whole image area, (e.g., ~1% of an image is moving objects).

FIG. 18b shows the block diagram of a typical 3-2 pulldown detector. It compares field differences directly to detect the timing when the (local) minimal difference arrives, then detects the 3-2 pattern by using the result. This can detect well-ordered sequences, but it does not provide any solution to the difficulties listed above.

However, known methods for IP conversion still need improvement.

A general background discussion of interlace-to-progressive methods appears in de Haan et al, Deinterlacing-An Overview, 86 Proceedings of the IEEE 1839 (Sep. 1998).

SUMMARY OF THE INVENTION

The present invention provides multiple IP methods such as: 3-2 pulldown, pre-filtering for field motion detection, field motion detection with feedback, field edge detection with differences of upper and lower multi-pixel patterns plus a lateral edge indicator using the non-lateral edge detections, and blending moving pixel and still pixel interpolations using field uniformity.

BRIEF DESCRIPTION OF THE DRAWINGS

FIGS. 2a-2b interpret example data.

FIGS. 3a-3b illustrate a preferred embodiment interlace-to-progressive converter.

FIGS. 5a-5d are an example.

FIGS. 7a-7b show video coding functional blocks.

FIGS. 8a-8j illustrate a preferred embodiment edge detection.

FIGS. 10a-10d show successive frames and fields of an example.

FIGS. 11a-11b illustrate the example with a preferred embodiment method applied.

FIGS. 14a-14f show a generic interlace-to-progressive converter with edge detection and blending.

FIGS. 19a-19b show prior art motion detection and an example.

DESCRIPTION OF THE PREFERRED EMBODIMENTS

1. Overview

Preferred embodiment interlaced-to-progressive video processing methods include 3-2 pulldown detection, pre-filtering prior to field motion detection, field motion detection with feedback, field edge detection for moving pixel interpolation, and blending moving and still pixel interpolations considering field uniformity.

Figure 17A:
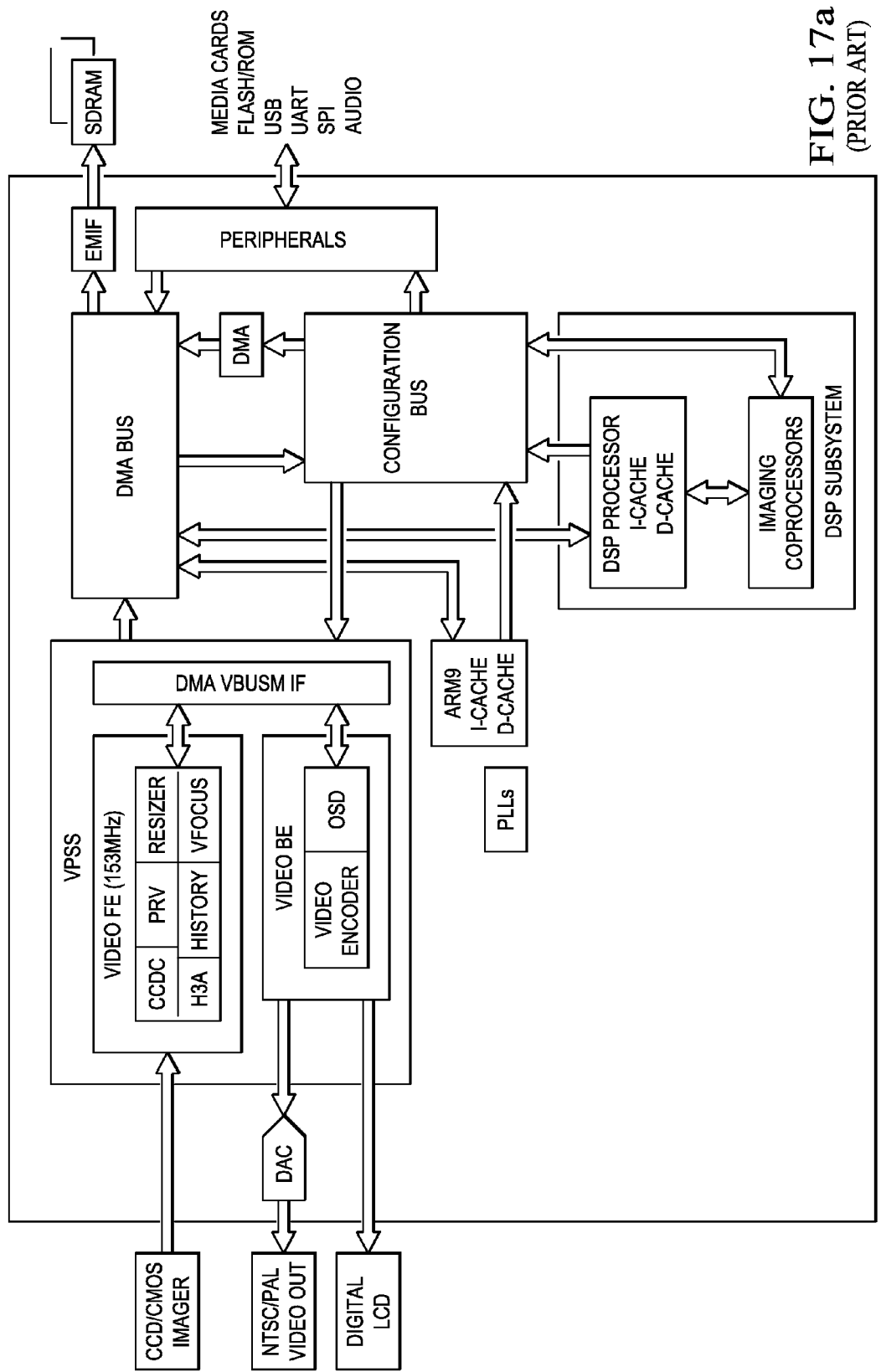
FIGS. 17a-17b illustrate a processor and network communication.
Figure 17B:
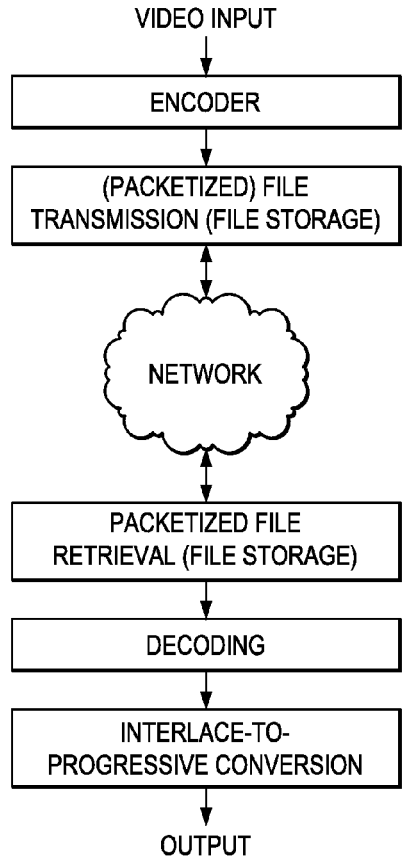

Preferred embodiment systems such as digital TV, DVD players, DVD recorders, cellphones, PDAs, notebook computers, etc., perform preferred embodiment methods with any of several types of hardware: digital signal processors (DSPs), general purpose programmable processors, application specific circuits, or systems on a chip (SoC) such as combinations of a DSP and a RISC processor together with various specialized programmable accelerators such as illustrated in the processor of FIG. 17a. A stored program in an onboard or external (flash EEP) ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet as illustrated in FIG. 17b.

2A. Detection of 3-2 Pulldown

Figure 1A:
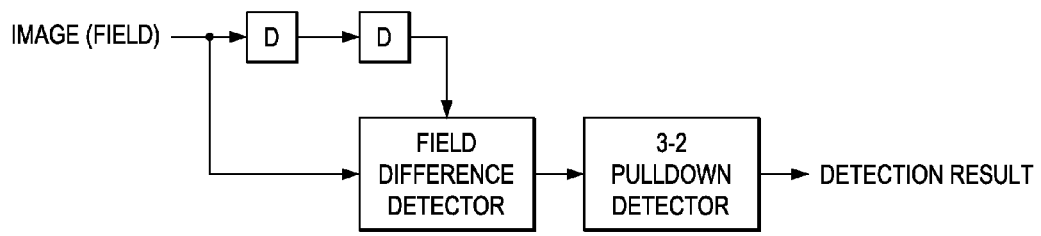
FIGS. 1a-1c illustrate a preferred embodiment 3-2 pulldown detection method.

FIG. 1a illustrates a first preferred embodiment 3-2 pulldown detection method consisting of two parts: a field difference detector and a 3-2 pulldown detector; these two detectors are described in the following.

(a) Field Difference Detector

Figure 1B:
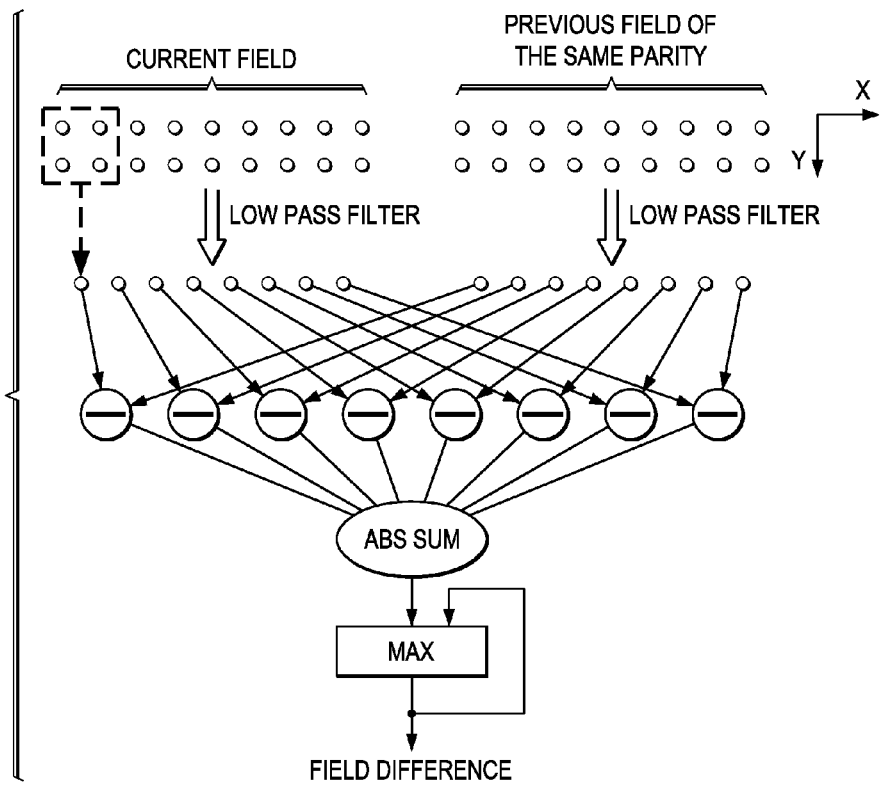

FIG. 1b shows the field difference detector. The field difference detector determines a representative value, which is used as a field difference by the following 3-2 pulldown detector, from two consecutive fields of the same parity (two successive top fields or two successive bottom fields). It is designed such that it can deal with Difficulties #1, #2 and #4.

The field difference detector operates as follows. Let I(t, x, y) be the luminance value at spatial coordinate (x, y) and time t. First perform low-pass filtering to cope with noisy input (Difficulty #2). This filtering increases the accuracy of the detection. The first preferred embodiment uses a simple 2×2 averaging filter to get the filtered image, Î(t, x, y):

$$\hat{I}(t, x, y) = \Sigma_{(u,v) \in B_{LPF}} I(t, x+u, y+v) / |B_{LPF}|$$

where $B_{LPF} = \{(i,j) | 0 \leq i, j \leq 1\}$ is the block of points for the averaging neighborhood, and $|B_{LPF}|$ is the number of elements of $B_{LPF}$; namely, 4.

For each pixel location, the neighborhood sum of absolute differences of the filtered images, d(t, x, y), is derived as follows with $B_{diff} = \{(i,0) | -4 \leq i \leq 3\}$ (this neighborhood is defined as a horizontal strip to ease hardware implementation but other small neighborhoods also work):

$$d(t,x,y) = \Sigma_{(u,v) \in B_{diff}} |\hat{I}(t, x+u, y+v) - \hat{I}(t-2, x+u, y+v)|$$

The maximum value of d(t, x, y) over the image, denoted D(t), is used as the representative field difference:

$$D(t) = \max_{(x,y)} d(t,x,y)$$

For example, if the luminance pixels in the fields at t and t−2 are all approximately the same except in a small region (e.g., an 8×1 pixel strip) where the difference averages 50, then D(t) will equal 8×50; whereas, the average difference over all pixels is close to 0. Thus using the maximum value of d(t, x, y) for the field difference instead of the sum or average of absolute differences over all pixels of the fields helps for Difficulties #1 and #4.

Figure 18A:
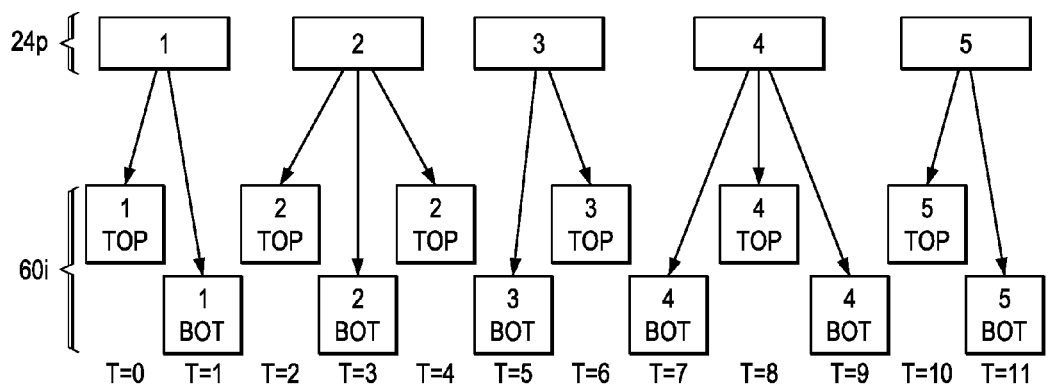
FIGS. 18a-18b show 3-2 pulldown and a known detector.
Figure 18B:
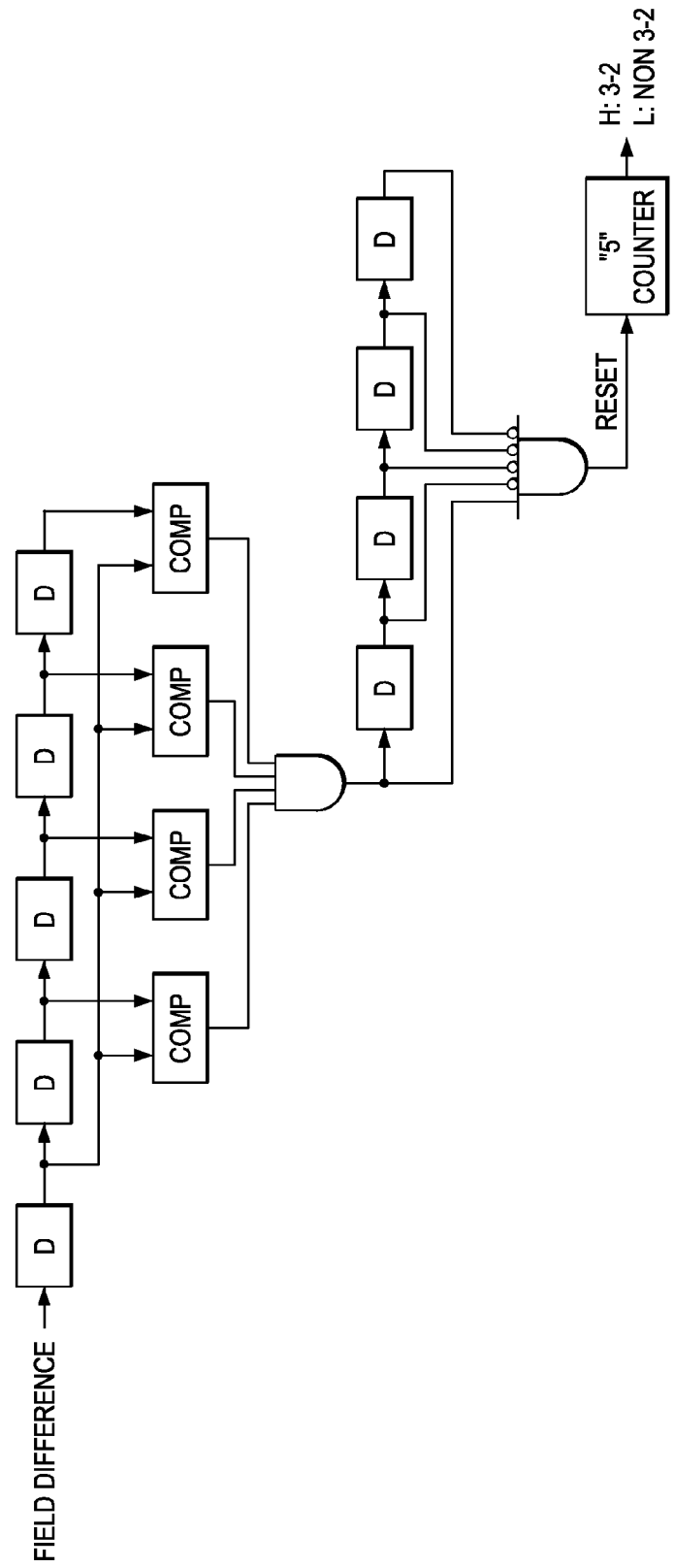

Note that for an original sequence of progressive frames containing motion, the fields of the 3-2 pulldown sequence as illustrated in FIG. 18a (numbered left-to-right starting with t=0 for the "1 top" field at the left and continuing through t=11 for the "5 bot" field at the right), would have D(0), D(1), D(2), D(3) all large, D(4)≈0 (fields at t=4 and t=2 are both "2 top"), D(5), D(6), D(7), D(8) all large, D(9)≈0 (fields at t=9 and t=7 are both "4 bot"), D(10), D(11), . . . , all large; and so forth with periodicity of 5. In contrast, if the input sequence of fields is not a 3-2 pulldown and there is motion in the scene, then all D(t) will be large. Similarly, if there is no motion in the scene, then all D(t) will be small, for both 3-2 pulldown and non-3-2 pulldown field sequences.

(b) 3-2 Pulldown Detector

Figure 1C:
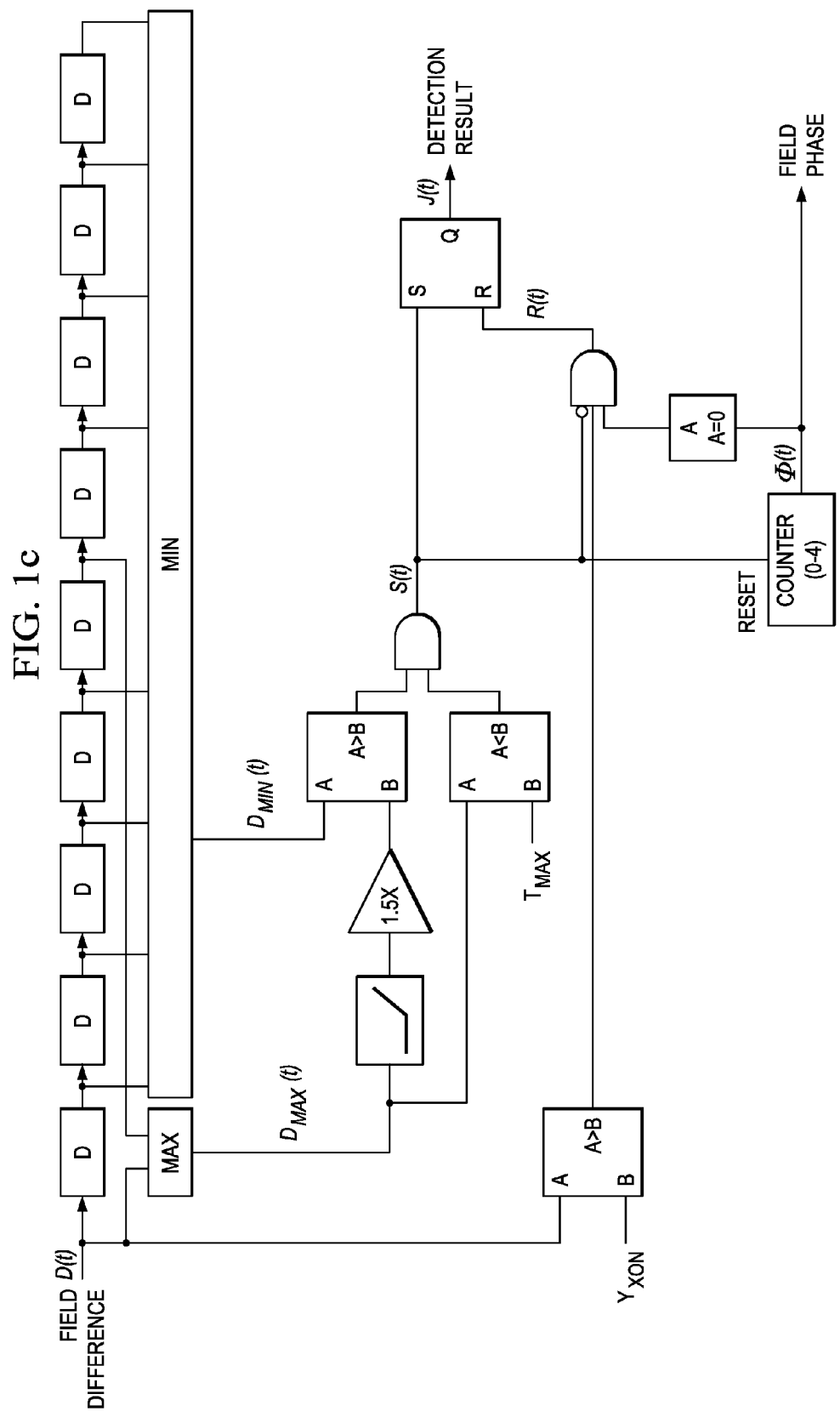

FIG. 1c shows the 3-2 pulldown detector which detects the 3-2 pattern from the field difference values D(t) provided by the preceding field difference detector. It is designed to deal with Difficulties #2 and #3. The 3-2 pulldown detector outputs for field t, J(t) and φ(t), indicate whether the field is part of a 3-2 pulldown sequence (if J(t)=1) and if so its phase (φ(t)).

The values for thresholds and coefficients in the following example work for 8-bit luminance input values; i.e., with I(t, x, y) in the range 0 to 255.

First, for an input field difference, D(t), determine the maximum value, $D_{max}(t)$, among the preceding field differences that must be small if the current input field is a repeated field:

$$D_{max}(t) = \max \{D(t-i) | i = 0, 5\}$$

Thus both the top field repeat and the bottom field repeat are needed.

Also determine the minimum value, $D_{min}(t)$, among preceding field differences that must be large if the current input field is a repeated field in a 3-2 pulldown sequence of images with motion (all fields look like repeats if there is no motion):

$$D_{min}(t) = \min \{D(t-i) | 1 \leq i \leq 9, i \neq 5\}$$

FIGS. 2a-2b illustrate typical field difference data and interpret the variables $D_{max}(t)$ and $D_{min}(t)$ during operation of the 3-2 pulldown detector. Indeed, when the current field is a repeated field, then $D_{max}(t)$ becomes very small (rectangular box near horizontal axis containing D(t) and D(t−5) in FIG. 2a) while $D_{min}(t)$ becomes large (rectangular box away from horizontal axis containing D(t−1), D(t−2), D(t−3), D(t−4), D(t−6), D(t−7), D(t−8), and D(t−9) in FIG. 2a). The two particular D(t-j)s determining $D_{max}(t)$ and $D_{min}(t)$ are shown by arrows in FIG. 2a. Conversely, when the current field is not a repeated field, then $D_{max}(t)$ becomes large (D(t) and D(t−5) in two small boxes in FIG. 2b) and $D_{min}(t)$ becomes small (rectangular box extending down to the horizontal axis and containing D(t−1), . . . , D(t−9) in FIG. 2b). Note that FIG. 2b depicts the same data as in FIG. 2a but one field earlier; and again the two particular D(t-j)s determining $D_{max}(t)$ and $D_{min}(t)$ are shown by arrows in FIG. 2b.

The preferred embodiment methods define the repeated-field detection variable, S(t), by the expression:

$$S(t) = (\alpha_{max} \max\{D_{max}(t), T_{min}\} < D_{min}(t))^{\hat{}}(D_{max}(t) < T_{max})$$

where $T_{max}$ is a threshold (=8×64), $T_{min}$ is another threshold (=8×4), and $\alpha_{max}$ is a safety coefficient (=1.5). That is, S(t)=1 and indicates field t is a repeated field if both $\alpha_{max} \max\{D_{max}(t), T_{min}\} < D_{min}(t)$ and $D_{max}(t) < T_{max}$; otherwise S(t)=0.

$T_{max}$ is used to avoid false detection as a repeated field for fields that belong to completely non 3-2 pulldown sequences where all D(t) are likely to be large. $D_{max}(t)$ small requires both of the field differences D(t) and D(t−5) be small.

Analogously, $\alpha_{max}$=1.5 is used to avoid false detection as a 3-2 pulldown repeated field for very noisy input (Difficulty #2). Noisy input increases all of the D(t) and may make $D_{min}(t)$ appear large as if field t were a repeated field in a 3-2 pulldown sequence; so require $D_{min}(t)$ to be relatively large compared to the noise-increased $D_{max}(t)$ by requiring $\alpha_{max} D_{max}(t) < D_{min}(t)$ for a repeated field detection. Indeed, when a 3-2 pattern is very noisy, the pattern is likely not detected and $\alpha_{max}$ cannot help; whereas, if $\alpha_{max}$ is small, a non 3-2 pattern might be detected as a 3-2 pattern because there is a possibility that a non 3-2 pattern has smaller D(t) values at t=0, 5 by chance, so $\alpha_{max}$=1.5 helps avoid this; and lastly, with $\alpha_{max}$ small a noisy 3-2 pattern might be detected with the wrong phase, so $\alpha_{max}$=1.5 helps avoid this.

$T_{min}$ helps $\alpha_{max}$ to work correctly in the case of very small $D_{max}(t)$ by also requiring $\alpha_{max} T_{min} < D_{min}(t)$ for a repeated field detection.

The 3-2 pulldown field phase, φ(t), which indicates a field's offset from the presumed repeated fields, can simply count the number of fields after the latest detection of a repeated field:

$$\phi(t) = 0 \text{ if } S(t) = 1 \text{ or } \phi(t-1) = 4 = \phi(t-1) + 1 \text{ otherwise}$$

The φ(t−1)=4 alternative maintains the proper phase even if S(t)=0.

If a repeated field is not detected (i.e., S(t)=0) where it should be (i.e., φ(t) =0), the sequence can no longer be considered as a 3-2 pulldown sequence. Therefore, an anti-3-2 pulldown signal, R(t), is defined by the following expression:

$$R(t) = (S(t)=0)^{\hat{}}(\phi(t)=0)^{\hat{}}(D(t) > T_{still})$$

where $T_{still}$ is a threshold (=8×24). That is R(t)=1 when S(t)=0 (indicates is not a repeat) and φ(t)=0 (should be a repeat)

together with $D(t)>T_{still}$ (there is motion in the scene); otherwise $R(t)=0$. And $R(t)=1$ indicates that the sequence is not a 3-2 pulldown sequence.

The threshold $T_{still}$ deters an $R(t)=1$ decision that the sequence is not a 3-2 pulldown sequence when $S(t)=0$ is not accurate. Indeed, if t is a repeated field, then $D(t)<T_{still}$ which prevents $R(t)=1$ even if $D_{min}(t)$ is small and makes $S(t)=0$; for example, a still scene in a 3-2 pulldown sequence.

The final 3-2 pulldown detection result, $J(t)$, is calculated as follows:

| | |
|---|---|
| $J(t) = 0$ | when $R(t) = 1$ |
| $= 1$ | when $S(t) = 1$ |
| $= J(t - 1)$ | otherwise |

The current field is declared a part of a 3-2 pulldown sequence when $J(t)=1$, and vice versa. And the phase of the current field is given by $\phi(t)$.

2B. Examples of 3-2 Pulldown

Consider some simple examples to illustrate the operation of the preferred embodiment methods.

(1) First example is a video sequence with high contrast motion (i.e., a (small) bright object moving with a dark background) and minimal noise. Consider a 3-2 pulldown sequence as in FIG. 18a with $D(0) \approx D(1) \approx D(2) \approx D(3) \approx 8 \times 150$, $D(4) \approx 0$ (repeated top field), $D(5) \approx D(6) \approx D(7) \approx D(8) \approx 8 \times 150$, $D(9) \approx 0$ (repeated bottom field), $D(10) \approx D(11) \approx \ldots 8 \times 150$. (For a non-3-2 pulldown sequence, $D(4) \approx D(9) \approx 8 \times 150$.)

First, for $t=9$, $D_{max}(9) \approx 0$ and $D_{min}(9) \approx 8 \times 150$. So $D_{max}(9) < T_{max}(=8 \times 64)$; and $\alpha_{max} \max\{D_{max}(9), T_{min}\} \approx 1.5 \times \max\{0, 8 \times 4\} = 8 \times 6 < D_{min}(9)$. Thus $S(9)=1$, and this implies $\phi(9)=0$, $R(9)=0$, and $J(9)=1$. Thus field 9 is declared part of a 3-2 pulldown sequence and its phase $\phi(9)=0$ indicates that it is a repeated field.

Next, for $t=10, 11$, $D_{max}(t) \approx 8 \times 150$ and $D_{min}(t) \approx 0$. So $D_{max}(t) > T_{max}$ $(=8 \times 64)$; and $\alpha_{max} \max\{D_{max}(t), T_{min}\} \approx 1.5 \times \max\{8 \times 150, 8 \times 4\} = 8 \times 225 > D_{min}(t)$. Hence, $S(10)=S(11)= \ldots = 0$. First, $S(10)=0$ implies $\phi(10)=1$ and so $R(10)=0$; hence, $J(10)=J(9)$ $(=1)$. That is, field 10 is declared part of a 3-2 pulldown sequence and has phase $\phi(10)=1$. Similarly, $S(11)=0$ implies $\phi(11)=2$ and thus $R(11)=0$, and $J(11)=J(10)$ $(=1)$. Again, field 11 is declared part of a 3-2 pulldown sequence and has phase $\phi(11)=2$. Likewise, $S(12)=S(13)=0$ imply $\phi(12)=3$, $\phi(13)=4$, and $R(12)=R(13)=0$; hence, $J(13)=J(12)=J(11)=1$.

The field differences are approximately periodic with period 5, so the field $t=14$ computations essentially repeat those for $t=9$ field, those of $t=15$ essentially repeat those for $t=10$, and so forth.

(2) Second example is a video sequence of either a still scene (i.e., no moving objects) plus large noise or a moving object with low contrast (i.e., object and background of approximately the same luminance). Indeed, take $D(0)=8 \times 10$, $D(1)=8 \times 5$, $D(2)=8 \times 15$, $D(3)=8 \times 20$, $D(4)=8 \times 3$, $D(5)=8 \times 10$, $D(6)=8 \times 25$, $D(7)=8 \times 15$, $D(8)=8 \times 10$, $D(9)=8 \times 3$, $D(10)=8 \times 8$, $D(11)=8 \times 15, \ldots$. Note that this could be a noisy 3-2 pulldown sequence with repeated fields 4 and 9.

Thus first consider $t=9$, $D_{max}(9)=8 \times 3$ and $D_{min}(9)=8 \times 5$. So $D_{max}(9)<T_{max}(=8 \times 64)$; and $\alpha_{max} \max\{D_{max}(9), T_{min}\} 1.5 \times \max\{8 \times 3, 8 \times 4\} = 8 \times 6 > D_{min}(9)$. So $D_{min}(9)$ is not enough larger than $D_{max}(9)$ and $T_{min}$ to indicate a repeated field; hence, $S(9)=0$. But $R(9)=0$ because $D(9)<T_{still}$ $(=8 \times 24)$, and no change is made in the output: $J(9)=J(8)$. (However, a change to $D(1)=8 \times 7$, implies $S(9)=1$ and this example would be like the first example.)

Similarly, for $t=10, 11, \ldots$, $D_{max}(t)=8 \times 10, 8 \times 25, \ldots$ and $D_{min}(t) \approx 8 \times 3, 8 \times 3, \ldots$. So $D_{max}(t)<T_{max}(=8 \times 64)$, and $\alpha_{max} \max\{D_{max}(t), T_{min}\}=1.5 \times \max\{8 \times 10+, 8 \times 4\}=8 \times 15 > D_{min}(t)$, and again $S(10)=S(11)=0$. Also, again $D(10)<T_{still}$, $D(11)<T_{still}, \ldots$, so $R(10)=R(11)=0$ and no change in output: $J(11)=J(10)=J(9)$ with the phase incrementing and rolling over at 4. This persists until the occurrence of a field with $S(t)=1$ to switch from $J(t)=0$ to $J(t)=1$ or with $R(t)=1$ to switch from $J(t)=1$ to $J(t)=0$. So the declaration whether the input fields are from a 3-2 pulldown sequence does not change with this kind of input which means for still scenes or hard-to-detect motion no new decision is made.

2C. Alternatives for 3-2 Pulldown

The 3-2 pulldown determination could use lowpass filtering prior to field differencing and maximum neightbor differences over a field.

For example, the lowpass filtering could use filters other than the 2×2 averaging, such as a 3×2 averaging or a 5×3 with weights $$\begin{bmatrix} 1 & 2 & 2 & 2 & 1 \\ 2 & 4 & 4 & 4 & 2 \\ 1 & 2 & 2 & 2 & 1 \end{bmatrix} \bigg/ 32.$$

The neighborhood sum of absolute differences, $d(t, x, y)$, could be defined by a sum over a different neighborhood: more than or fewer than 8 pixel locations in the strip, and pixel locations from more than one row could be included.

The threshold $T_{max}$ could be in the range of 50N to 80N where N is the number of pixels used in the definition of $d(t, x, y)$ and the luminance data is in the range 0 to 255. For other data ranges, the threshold would be scaled accordingly.

Similarly, the threshold $T_{min}$ could be in the range of 2N to 8N; and the threshold $T_{still}$ could be in the range of 15N to 35N. Even larger ranges may provide useful thresholds.

3A. Pre-filtering Prior to Field Motion Detection Preliminaries

Figure 4A:
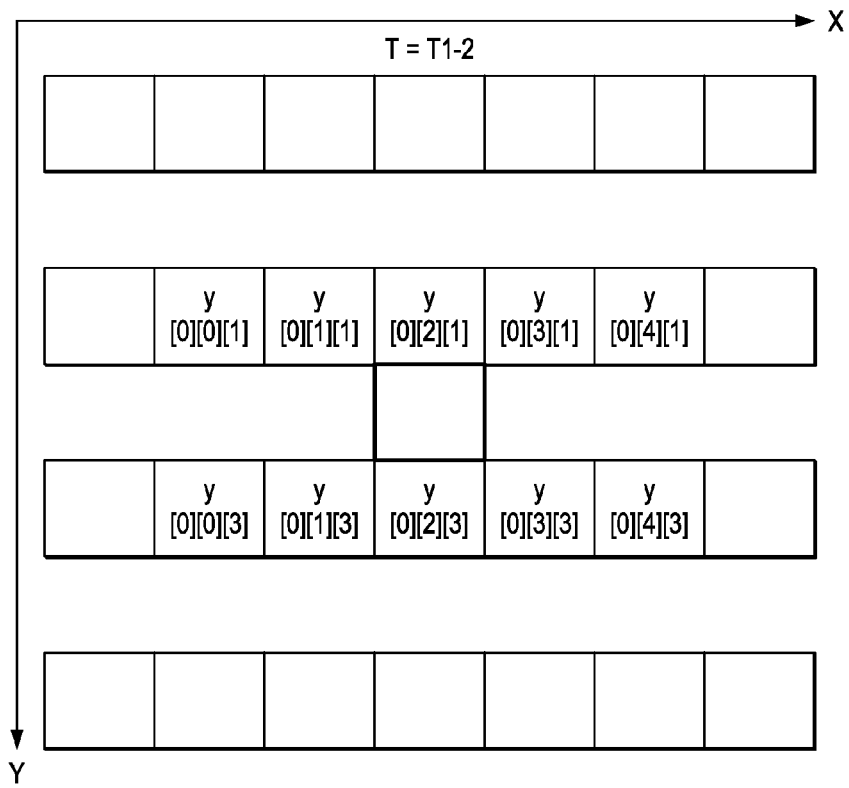
FIGS. 4a-4e show field notation.
Figure 4B:
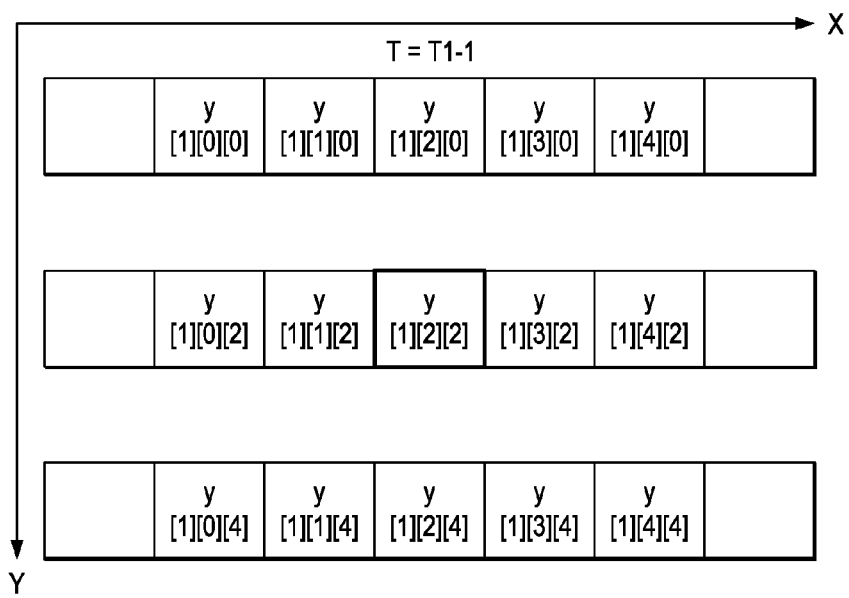
Figure 4C:
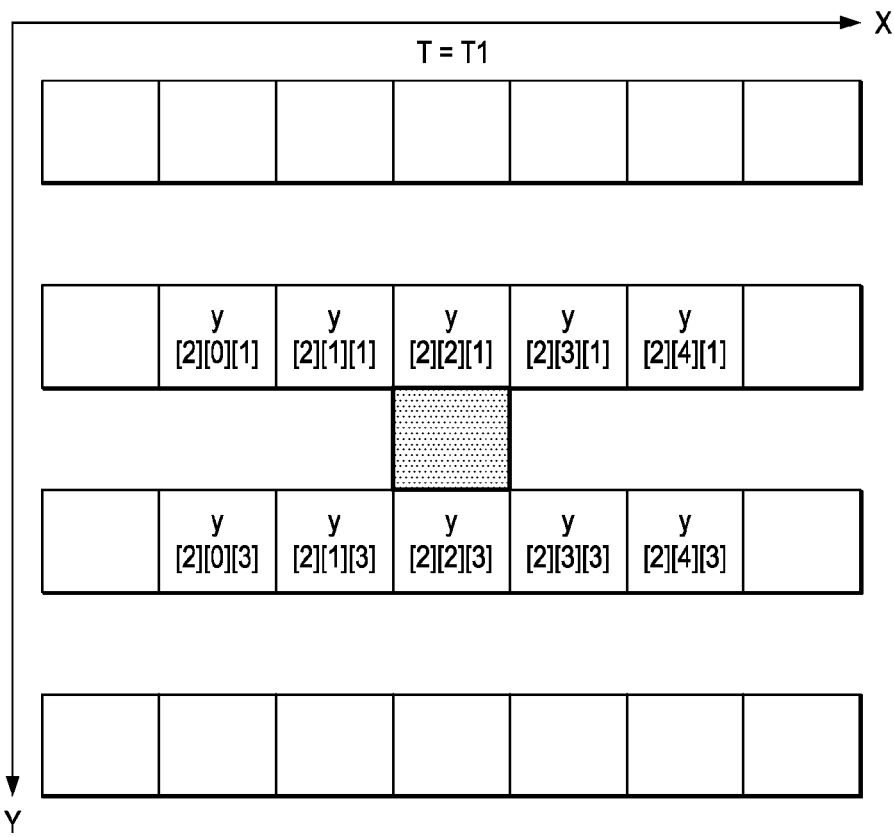
Figure 4D:
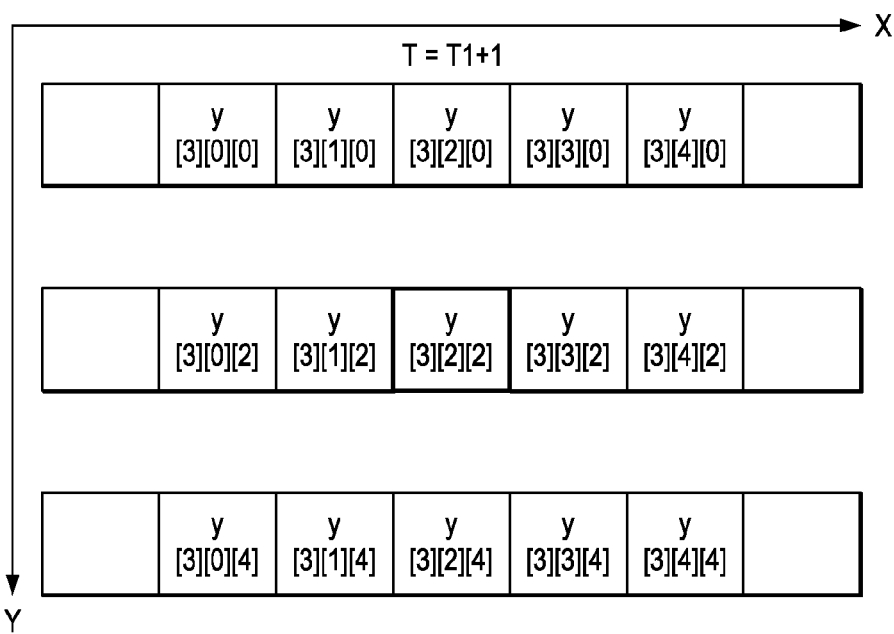
Figure 4E:
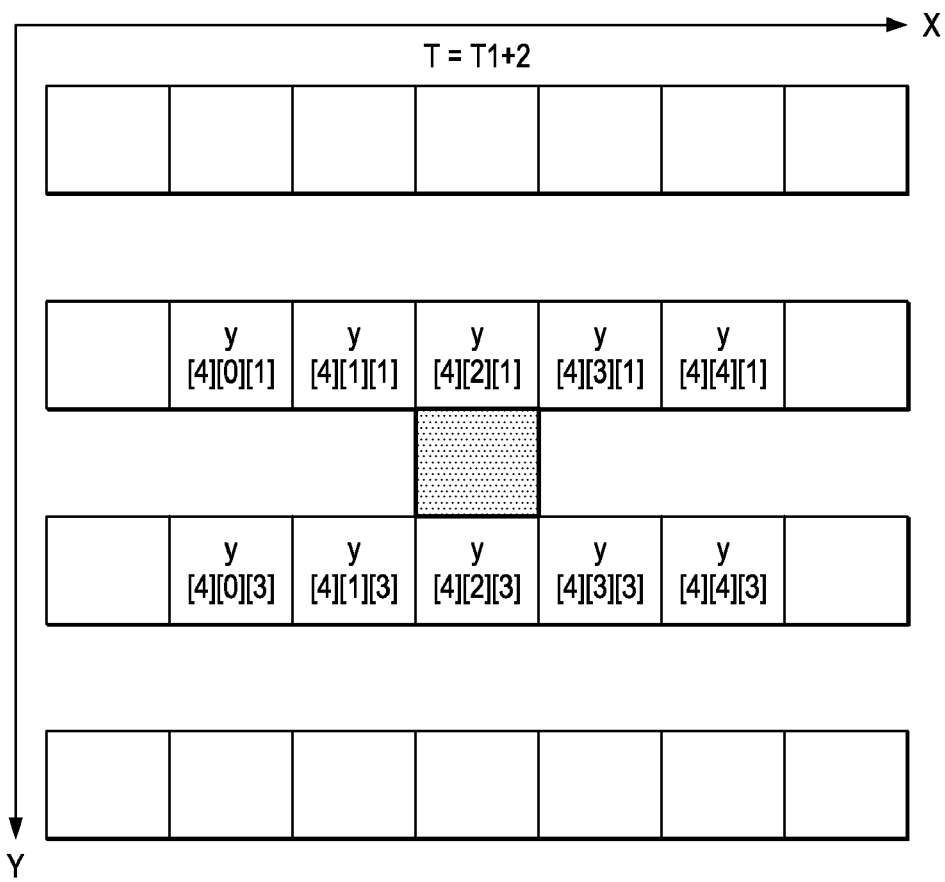

FIGS. 4a-4e show notation to help explain the first preferred embodiments and represent a portion of consecutive fields about a pixel to be interpolated. In particular, FIG. 4c shows the current field at time $t=t1$ and with the shaded pixel in the center of FIG. 4c of $t=t1$ as the pixel being interpolated; FIG. 4a shows the second previous field ($t=t1-2$), FIG. 4b the previous field ($t=t1-1$), FIG. 4d the next field ($t=t1+1$), and FIG. 4e the second next field ($t=t1+2$). Note the alternating parity of the fields in FIGS. 4a-4e. The following description provides pseudo-code expression for calculations to interpolate the shaded (to be interpolated) pixel. The pixels with bold outline in FIGS. 4b and 4d have the same position as the shaded pixel but are in opposite parity fields. The variables $y[i][j][k]$ represent luminance values in the ith field at the (j,k) pixel site with $i=0$ corresponding to $t=t1-2$, $i=1$ to $t=t1-1$, and so forth and the shaded pixel at $j=2$, $k=2$. In the following example, when luminance is black, gray, or white, the values of the variable are defined as 0, 0.5, or 1, respectively. That is, the $y[i][j][k]$ variables may be normalized to the range 0 to 1.

Figure 14A:
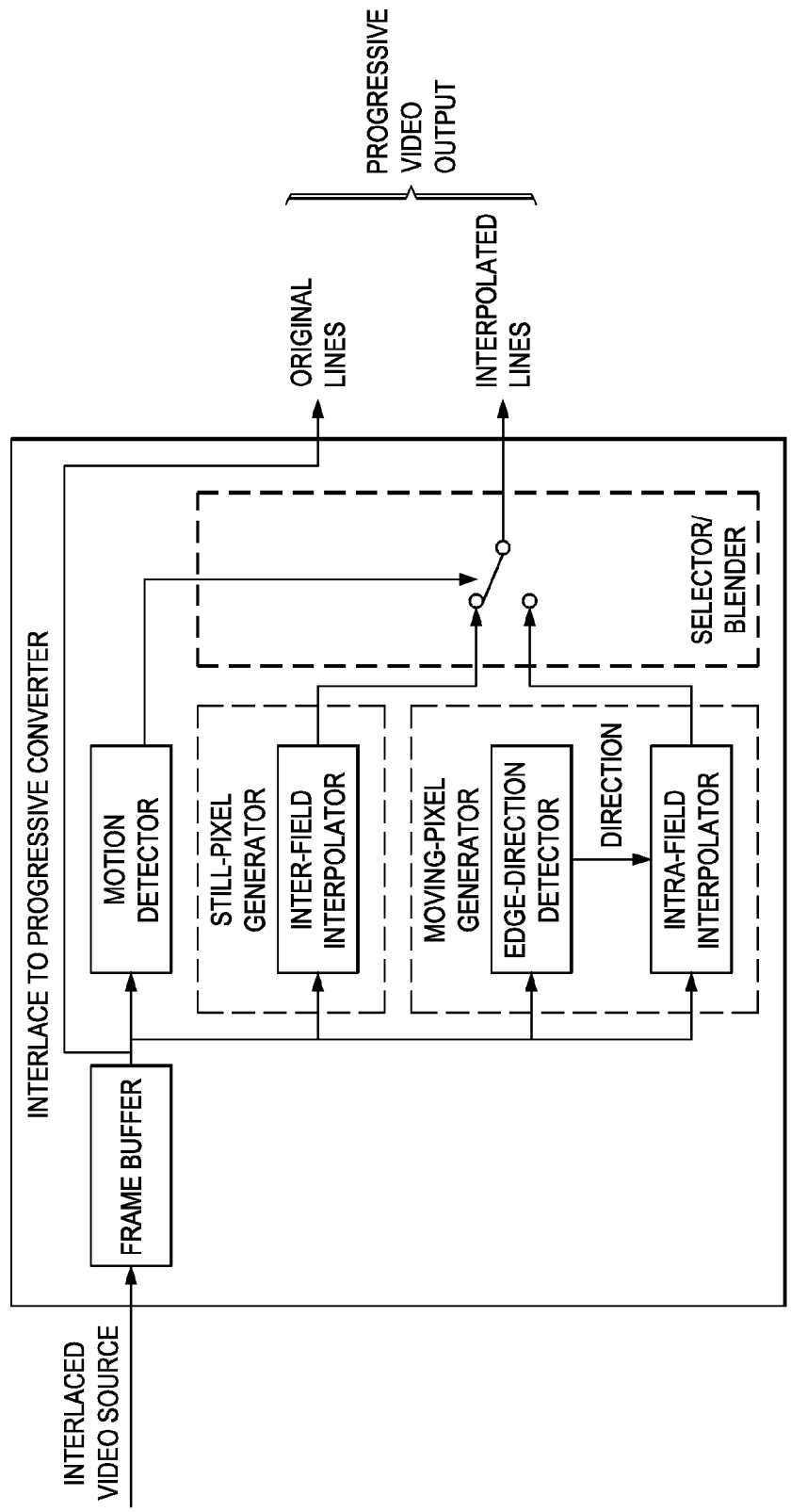
Figure 14B:
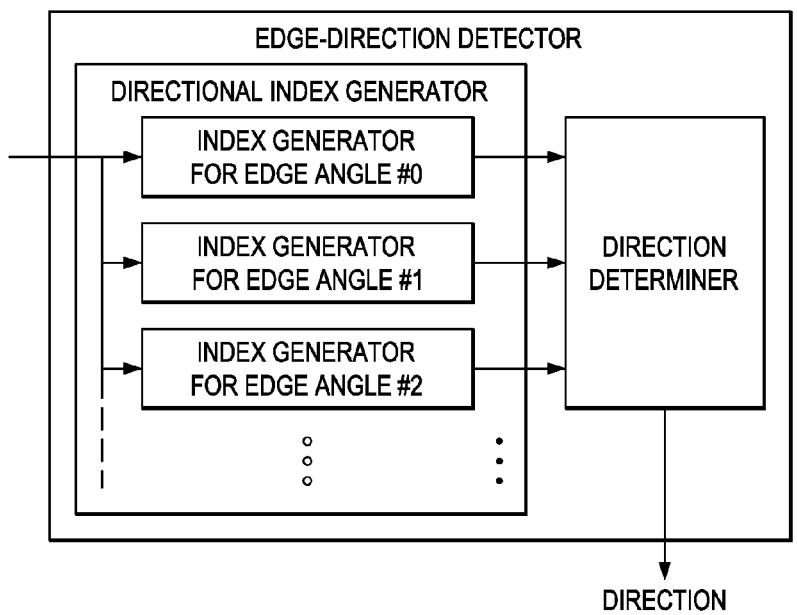

First consider a typical simple conventional method for a motion detector and intra-field and inter-field interpolators as in FIG. 14a in order to explain the preferred embodiments. Presume the selector/blender block is implemented as a selector. Then the Motion_level for the shaded pixel in the current field (FIG. 4c) is calculated by the motion detector using the previous field (FIG. 4b) and the next field (FIG. 4d) as follows;

Motion_level = |y[1][2][0] − y[3][2][0]| +

|y[1][2][2] − y[3][2][2]| + |y[1][2][4] − y[3][2][4]|

When Motion_level>Th_motion, where Th_motion is a threshold value, the selector selects the output of the moving-pixel generator. In this explanation, presume that Th_motion=0.

The output of the inter-field interpolator for luminance (pixel_inter_ip_y) is calculated by a field averaging method; i.e., pixel_inter_ip_y=(y[1][2][2]+y[3][2][2])/2

Whereas, the output of the intra-field interpolator for luminance (pixel_intra_ip_y) is calculated by a line averaging method; i.e., pixel_intra_ip_y=(y[2][2][1])/2

Inter-field and intra-field interpolation processing to calculate hue values, e.g., Cb (luminance—blue) and Cr (luminance—red), for color images are performed in an analogous manner to the processing for luminance.

Figure 5D:
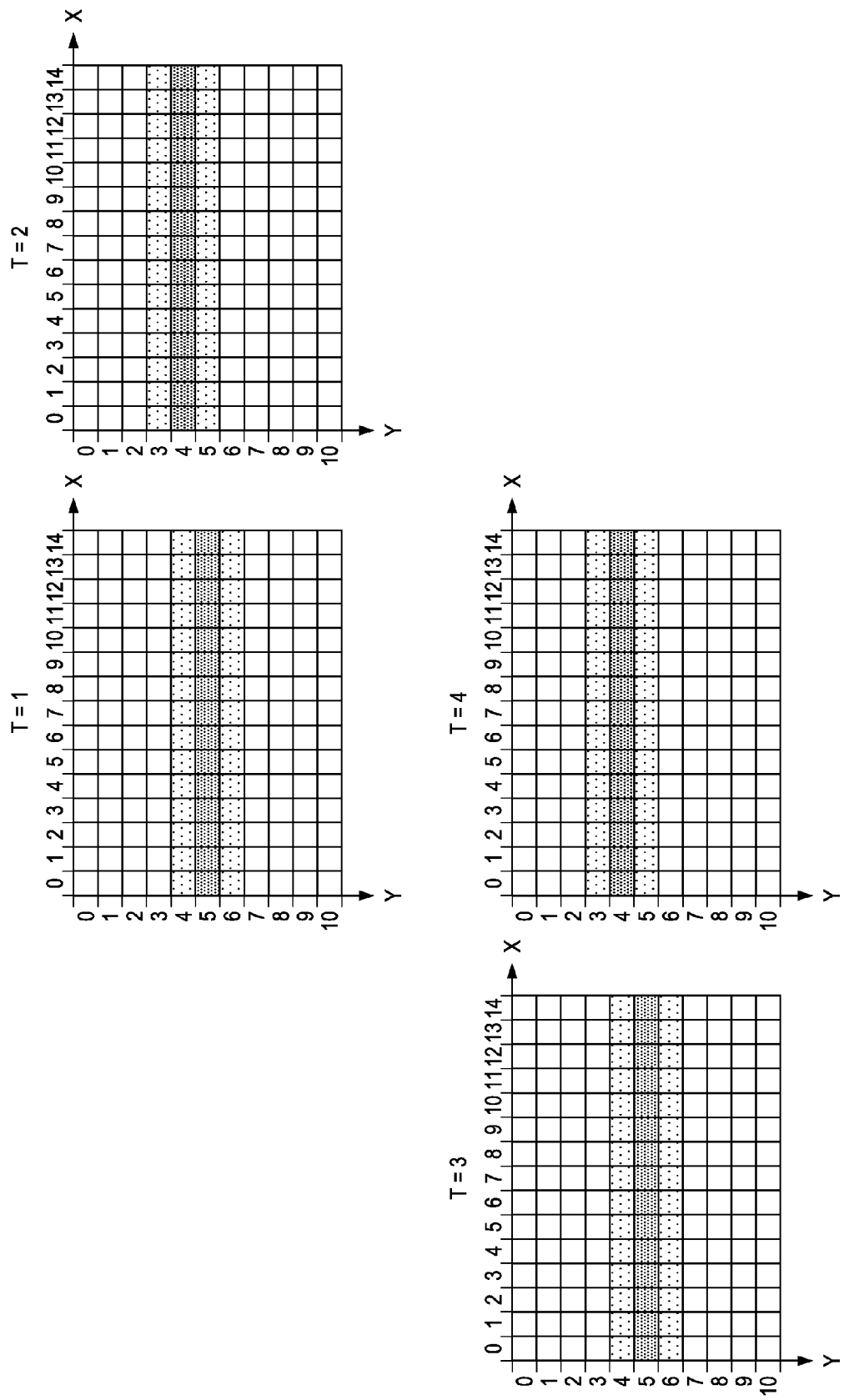

Using the conventional IP conversion method and notation described above, pixel sites in some example images (FIGS. 5a-5d) are processed as follows. FIG. 5a shows original example image sequence, which is a part of whole image area and the image extends to x<0, x>14 and y<0 and y>10. A black still horizontal line runs through the images at the two rows y=4, y=5.

FIG. 5b shows interlaced video fields of the above original example image, where the odd lines (i.e., y=1, 3, 5, . . .) are removed at t=0, 2, 4 (even parity fields) and the even lines are removed at t=1, 3, 5 (odd parity fields).

Ideally there is no noise in the input video image and Motion_level=0 at every pixel site. The IP converted image by the conventional algorithm with Motion_level=0 is shown in FIG. 5c. The results for t=0 and 5 are missing because data of t=−1 and 6 are required to process but not defined in this example.

However, in reality some noise is in the input video signal. Especially, video images from a video encoding/decoding process will have encoding noise around the edges of the line. When such noise exists around the line in the sample image, Motion_level increases and the output of the moving-pixel generator is selected if the Motion_level exceeds Th_motion. FIG. 5d shows the IP converted sample image using the output of the moving-pixel generator. The luminance of pixels at y=3 (upper the line) is "white at t=odd" and "gray at t=even", although those are always white in the original image. The luminance of pixels at y=6 (below the line) is "gray at t=odd" and "white at y=even", although always white in the original. The center black line is on "y=5 at t=odd" and "y=4 at t=even". Human eyes recognize these artifacts as flickering of the horizontal line, and no flicker noise in images is preferred. In addition to no flicker noise, images with the highest possible spatial resolution are generally preferred.

3B. Pre-filtering Field Motion Detection

The preferred embodiment methods improve accuracy of motion detection even if the input video signal has some noise. Additionally, this improves spatial resolution for slowly moving objects as explained below.

FIG. 3a shows a schematic diagram of the preferred embodiment interlace-to-progressive converter. A pre-filter is added before the motion detector. The pre-filter processes input images for the motion detector to improve detection accuracy. The pre-filter consists of an intra low-pass filtering that spatially low-pass filters every input video field. The spatial low-pass filtering removes noise because the low-pass-filtering reduces spatial resolution.

Inter-field interpolation causes a comb-like artifact for a moving object, but when an object moves slowly (moving speed of ~1 pixel/field), the artifact is not distinguishable. The spatial low-pass filtering masks the slow motion by the spatial resolution reduction and lowers Motion_level. Due to the lowered Motion_level, the inter-field interpolator (which has higher spatial resolution) is selected by the selector/blender block. By this effect, the spatial resolution of a slowly moving object is improved.

A five-field, five-lateral-pixel, five-vertical-line (5×5×5) region is used in this preferred embodiment pre-filtering. The five-vertical-line means five lines in progressive format, i.e., in the input interlaced fields, 2 lines and 3 lines are used at "t=t1−2, t1, and t1+2" and "t=t1−1 and t1+1", respectively. Thus the target pixel to generate by interpolation is y[2][2][2]. The pre-filtering and motion detector operate as follows.

(a) Pre-filter

A two dimensional, 2-pixel horizontal×2-pixel vertical (2×2), low-pass filtering is applied for each field as follows.

for_(h_cnt = 0; h_cnt < 4; h_cnt++)

{y'[h_cnt][0] = (y[0][h_cnt][1] + y[0][h_cnt + 1][1] + y[0][h_cnt][3] + y[0][h_cnt + 1][3])/4 y'[h_cnt][1] = (y[1][h_cnt][0] + y[1][h_cnt + 1][0] + y[1][h_cnt][2] + y[1][h_cnt + 1][2])/4 y'[h_cnt][2] = (y[1][h_cnt][2] + y[1][h_cnt + 1][2] + y[1][h_cnt][4] + y[1][h_cnt + 1][4])/4 y'[h_cnt][3] = (y[2][h_cnt][1] + y[2][h_cnt + 1][1] + y[2][h_cnt][3] + y[2][h_cnt + 1][3])/4 y'[h_cnt][4] = (y[3][h_cnt][0] + y[3][h_cnt + 1][0] + y[3][h_cnt][2] + y[3][h_cnt + 1][2])/4 y'[h_cnt][5] = (y[3][h_cnt][2] + y[3][h_cnt + 1][2] + y[3][h_cnt][4] + y[3][h_cnt + 1][4])/4 y'[h_cnt][6] = (y[4][h_cnt][1] + y[4][h_cnt + 1][1] + y[4][h_cnt][3] + y[4][h_cnt + 1][3])/4}

Figure 3B:
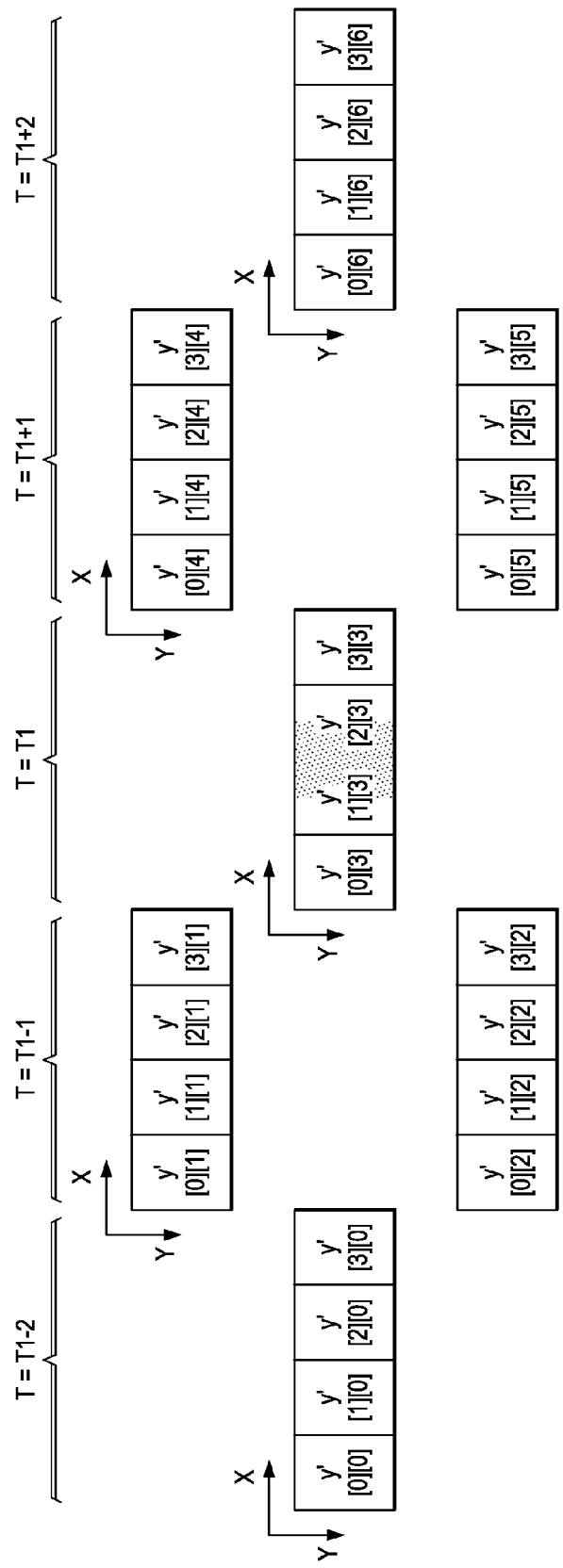

The 2×2 filtering is applied to get y'[j][k] and the obtained values each represents the data at the center position of the 4 pixels used for the 2×2 calculation. FIG. 3b illustrates the y'[j][k] of the low-pass-filtered pixels. The shaded square (half in each of the y[1][3] and y'[2][3] filtered pixels in the center of FIG. 3b) shows the target pixel position being interpolated. Note that fields 0, 2, and 4 each had two lines (one above the target pixel's line, and one below) lowpass filtered to give pixels in a single line, the line of the target pixel. Contrarily, fields 1 and 3 each had three lines (the target pixel's line, the line two above the target, and the line two below the target) filtered to give filtered pixels in two lines, one line above and one line below the target pixel).

(b) Motion Detector

The motion detector calculates the luminance difference between two fields. The output of the motion detector (Motion_level) is calculated as follows;

$$\text{Motion\_level} = |y'[0][0] - y'[0][3]| +$$
$$|y'[1][0] - y'[1][3]| + |y'[2][0] - y'[2][3]| +$$
$$|y'[3][0] - y'[3][3]| + |y'[0][1] - y'[0][4]| + |y'[1][1] - y'[1][4]| +$$
$$|y'[2][1] - y'[2][4]| + |y'[3][1] - y'[3][4]| +$$
$$|y'[0][2] - y'[0][5]| + |y'[1][2] - y'[1][5]| +$$
$$|y'[2][2] - y'[2][5]| + |y'[3][2] - y'[3][5]| +$$
$$|y'[0][3] - y'[0][6]| + |y'[1][3] - y'[1][6]| +$$
$$|y'[2][3] - y'[2][6]| + |y'[3][3] - y'[3][6]|$$

That is, the motion detection simply sums the 4 filtered pixel differences from filtered fields 0 and 2, the 8 filtered pixel differences from fields 1 and 3, and the 4 filtered pixel differences from filtered fields 2 and 4.

3C. Alternatives for Pre-filtering

The preferred embodiments may be modified in various ways while retaining one or more of the features of pre-filtering fields prior to motion detection.

For example, weighting the differences used in the motion detection sum to emphasize the pixels closer to the target pixel; varying the filtering region (number of fields and area about the target pixel) such as by using a 3×2 filter in each field or decreasing the number of fields to 4 by eliminating the t1+2 and the corresponding differences, and so forth.

The interlace-to-progressive converter could blend the still-pixel interpolation and the moving-pixel interpolation rather than select one with a blending factor dependent upon the motion level.

Motion could be detected in each color separately (e.g., RGB or YCbCr), rather than as luminance, and sum the color difference for the motion level.

The pre-filtering could use 3×3, 5×5, 2×3, et cetera, windows; and could use weighting to emphasize or weaken the center pixel; and so forth.

4A. Field Motion Detection with Feedback

Preferred embodiment motion detection utilizes continuity of image sequences. That is, in a local time interval and in a local area, an image sequence most likely keeps the same state such as "still", "moving", "panning", and so on. Therefore, when the degree of motion at a certain pixel (x0,y0) is calculated, the past value of the degree of motion at the same point (x0,y0) can be expected to be an additional motion evaluation without expanding the number of fields of stored images for the purpose of more accurate motion detection.

Figure 6A:
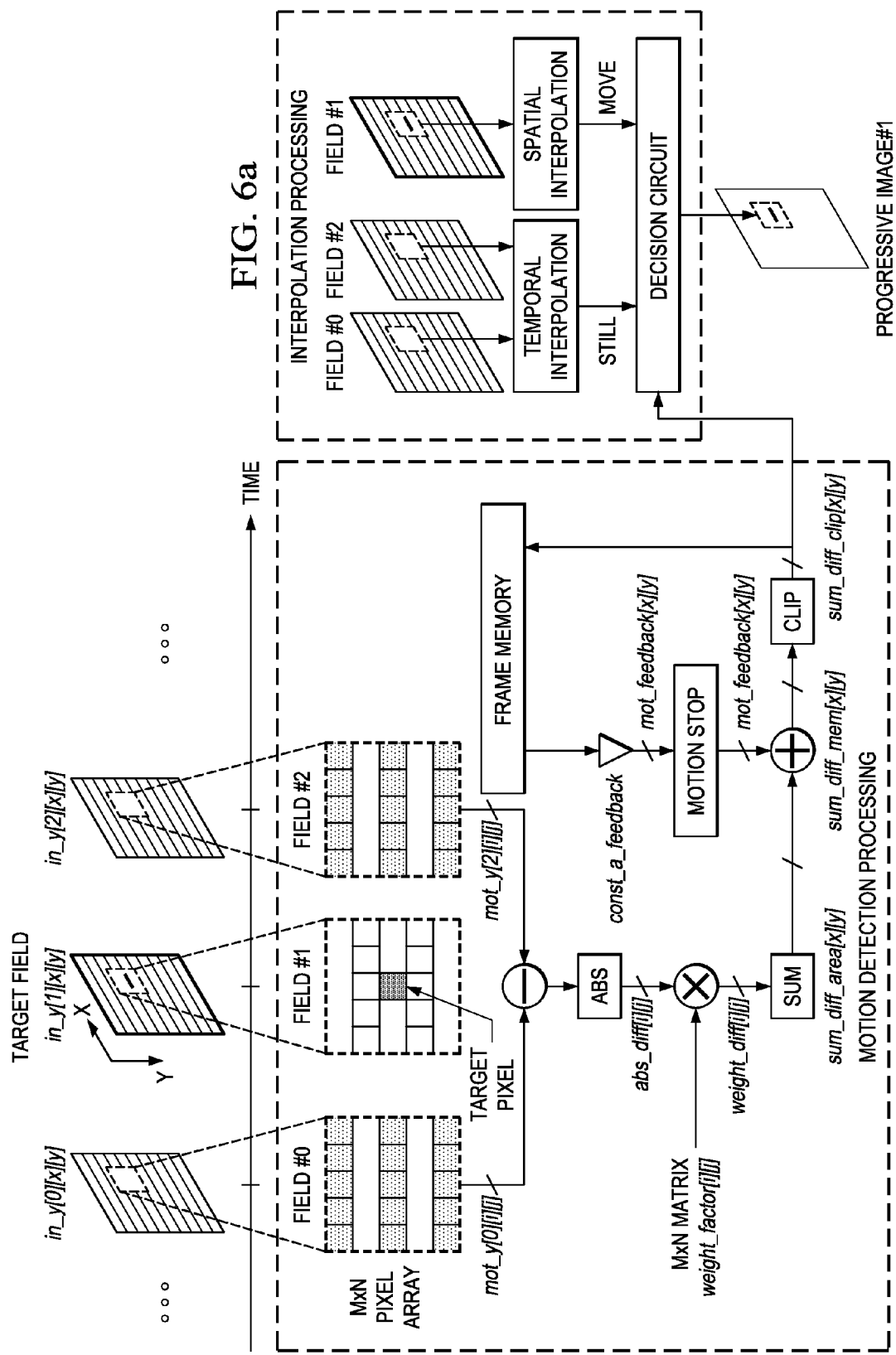
FIGS. 6a-6b are a flow diagram and example of a preferred embodiment.

FIG. 6a shows a flow for a first preferred embodiment motion detection method together with an interpolation method decision such as would be used in interlace-to-progressive up-conversion processing. In this preferred embodiment motion detection method, a feedback loop, which is composed of an accumulator, a frame memory, a clip, and a motion stop function, is inserted after the motion detection previously-described in the background. The computed degree of motion for pixel (x,y), sum_diff_area[x][y], is added to the value from the feedback loop, mot_feedback1[x][y]. That is, $$\text{sum\_diff\_mem}[x][y] = \text{sum\_diff\_area}[x][y] + \text{mot\_feedback1}[x][y] (x=0, 1, \ldots, \text{IMAGE\_SIZE\_}X-1; y=0, 2, 4, \ldots, \text{IMAGE\_SIZE\_}Y-2)$$

or $$(x=0, 1, \ldots, \text{IMAGE\_SIZE\_}X-1; y=1, 3, 5, \ldots, \text{IMAGE\_SIZE\_}Y-1)$$

Note that the output value sum_diff_mem[x][y] may cause an overflow due to the recursive accumulation. Therefore, the output value sum_diff_mem[x][y] is clipped to a maximum value max_of_sum_diff as follows:

$$\text{sum\_diff\_clip}[x][y] = \begin{cases} \text{sum\_diff\_mem}[x][y] & (\text{sum\_diff\_mem}[x][y] < \text{max\_of\_sum\_diff}) \\ \text{max\_of\_sum\_diff} & (\text{otherwise}) \end{cases}$$

The preferred embodiment motion detection output value, sum_diff_clip[x][y], is used as the degree of motion, such as in the decision about interpolation method for up-conversion, and also is stored in the frame memory in the feedback loop.

For pixel values in the range 0 to 255 (so max_of_sum_diff=255), the interpolation method decision could be: sum_diff_clip[x][y]≦50 indicates the state of (x,y) is still and thus temporal interpolation, and sum_diff_clip[x][y]>50 indicates the state of (x,y) is moving and thus spatial interpolation.

The stored value sum_diff_clip[x][y] is used in the motion detection for the next field of the same parity, and is adjusted using a constant gain factor const_a_feedback as follows:

$$\text{mot\_feedback}[x][y] = \text{sum\_diff\_clip}[x][y] \times \text{const\_}a\text{\_feedback}$$

The gain-adjusted value mot_feedback[x][y] is fed into the motion stop function.

Typically, const_a_feedback would be chosen in the range of 0-0.5. Values of const_a_feedback determine the steady state of the recursive accumulation: in an image sequence with very small motion, sum_diff_area[x][y] will have steady small values, and in the steady state sum_diff_clip[x][y]= sum_diff_area[x][y]/(1-const_a_feedback). Thus the value of const_a_feedback influences the threshold for the still-versus-moving decision.

In case a sequence of images to be motion-detected is an edit sequence, such as a TV program, a change of image scene happens frequently. When a scene change happens, all absolute values of pixel differences in the target field are increased. Therefore, the traditional motion detection processing misjudges all pixels in the target field as having large motion. In the interlace-to-progressive up-conversion system, the misjudgment loses spatial resolution for the output progressive image. At the time of a scene change, the past motion degree mot_feedback[x][y] is already meaningless and should not be reused. The motion stop function effectively judges whether the input value mot_feedback[x][y] should be output or not, depending upon the continuity of image sequence. If there is expected to be continuity in the current state of image sequence, the motion stop function outputs the past motion degree mot_feedback[x][y] directly. Otherwise, the motion stop function cancels the feedback factor and outputs zero. To estimate the continuity of the image sequence, the variation of the summation of absolute values of all pixel differences between the two successive fields of the same parity can be utilized. For example, define for even and odd fields:

$$\begin{cases} \text{sum\_of\_diff}[0] = \sum_{x=0}^{\text{IMAGE\_SIZE\_X}-1} \sum_{y=0,2,4,\ldots}^{\text{IMAGE\_SIZE\_Y}-2} |\text{in\_y}[k-2][x][y] - \text{in\_y}[k][x][y]| \\ \text{sum\_of\_diff}[1] = \sum_{x=0}^{\text{IMAGE\_SIZE\_X}-1} \sum_{y=0,2,4,\ldots}^{\text{IMAGE\_SIZE\_Y}-2} |\text{in\_y}[k][x][y] - \text{in\_y}[k+2][x][y]| \end{cases}$$

or $$\begin{cases} \text{sum\_of\_diff}[0] = \sum_{x=0}^{\text{IMAGE\_SIZE\_X}-1} \sum_{y=1,3,5,\ldots}^{\text{IMAGE\_SIZE\_Y}-1} |\text{in\_y}[k-2][x][y] - \text{in\_y}[k][x][y]| \\ \text{sum\_of\_diff}[1] = \sum_{x=0}^{\text{IMAGE\_SIZE\_X}-1} \sum_{y=1,3,5,\ldots}^{\text{IMAGE\_SIZE\_Y}-1} |\text{in\_y}[k][x][y] - \text{in\_y}[k+2][x][y]| \end{cases}$$

Using these amount values of pixel difference at the same point in two successive same parity fields, sum_of_diff[0], sum_of_diff[1], and the threshold th_mot_stop_detection, the output of the motion stop function, mot_feedback1[x][y], can be determined by the following method:

tmp_sum_of_diff =
$$\begin{cases} \text{sum\_of\_diff}[0] - \text{sum\_of\_diff}[1] & (\text{sum\_of\_diff}[0] > \text{sum\_of\_diff}[1]) \\ 0 & (\text{otherwise}) \end{cases}$$

mot_feedback[x][y] =
$$\begin{cases} \text{mot\_feedback}[x][y] & (\text{tmp\_sum\_of\_diff} < \text{th\_mot\_stop\_detection}) \\ 0 & (\text{otherwise}) \end{cases}$$

Note that a scene transition from "move" to "still" in which the past motion degree should be canceled is on condition that the past amount value of pixel difference, sum_of_diff[0], is large and the next amount value of pixel difference, sum_of_diff[1], is low. That is, the change of scene can be detected by measuring sum_of_diff[0]-sum_of_diff[1]. For luminance pixel values in the range 0 to 255, th_mot_stop_detection would typically be chosen to be in the range of 30×(number of pixels in a field) to 50×(number of pixels in a field). And in VGA example (=153600 pixels per field), this would have th_mot_stop_detection in the range 4608000 to 7680000.

The past degree of motion, mot_feedback1[x][y], is derived and used to update the current degree of motion, sum_diff_area[x][y], to give the new degree of motion, sum_diff_mem[x][y], which is then clipped to give the detection motion degree output.

4B. Example of Field Motion Detection

Figure 6B:
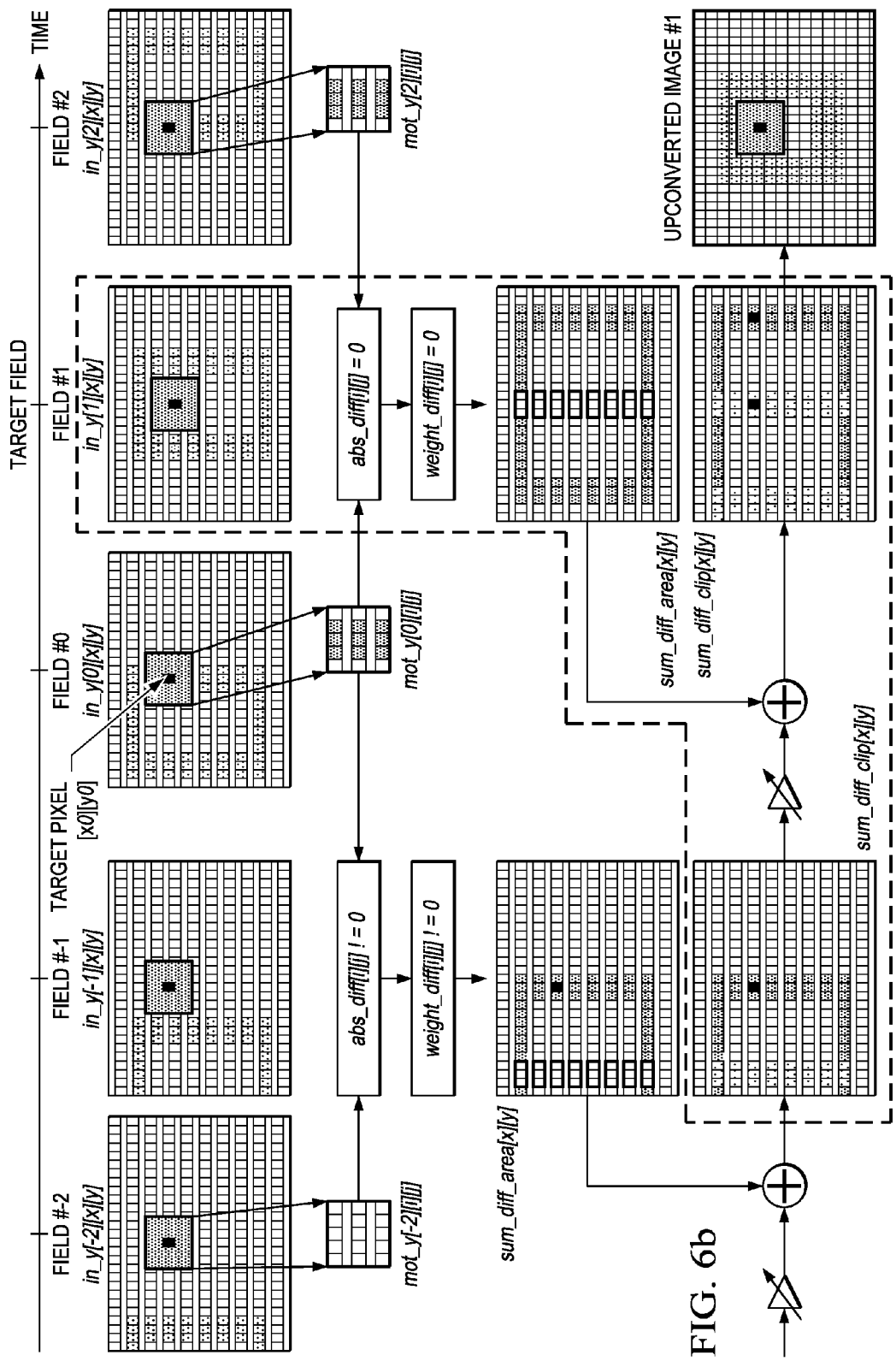
Figure 19A:
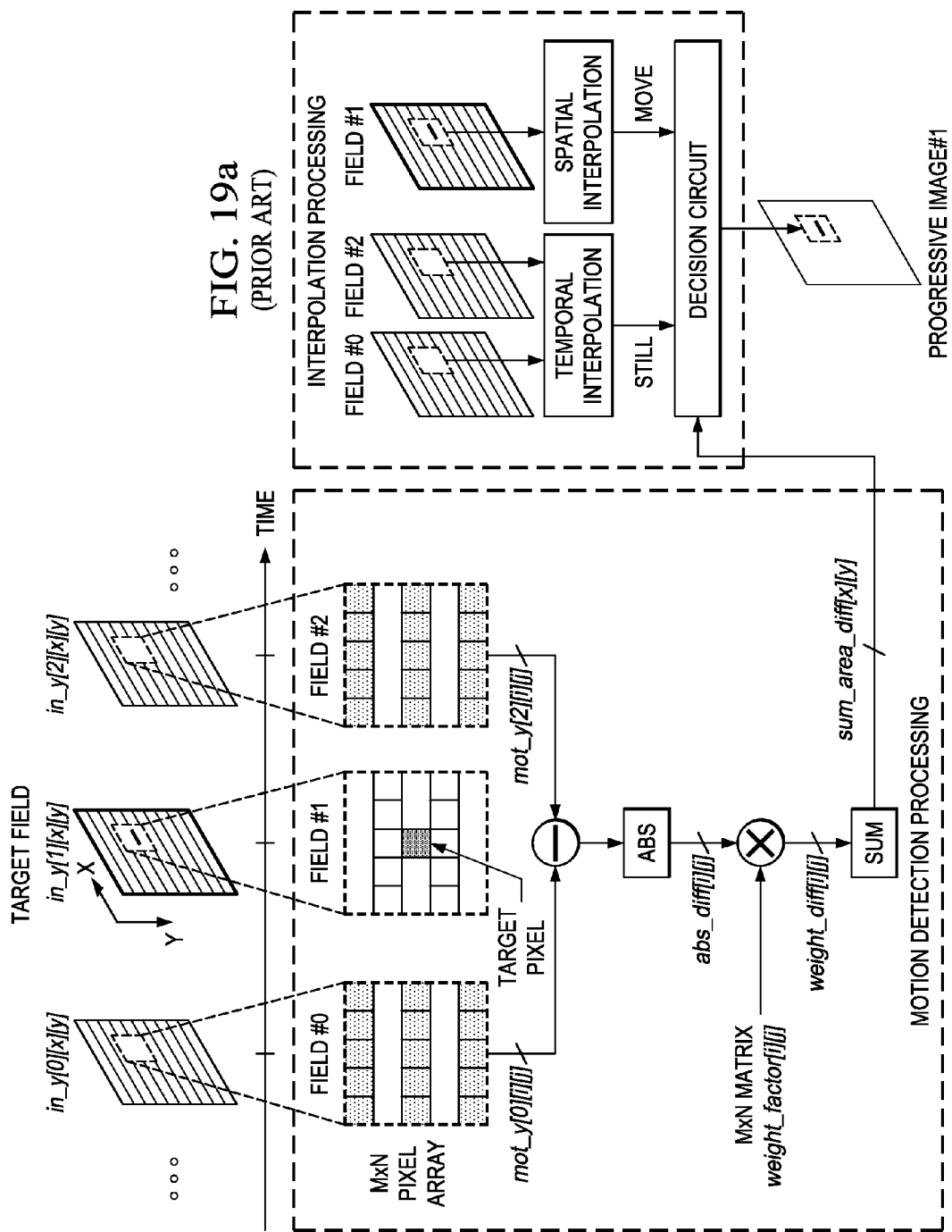

FIG. 6*b* shows an effect of the preferred embodiment motion detection method on the same example situation as shown in FIG. 19*b*. As with the prior art motion detection method, the current degree of motion at the target pixel (x0, y0) in field#1, sum_diff_area[x0][y0], is zero. However, in the first preferred embodiment motion detection method, the current degree of motion sum_diff_area[x0][y0] is added to the past degree of motion, mot_feedback1x0][y0]. The value mot_feedback1[x0][y0] for the example can be estimated by calculating the degree of motion at the target pixel (x0,y0) as sum_diff_clip[x0][y0] for field#−1. The two extracted arrays for the target pixel (x0,y0) in field#−1, mot_y[−2][i][j] and mot_y[0][i][j], are:

$$\text{mot\_y}[-2][i][j] = 255 \quad (i=0,\ldots,4, j=0,\ldots,2)$$

$$\text{mot\_y}[0][i][j] = \begin{cases} 255 & (i=0,4) \\ 0 & (\text{otherwise}) \end{cases} \quad (j=0,\ldots,2)$$

Therefore, the absolute values of differences abs_diff[i][j] (i=0,1,2; j=0, . . . , 4) between the two extracted pixel arrays are:

$$\text{abs\_diff}[i][j] = \begin{cases} 0 & (j=0,4) \\ 255 & (\text{otherwise}) \end{cases}$$

If we take the weight factors as follows with the center element corresponding to the pixel location:

$$\text{weight\_factor} = \begin{bmatrix} 1 & 2 & 2 & 2 & 1 \\ 2 & 4 & 4 & 4 & 2 \\ 1 & 2 & 2 & 2 & 1 \end{bmatrix} / 32$$

the weighted absolute array weight_diff[i][j] is:

$$\text{weight\_diff} = \begin{bmatrix} 0 & 16 & 16 & 16 & 0 \\ 0 & 32 & 32 & 32 & 0 \\ 0 & 16 & 16 & 16 & 0 \end{bmatrix}$$

Thus, the degree of motion at (x0,y0) in field#−1, sum_diff_area[x0][y0], is calculated as follows:

$$\text{sum\_diff\_area}[x0][y0] = \sum_{i=0}^{4} \sum_{j=0}^{2} \text{weight\_diff}[i][j] = 192$$

Since the degree of motion at (x0,y0), sum_diff_mem[x0][y0], in field#−1 is simply the addition of sum_diff_area[x0][y0] calculated above and mot_feedback1[x0][y0] which is the past motion degree prior to field#−1, sum_diff_mem[x0][y0] can be estimated as follows:

sum_diff_mem[*x0*][*y0*]=sum_diff_area[*x0*][*y0*]+mot_feedback1[*x0*][*y0*]=192+mot_feedback[*x0*][*y0*]≧192

If we take the maximum value max_of_sum_diff=255, then the final value of the degree of motion at the target pixel (x0,y0) in field#−1, sum_diff_clip[x0][y0], is derived:

$$192 \leq \text{sum\_diff\_clip}[x0][y0] \leq 255$$

Let the gain value of the feedback loop const_a_feedback be 0.5, then the gain-adjusted value mot_feedback[x0][y0] is in the range:

$$96 \leq \text{mot\_feedback}[x0][y0] \leq 128$$

Since there is no scene change in this example image sequence, we can assume that the motion stop function just outputs the original feedback data mot_feedback[x0][y0] directly. Therefore, the past degree of motion at the target pixel (x0,y0) in field#1, mot_feedback1[x0][y0], is also in this range:

$$96 \leq \text{mot\_feedback1}[x0][y0] \leq 128$$

Since the current degree of motion at the target pixel (x0,y0) in field#1, sum_diff_area[x0][y0], is zero, the degree of motion at (x0,y0), sum_diff_mem[x0][y0], in field#1 is thus also in this range:

$$96 \leq \text{sum\_diff\_mem}[x0][y0] \leq 128$$

And, the final value of the degree of motion at the target pixel (x0,y0) in field#1, sum_diff_clip[x0][y0] is derived again using max_of_sum_diff=255:

$$96 \leq \text{sum\_diff\_clip}[x0][y0] \leq 128$$

Hence, a non-zero value for the degree of the motion has been derived, and the effectiveness of the preferred embodiment motion detection method using the feedback loop for the degree of motion without an extension of the number of field images to be stored has been shown.

4C. Second Preferred Embodiment Field Motion Detection

FIG. 7a shows the data flow for the second preferred embodiment motion detection method which is similar to the first preferred embodiment motion detection with some functional additions for use in a preferred embodiment interlace-to-progressive up-conversion system. First, the number of fields to be stored can be upgraded depending on the bandwidth of memory and the size of memory given to this system in the target applications. From five stored fields with the target field as field#2, five input data arrays mot_y[k][i][j] are extracted as follows:

$$\text{mot\_y}[k][i][j] = \begin{cases} \text{in\_y}[k][x+i-2][y+2j-1] & (k=0,2,4, i=0,\ldots,4, j=0,1) \\ \text{in\_y}[k][x+i-2][y+2j-2] & (k=1,3, i=0,\ldots,4, j=0,\ldots,2) \end{cases}$$

In the next step, a low pass filter is applied to these extracted arrays mot_y[k][i][j] before absolute difference calculations:

$$\text{mot\_area\_y}[k][i][j] = \frac{\text{mot\_y}[k][i][j] + \text{mot\_y}[k][i+1][j] + \text{mot\_y}[k][i][j+1] + \text{mot\_y}[k][i+1][j+1]}{(4)}$$

$$(k=0,2,4, i=0,\ldots,3, j=0) \text{ or } (k=1,3, i=0,\ldots,3, j=0,1)$$

This low-pass filter smoothes the input data array mot_y[k][i][j] and contributes stability to the degree of motion at each target pixel, especially in image sequences which includes high frequency components. The low-pass filtering reduces array sizes; the 5×2 arrays become 4×1 and the 5×3 arrays become 4×2.

Absolute values of differences between the low-pass filtered arrays in two fields are calculated as follows:

$$\text{diff\_area\_y}[k][i][j] = |\text{mot\_area\_y}[k][i][j] - \text{mot\_area\_y}[k+2][i][j]| \, (k=0,2, i=0,\ldots,3, j=0) \text{ or } (k=1, i=0,\ldots,3, j=0,1)$$

As to the derivation of sum_diff_area[x][y], it is done by a simple summation of all absolute values of differences diff_area_y[k][i][j] without weighting operations for the purpose of design simplification:

$$\text{sum\_diff\_area}[x][y] = \left[ \sum_{i=0}^{3} \sum_{j=0}^{1} \text{diff\_area\_y}[1][i][j] + \sum_{i=0}^{3} \sum_{j=0}^{0} (\text{diff\_area\_y}[0][i][j] + \text{diff\_area\_y}[2][i][j]) \right] >> 4$$

Note that the shift by 4 bits (divide by 16) compensates for the summation over a total of 16 terms. In the prior preferred embodiment the weight factors provided the summation compensation.

Next, subtract the constant const_b from sum_diff_area[x][y]:

$$\text{sum\_diff\_b}[x][y] = \text{sum\_diff\_area}[x][y] - \text{const\_b}$$

Depending upon the conditions of the source of input image sequence, the input image sequence includes many kinds of noise such as temporal noise by CCD dark current or bad reception conditions for radio wave broadcasts, and encoded noise by a bit rate reduction in digital video compression systems. For these bad input source conditions, the absolute value of the temporal differences described above increases, so the value of degree of motion also tends to be higher than for noiseless input sources. By subtracting the value const_b, the noise factor in the given absolute difference value can be stably disregarded. Typical values for const_b would be in the range 5 to 10.

FIG. 7b shows the flow for a motion stop function in the feedback loop of a second preferred embodiment motion detection. In this function, the fields of the temporal differences sum_of_diff[k](k=0, 1, 2) are considered as a simple extension of the first preferred embodiment motion stop scheme described above:

$$\text{sum\_of\_diff}[k] = \begin{cases} \sum_{x=0}^{\text{IMAGE\_SIZE\_X}-1} \sum_{y=0,2,4,\ldots}^{\text{IMAGE\_SIZE\_Y}-2} |\text{in\_y}[k][x][y] - \text{in\_y}[k+2][x][y]| \text{ or} \\ \sum_{x=0}^{\text{IMAGE\_SIZE\_X}-1} \sum_{y=1,3,5,\ldots}^{\text{IMAGE\_SIZE\_Y}-1} |\text{in\_y}[k][x][y] - \text{in\_y}[k+2][x][y]| \end{cases}$$

$$(k = 0, \ldots, 2)$$

Using a given threshold value th_mot_stop, this motion stop function operates based on the following method:

```
for(k=0;k<2;k++){
  if( sum_of_diff[k]>sum_of_diff[k+1]){
```

-continued

```
        tmp sum_of_diff[k]=sum_of_diff[k]-sum_of_diff[k+1];
    }
    else{
        tmp_sum_of_diff[k]=0;
    }
}
if((tmp_sum_of_diff[0]>th mot stop)II
              (tmp_sum_of_diff[1]>th_m_stop)){
    is_motion_stop =true;          // cancel feedback factor
                                   // for motion detection
}
else{
    is_motion_stop =false;
}
```

Next, apply the clip operation to the addition of the current degree of motion, sum_diff_area[x][y], and the past degree of motion from the feedback loop, mot_feedback1[x][y]. Then the clipped value sum_diff_clip[x][y] is multiplied by a constant gain const_a:

sum_differ_a[x][y]=sum_diff_clip[x][y]×const_a

This operation is to adjust the sensitivity of the given degree of motion and is effective to capture the motion, especially in low contrast image sequences. Typical values chosen for const_a would be in the range 1 to 4.

In this way, the preferred embodiment motion detection system outputs sum_diff_a[x][y] as the final value of the motion degree at the target pixel (x,y). And this motion degree is used in the preferred embodiment interpolation decision for interlace-to-progressive up-conversion.

4D. Motion Detection Alternatives

The preferred embodiments can be modified in various ways while retaining the feature of a feedback loop for prior field motion information to adjust current field motion information.

For example, each of the constants const_a_feedback, const_a, and const_b could be adaptively adjusted, such as decrease const_a_feedback when one of sum_of_diff[j] is large for several successive fields.

The M×N array size and corresponding matrices weight_factor[i][j] could be adaptively adjusted, with smaller arrays used when most pixels have a state of moving.

The motion stop function could extend to the next same parity field as the scene-change field to eliminate the preceding large sum_diff_clip[x][y] from the frame memory.

The Motion stop function could be extended to include the next field of the same parity after a scene change. Consider this simple example (two tables below) of two pixels for up-conversion, one in the even parity field and one in the odd parity field. Presume each pixel has a state of still (e.g., sum_diff_area[x][y] randomly varies about 10) both before and after a new scene; the new scene starts at field #8. The first table is for the first preferred embodiment motion stop function, and the second table is for the second preferred embodiment motion stop function (FIG. 7b).

In the first table the first column is field number, the second column is sum_diff_area[x][y], the third column is frame memory (equals the preceding same parity field sum_diff_mem[x][y]), the fourth column is mot_feedback[x][y], the fifth column is sum_of_diff[0]−sum_of_diff[1] (denoted just as "large" or "small"), and the sixth column is sum_diff_mem[x][y]. Presume gain const_a_feedback=0.5, the scene change gives sum_diff_area[x][y]=100 or 110, and the initial condition for frame memory is 25 for even parity field and 22 for the odd parity field. Integer arithmetic with round-off is used. The scene change at field #8 implies: (1) sum_diff_area

[x][y] is large only for fields #7 and #8, (2) sum_of_diff[0]−sum_of_diff[1] is positive and greater than the threshold only for fields #8 and #9, (3) the large mot_feedback[x][y] for field #9 is stopped by Motion stop, but the large mot_feedback[x][y] for field #10 is not stopped by Motion stop.

Field #7 has large sum_diff_mem[x][y] and thus correctly avoids temporal interpolation (fields#6-#8), field #8 also has large sum_diff_mem[x][y] and thus also correctly avoid temporal interpolation (fields#7-#9), and field #9 has small sum_diff_mem[x][y] due to motion stop and correctly uses temporal interpolation of fields #8-#10.

| field # | s_d_area | frame memory | mot_feed | s_d[0] − s_d[1] | s_d_mem |
|---|---|---|---|---|---|
| 0 | 10 | 25 (initial) | 13 | small − small | 23 |
| 1 | 12 | 22 (initial) | 11 | small − small | 23 |
| 2 | 8 | 23 | 12 | small − small | 20 |
| 3 | 11 | 23 | 12 | small − small | 23 |
| 4 | 9 | 20 | 10 | small − small | 19 |
| 5 | 9 | 23 | 12 | small − small | 21 |
| 6 | 12 | 19 | 10 | small − large | 22 |
| 7 | 100 | 21 | 11 | small − large | 111 |
| 8 new scene | 110 | 22 | 11 | large − small | 110 (121) |
| 9 | 10 | 111 | 56 | large − small | 10 (66) |
| 10 | 12 | 110 | 55 | small − small | 67 |
| 11 | 9 | 10 | 5 | small − small | 14 |
| 12 | 11 | 67 | 34 | small − small | 45 |
| 13 | 11 | 14 | 7 | small − small | 18 |
| 14 | 8 | 45 | 23 | small − small | 31 |
| 15 | 12 | 18 | 9 | small − small | 21 |
| 16 | 10 | 31 | 16 | small − small | 26 |
| 17 | 11 | | | small − small | |
| 18 | 9 | | | small − small | |

The same effect of not stopping the large memory for the trailing field #10 also applies with the FIG. 7b motion stop function as in the second table:

| field # | s_d_area | frame memory | mot_feed | s_d[0] − s_d[1]; s_d[1] − s_d[2] | s_d_mem |
|---|---|---|---|---|---|
| 0 | 10 | 25 (initial) | 13 | small − small; small − small | 23 |
| 1 | 12 | 22 (initial) | 11 | small − small; small − small | 23 |
| 2 | 8 | 23 | 12 | small − small; small − small | 20 |
| 3 | 11 | 23 | 12 | small − small; small − small | 23 |
| 4 | 9 | 20 | 10 | small − small; small − small | 19 |
| 5 | 9 | 23 | 12 | small − small; small − small | 21 |
| 6 | 12 | 19 | 10 | small − small; small − large | 22 |
| 7 | 100 | 21 | 11 | small − large; large − large | 111 |
| 8 new | 110 | 22 | 11 | large − large; large − small | 110 (121) |
| 9 | 10 | 111 | 56 | large − small; small − small | 10 (66) |
| 10 | 12 | 110 | 55 | small − small; small − small | 67 |
| 11 | 9 | 10 | 5 | small − small; small − small | 14 |
| 12 | 11 | 67 | 34 | small − small; small − small | 45 |
| 13 | 11 | 14 | 7 | small − small; small − small | 18 |
| 14 | 8 | 45 | 23 | small − small; small − small | 31 |
| 15 | 12 | 18 | 9 | small − small; small − small | 21 |
| 16 | 10 | 31 | 16 | small − small; small − small | 26 |
| 17 | 11 | | | small − small; small − small | |
| 18 | 9 | | | small − small; small − small | |

Thus, by expanding Motion stop activation to the next same parity fields, better quality of up-conversion image is expected. The first preferred embodiments provide the basic concept (e.g., FIG. 6a) and its example (FIGS. 7a, 7b) which allows a hardware implementation minimizing gate size and memory bandwidth. However, a generalization of the Motion stop function would have features such as:
1) The function detects a scene transition from "moving" to "still".
2) The function disables past parameters concerned with a degree of motion.
3) The function activates the function 2) using the function 1) to a target image or successive images.

5A. Preliminary Field Edge Detection Discussion

Figure 9A:
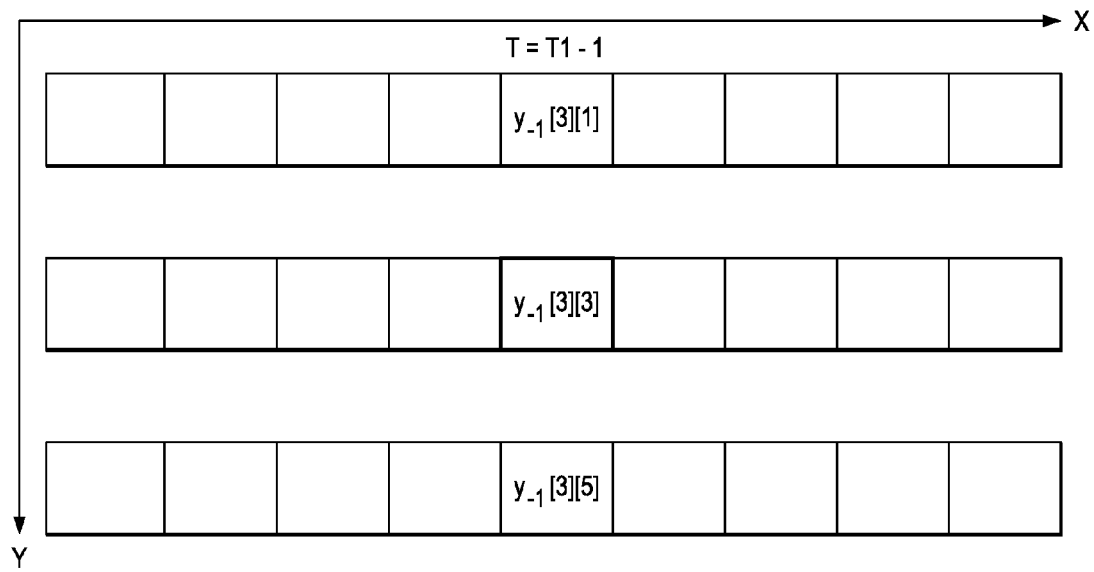
FIGS. 9a-9c show field notation.
Figure 9B:
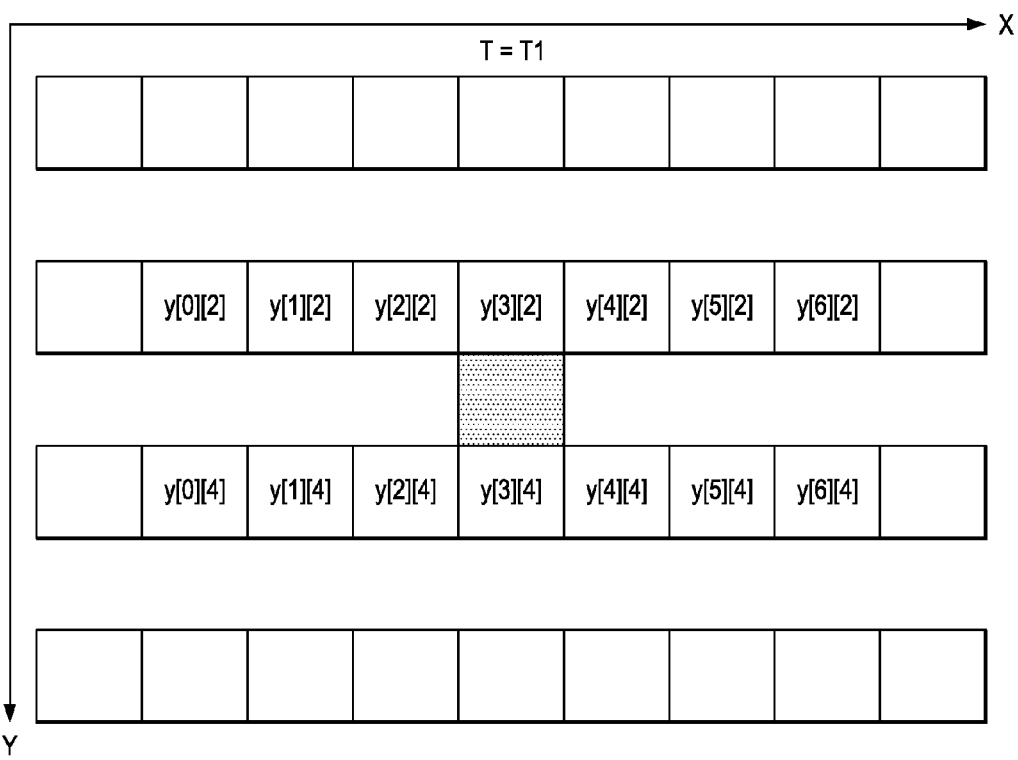
Figure 9C:
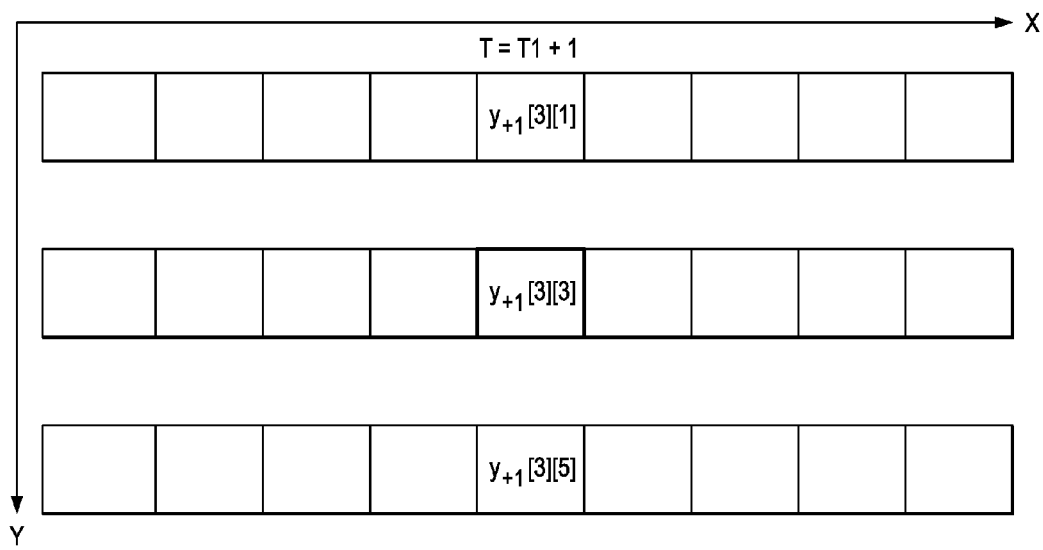

FIGS. 9a-9c show notation to help explain the problems of the prior art plus the first preferred embodiment methods to overcome these problems. In particular, FIGS. 9a-9c represent a portion of consecutive fields about a pixel to be interpolated. FIG. 9b shows the current field which correspond to the time t =t1 and with the shaded pixel in the center of FIG. 9b as the pixel being interpolated; FIG. 9a shows the previous field (t=t1−1), and FIG. 9c the next field (t=t1+1). Note the alternating parity of the fields in FIGS. 9a-9c. The following description provides pseudo-code expression for calculations to interpolate the shaded (to be interpolated) pixel. The pixels with bold outline in FIGS. 9a and 9c have the same position as the shaded pixel but are in opposite parity fields. The variable y[j][k] represents the luminance value in the current field at the (j,k) pixel site with the shaded pixel at j=3, k=3. Analogously, the variables $y_{-i}[j][k]$ and $y_{+i}[j][k]$ represent luminance values at the (j,k) pixel site in the preceding and next fields, respectively. In the following example, when luminance is black, gray, or white, the value of a variable is defined as 0, 0.5, or 1, respectively. That is, the y[j][k] and $y_{\pm i}[j][k]$ variables may be normalized to the range 0 to 1.

Figure 14C:
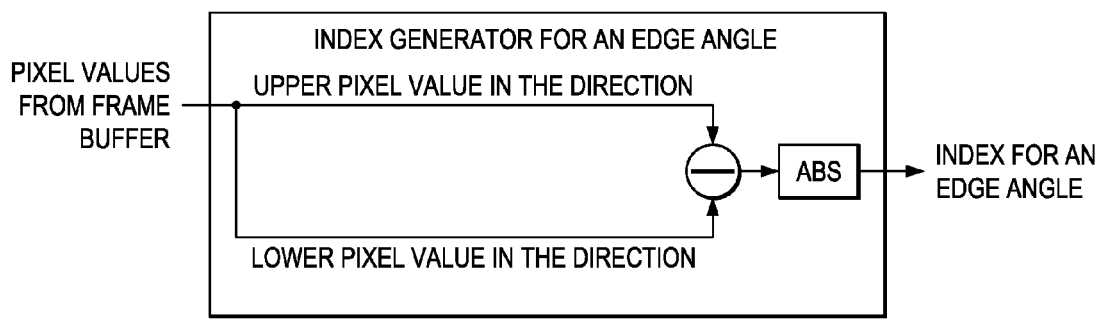
Figure 15A:
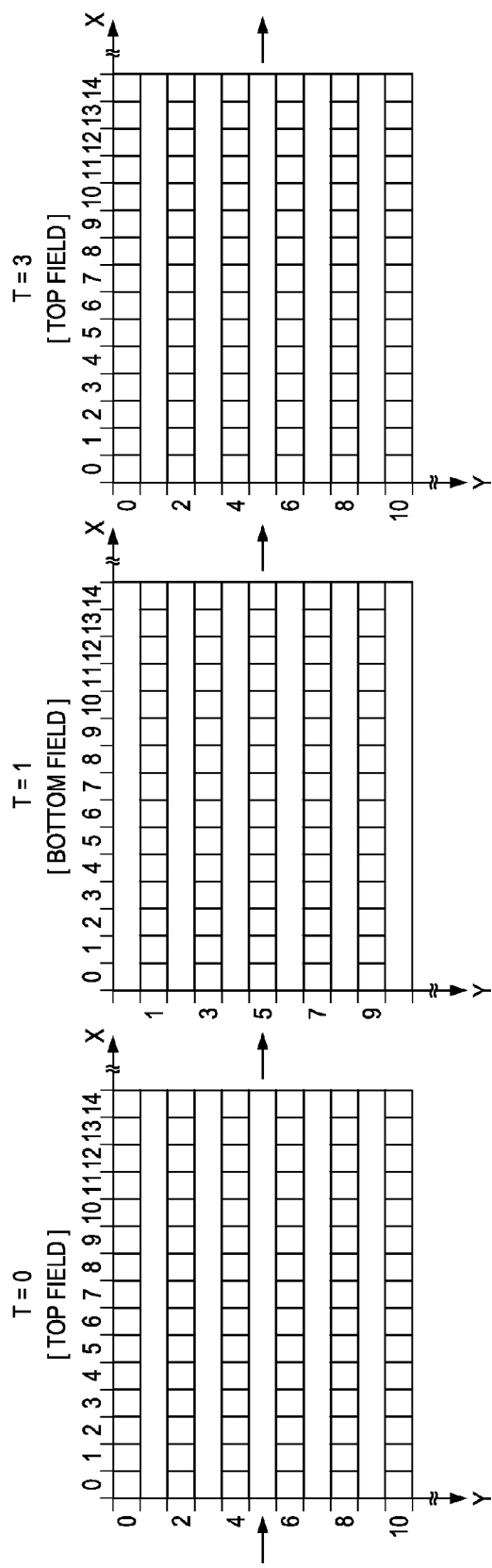
FIGS. 15a-15b illustrate interlace and progressive formats.
Figure 16A:
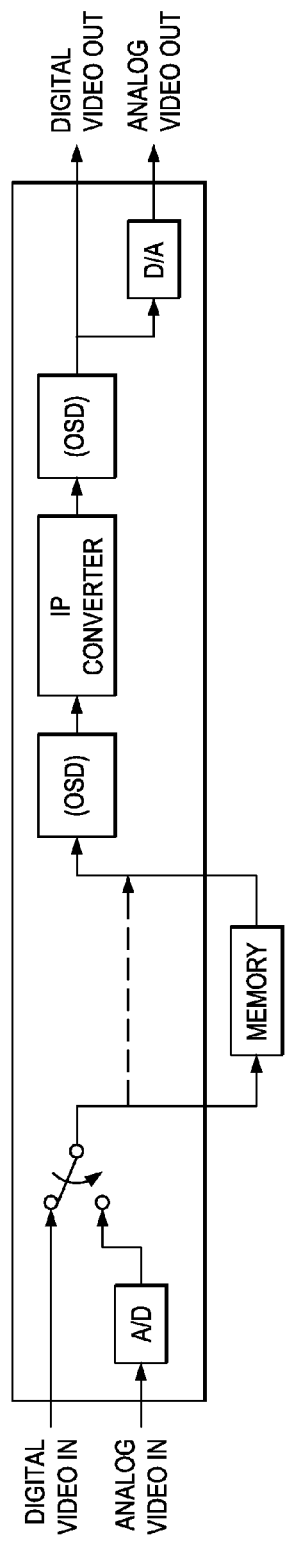
FIGS. 16a-16c show systems which use interlace-to-progressive conversion.
Figure 15B:
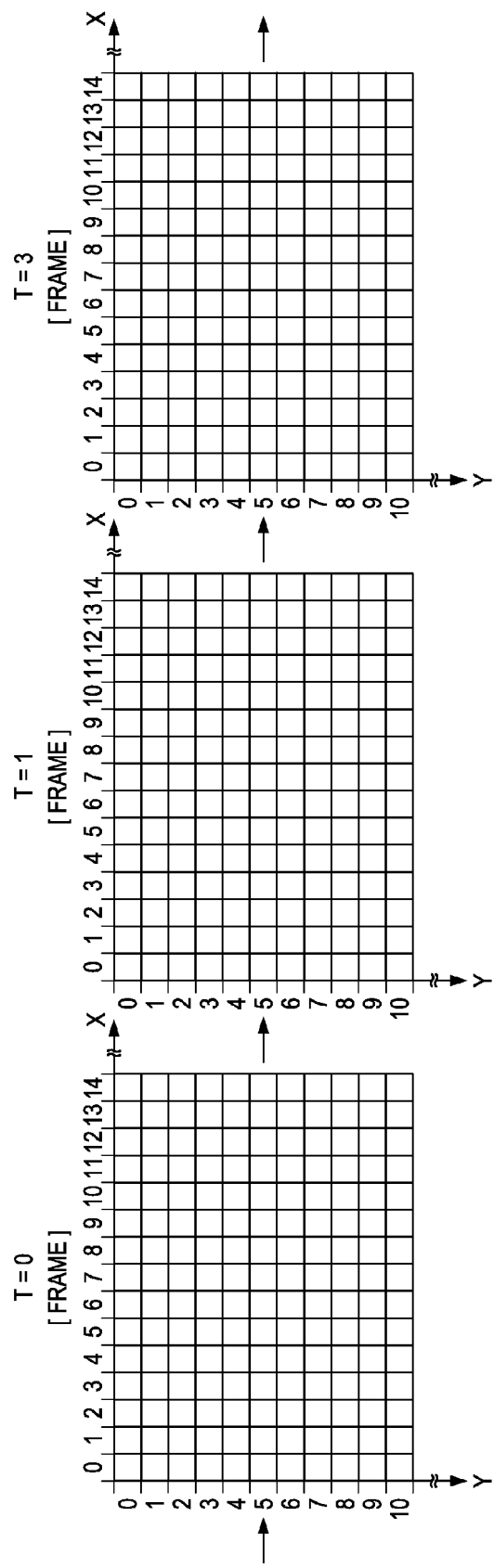
Figure 16B:
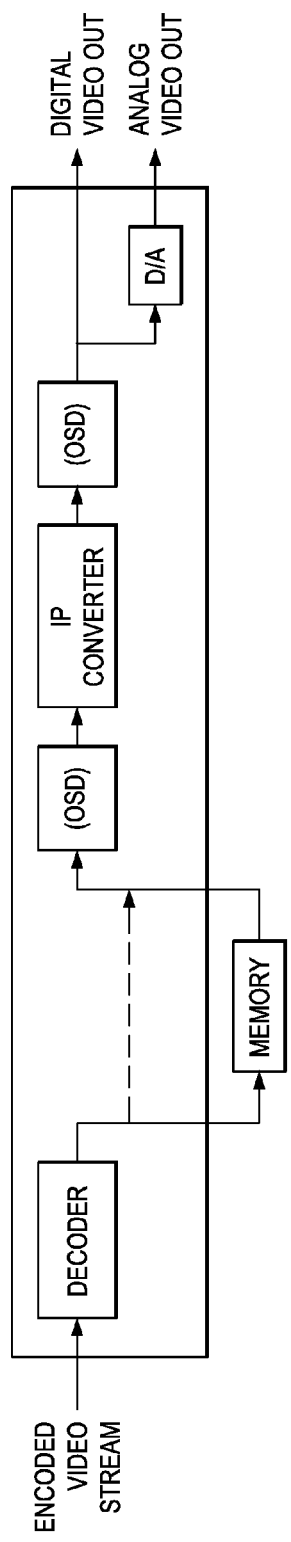
Figure 16C:
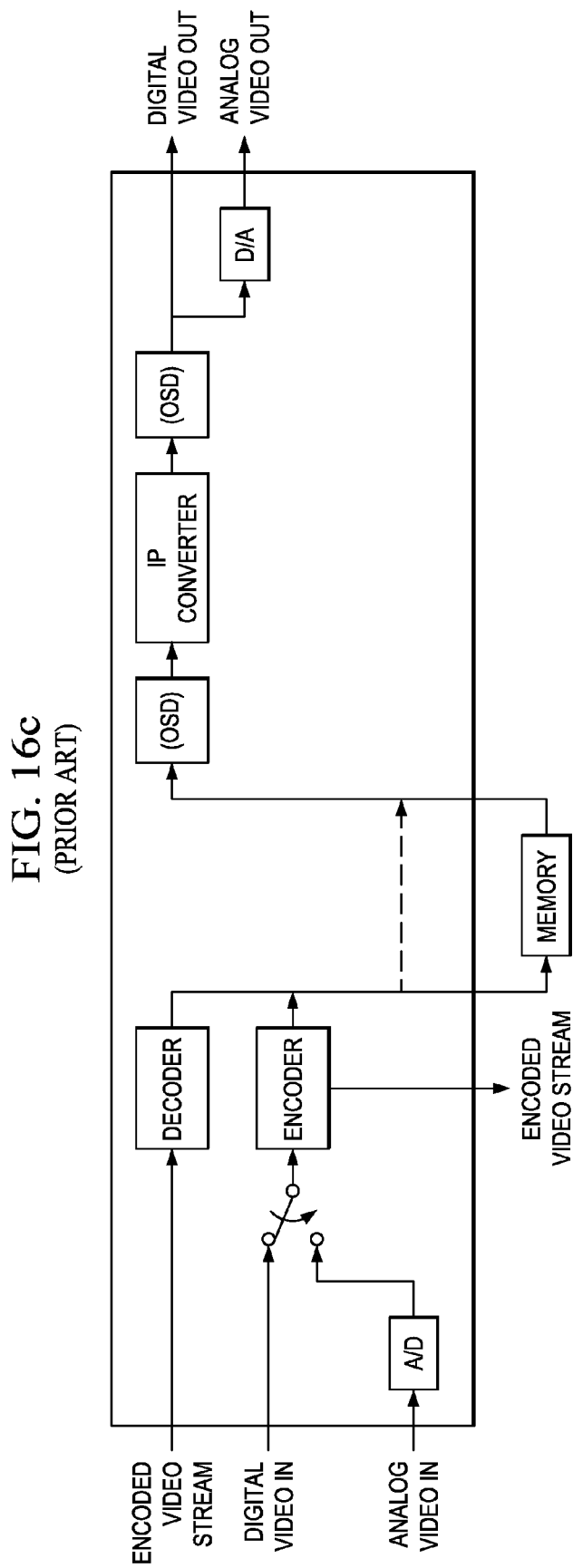

FIG. 14c shows a schematic diagram of the conventional index generator for an edge angle. The difference between the upper and lower pixel values in the direction is calculated. The "ABS" block calculates an absolute value of the difference and outputs as the index. Note that the angle associated with an edge is the direction of the vector normal to the edge in the coordinate system with x increasing to the right and y increasing downwards.

Here, three direction detector cases (−45°, 0° and +45°, where 0° means a vertical edge) are used. Indexes for −45°, 0° and +45° are calculated as following pseudocode;

index_for_−45°=|y[2][2]−y[4][4]| index_for_0°=|y[3][2]−y[3][4]| index_for_+45°=|y[4][2]−y[2][4]

In the calculations, when the two pixels in a direction have the same luminance value or color value, the index becomes 0. Therefore, the direction determiner chooses the direction that has the smallest index values, i.e., index_min = minimum value of index_for_-45°, index_for_0°, and index_for_+45°
if (index_min = index_for_-45°)
    direction = -45°
else if (index_min = index_for_0°)
    direction = 0°
else
    direction = +45°

As an example, FIG. 14d illustrates a vertical thin line (shaded pixels) in a field and the above calculation, where the conventional method causes a problem. The center pixel (with heavy outline) is the one being interpolated. The solid line segments represent absolute value calculation of the difference of the two pixel values at the ends of the line segments. The direction determiner can not choose the direction correctly because the indexes for all three directions have the same value "zero" because the pair of pixel values in each calculation are equal. For the above pseudocode case, "direction =−45°" is output by the edge-direction detector though the edge direction is 0°. Therefore the direction detector needs to be improved.

The Motion_level is calculated by the motion detector using the previous and next fields using a typical conventional method as follows;

$$\text{Motion\_level} = |y_{-1}[3][1] - y_{+1}[3][1]| + \qquad \text{(Eq. 1)}$$
$$|y_{-1}[3][3] - y_{+1}[3][3]| +$$
$$|y_{-1}[3][5] - y_{+1}[3][5]|$$

When Motion_level>Th_motion, where Th_motion is a threshold value, the selector selects the output of the moving-pixel generator. In this example, Th_motion=0 is used. Of course, noise in the signal would suggest a small positive threshold, such as Motion_level=0.05 for y[j][k] in the range from 0 to 1.

The output of the inter-field interpolator for luminance (pixel_inter_ip_y) is calculated by the field averaging algorithm, i.e., $$\text{pixel\_inter\_ip\_}y = (y_{-1}[3][3] + y_{+1}[3][3])/2 \qquad \text{(Eq. 2)}$$

The output of the intra-field interpolator for luminance (pixel_dir_ip_y) is calculated as follows;

if (direction=−45°) pixel_dir_ip_y=(y[2][2]+y[4] [4])/2 else if (direction=0°) pixel_dir_ip_y=(y [3][2]+y[3][4])/2 else pixel_dir_ip_y=(y[4][2]+ y[2][4])/2 (Eq. 3)

Intra-field and inter-field interpolation processing to calculate hue, e.g., Cb (luminance-blue) and Cr (luminance-red) values for color images are calculated in an analogous manner to the processing for luminance.

Figure 10A:
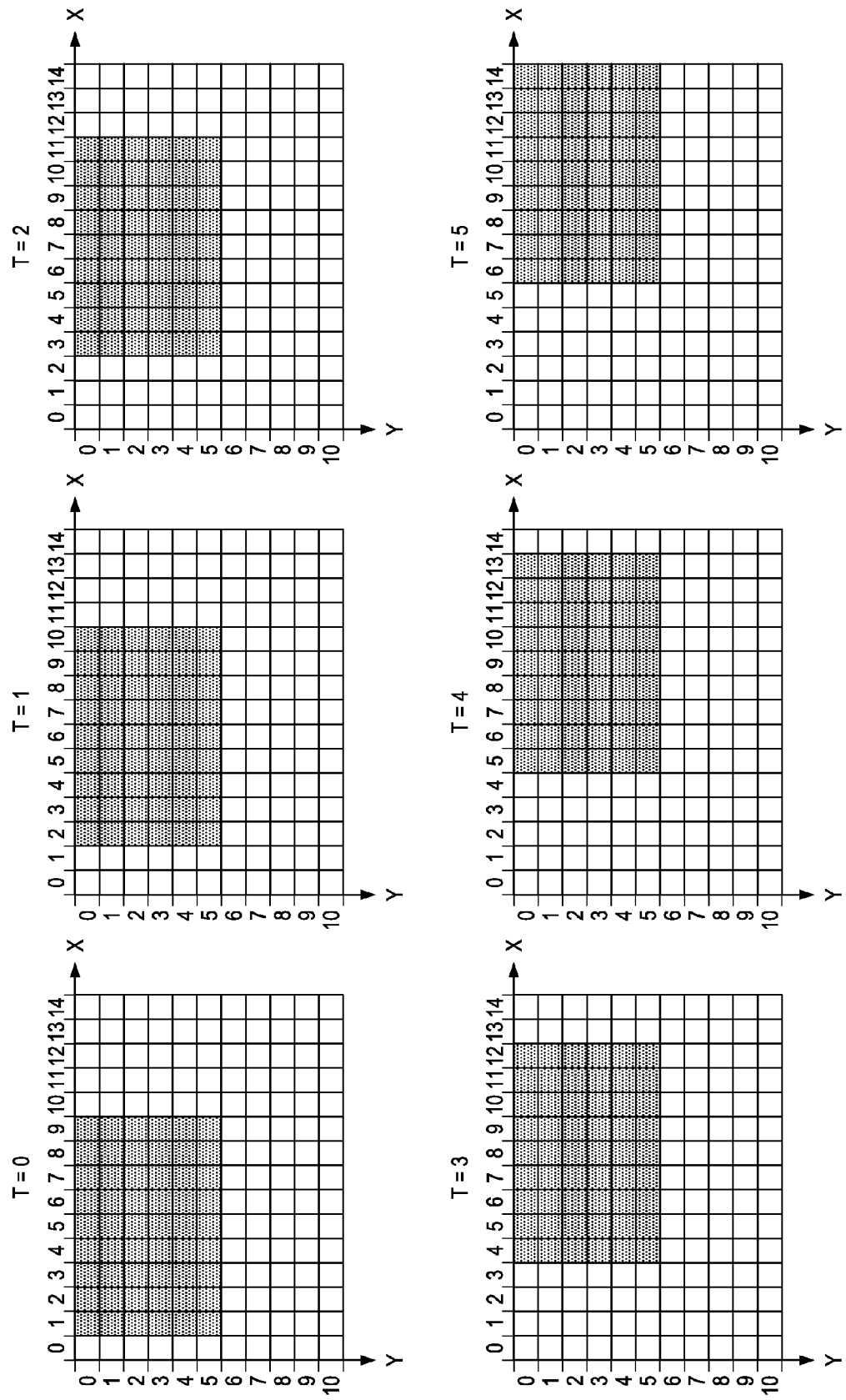

FIG. 10a shows an original sample image, which is a part of whole image area and the image extends with white pixels to x<0 in addition to x>14 or y>10. A black box is moving from the left side to the right side on the still white background. The color of the black box is not uniform, though in the figure the color is printed uniformly.

Figure 10B:
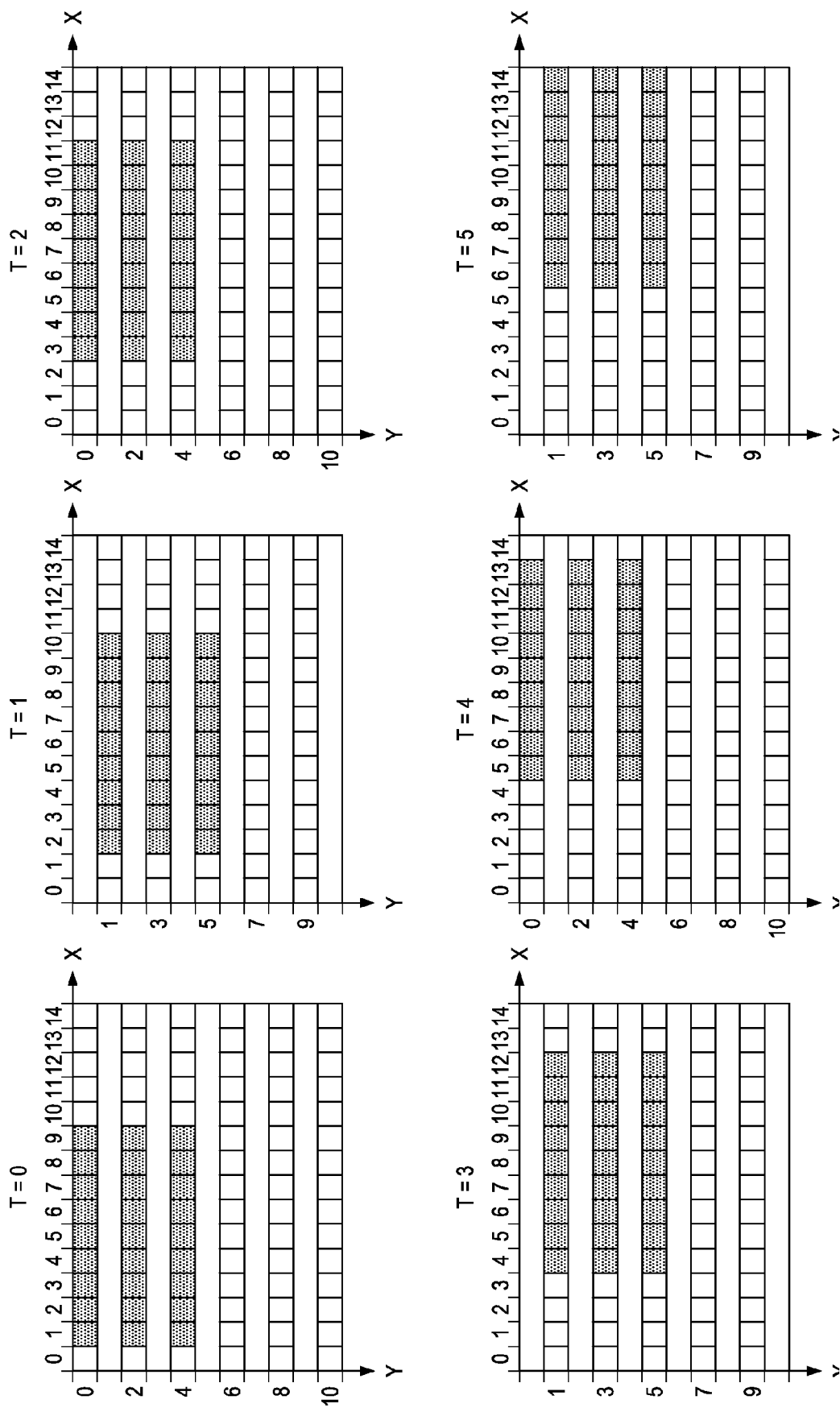

FIG. 10b shows interlaced video fields of the above original sample image, where "odd lines (i.e., y=1, 3, . . .) at t=even" and "even lines at t=odd" are removed.

Figure 10C:
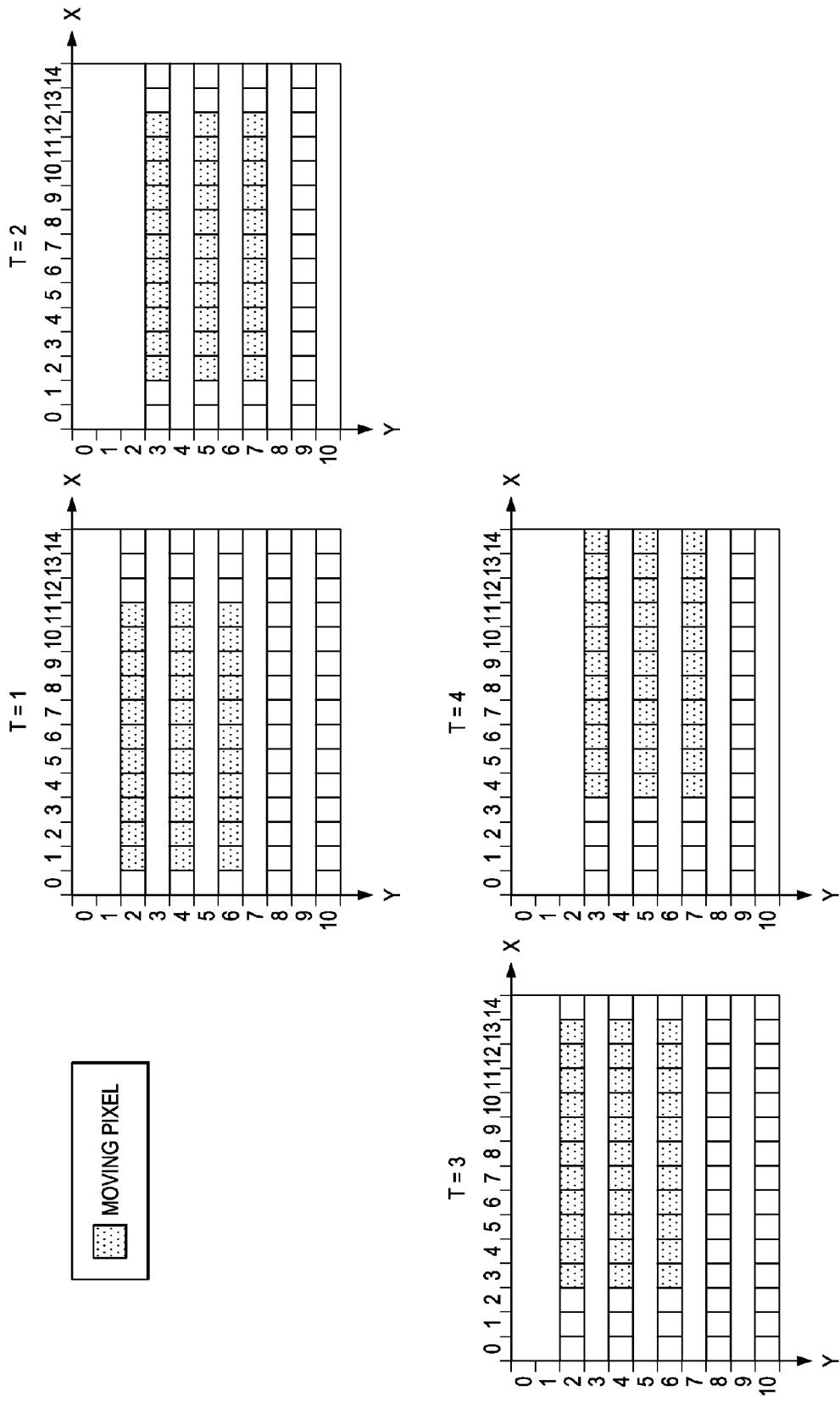

FIG. 10c shows the output of the motion detector, where filled pixels are judged as moving pixels, i.e., Motion_level>Th_motion=0 and the output of the intra-field interpolator is selected. At the pixels of Motion_level≦Th_motion, the output of the inter-field interpolator is used. In order to understand the detected result, note that the black color is not uniform in the area. Motion detector results are not drawn for y=0 and 1 because data of y=−2 and −1 are required to calculate them but not defined in this explanation. The results of motion detection for t=0 and 5 are also missing because of no data for t=−1 and 6.

Output of the conventional IP conversion is drawn in FIG. 10d. The problem of the conventional IP converter is line flickering occurs at the moving lateral edges. Color of pixels at y=5 below the box is {black at t=odd} and {gray at t=even}, though those are always black in the original image. Color of pixels at y=6 below the box is "gray at t=odd" and "white at y=even", though always white in the original. The color at y=5 and 6 changes at every progressive frame, i.e., 60 times per second, which human eyes recognize as flickering of the moving lateral edge.

5B. First Preferred Embodiments Field Edge Detection

Figure 8A:
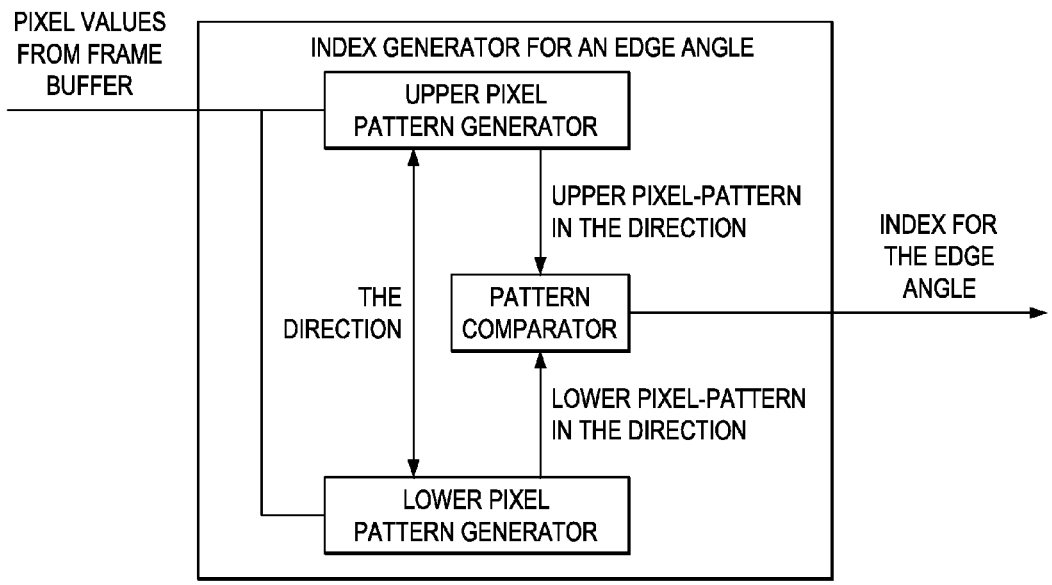

The preferred embodiment methods detect the edge direction with improved accuracy. FIG. 8*a* shows a schematic diagram of a first preferred embodiment index generator for an edge angle. Let's consider the angle #0. The index generator for the edge angle #0 consists of the upper and lower pixel pattern generators in the angle #0 and the pattern comparator. The pixel pattern generators generate pixel patterns consisting of more than a single pixel. The generated pixel pattern varies with the direction being detected; see FIG. 8*e*. The output of the pattern comparator varies with similarities between the upper and lower patterns.

Figure 8B:
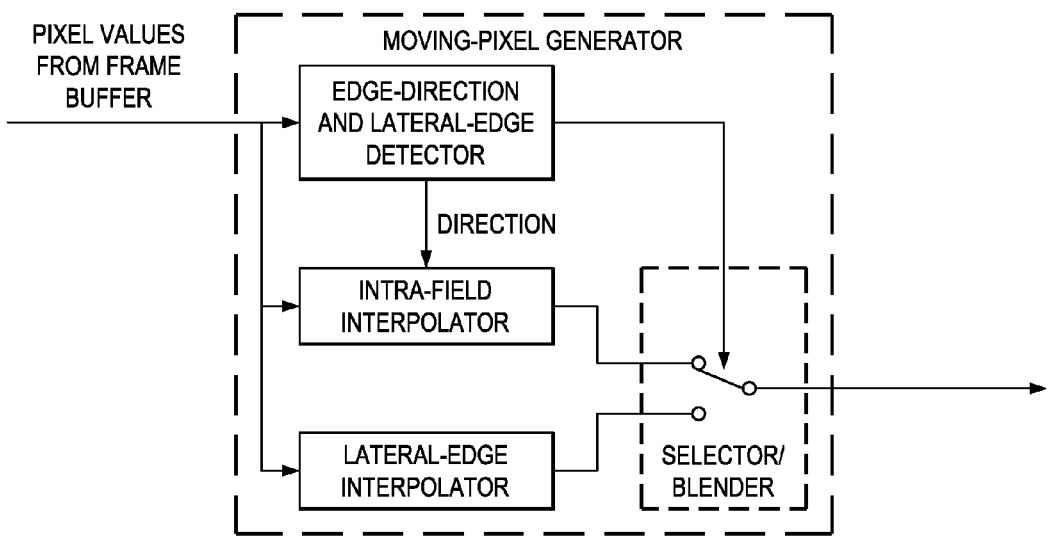

FIG. 8*b* shows a schematic diagram of a preferred embodiment moving-pixel generator; the moving-pixel generator would be used in an IP converter as in FIG. 14*a*. The moving-pixel generator consists of an edge-direction and lateral-edge detector, intra-field interpolator, lateral-edge interpolator and selector/blender blocks. The detector examines if the target pixel, i.e., the pixel being interpolated, is at a lateral-edge in addition to the edge-direction detection. The detector calculates an index for the probability that the target pixel is on a lateral-edge. The lateral-edge interpolator generates a pixel value when the pixel is on a lateral-edge. The selector/blender block selects or blends the outputs of intra-field and lateral-edge interpolators. When the lateral-edge probability is high, the output of the lateral-edge interpolator is chosen or the blending factor of the lateral-edge interpolator is large instead of the output of the intra-field interpolator, and vice-versa.

Figure 8C:
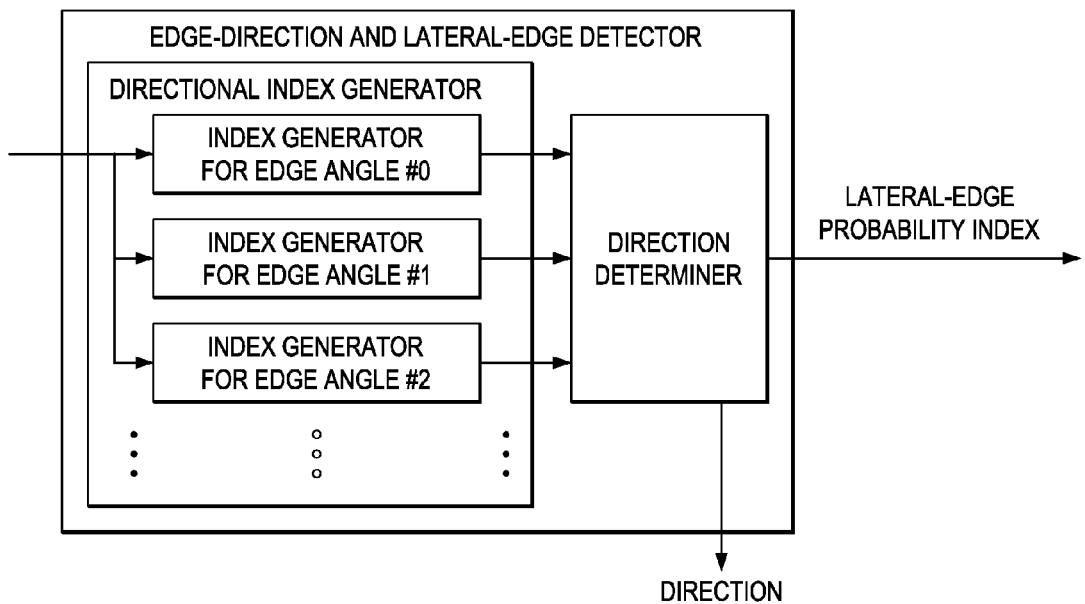

FIG. 8*c* shows a schematic diagram of the first preferred embodiment edge-direction and lateral-edge detector. The "edge-direction and lateral-edge detector" is close to the conventional "edge-direction detector" but in the "edge-direction and lateral-edge detector" the direction determiner also outputs a lateral-edge probability index.

Figure 8D:
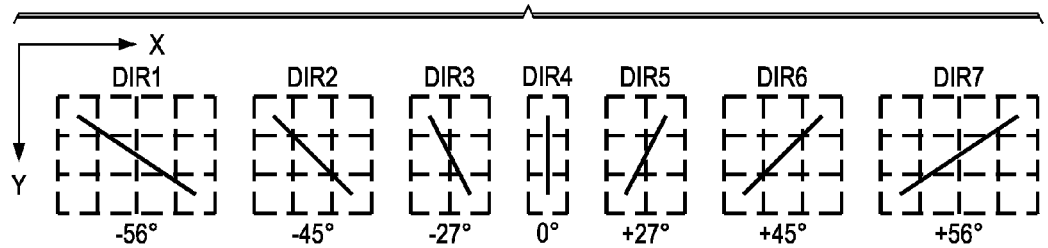

FIG. 8*d* illustrates the directions Dir1~Dir7 detected in the first preferred embodiment. FIG. 8*e* illustrates the pixel patterns. The shaded center pixel is the one being interpolated. The pixel patterns marked as "U" and "L" are the pixel patterns generated by the upper and lower pixel pattern generators, respectively. When the upper and lower pixel patterns do not match, the pattern comparator outputs a large value as the index, and vice-versa. In the pattern comparator, the indexes for each direction (sum_dir[]) are calculated as follows;

Index for Dir1:

$$\text{sum\_dir}[1] = |y[0][2] - y[3][4]| + $$
$$|y[1][2] - y[4][4]| + $$
$$|y[2][2] - y[5][4]| + $$
$$|y[3][2] - y[6][4]|$$

Index for Dir2:

$$\text{sum\_dir}[2] = |y[1][2] - y[3][4]| + $$
$$|y[2][2] - y[4][4]| + $$
$$|y[3][2] - y[5][4]|$$

Index for Dir3:

$$\text{sum\_dir}[3] = (|y[1][2] - y[2][4]|/2) + $$
$$|y[2][2] - y[3][4]| + $$
$$|y[3][2] - y[4][4]| + $$
$$(|y[4][2] - y[5][4]|/2)$$

Index for Dir4:

$$\text{sum\_dir}[4] = |y[2][2] - y[2][4]| + $$
$$|y[3][2] - y[3][4]| + $$
$$|y[4][2] - y[4][4]|$$

Index for Dir5:

$$\text{sum\_dir}[5] = (|y[2][2] - y[1][4]|/2) + $$
$$|y[3][2] - y[2][4]| + $$
$$|y[4][2] - y[3][4]| + $$
$$(|y[5][2] - y[4][4]|/2)$$

Index for Dir6:

$$\text{sum\_dir}[6] = |y[3][2] - y[1][4]| + $$
$$|y[4][2] - y[2][4]| + $$
$$|y[5][2] - y[3][4]|$$

Index for Dir7:

$$\text{sum\_dir}[7] = |y[3][2] - y[0][4]| + $$
$$|y[4][2] - y[1][4]| + $$
$$|y[5][2] - y[2][4]| + $$
$$|y[6][2] - y[3][4]|$$

FIG. 8*f* illustrates the above calculation. The shaded center pixel is the one being interpolated. The solid and dotted lines represent absolute calculation of the difference. The dotted lines mean the absolute values are divided by two.

Figure 8G:
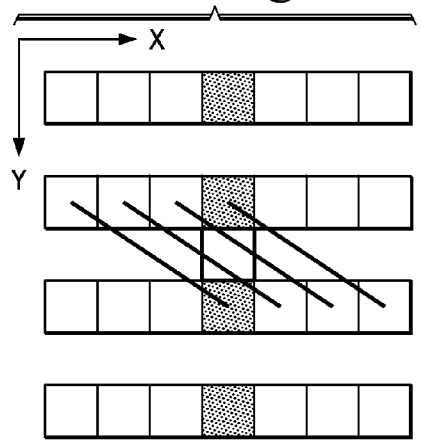

Basically, three pixels on the upper and lower lines are used as the pixel pattern. For Dir3 and Dir5, the upper and lower three pixel pattern has some offset from the center position, so a 4-pixel pattern is used and the absolute values from the outer pixels are divided by two to be equivalent to a three pixel pattern. For Dir1 and Dir7, a 4-pixel pattern is also used to include the two pixels adjacent the target pixel, and dividing by 2 is not performed in order to clearly detect the vertical thin line illustrated in FIGS. 8*g*-8*h*. FIG. 8*g* shows application of the index generator for Dir1. Note that if i=2, 3, . . . , 6, then sum_dir[i] lies in the range from 0 to 3 for y[j][k] in the range from 0 to 1, and if i=1 or 7, then sum_dir[i] is in the range 0 to 4. In the case of the thin vertical line in FIG. 8*g*, sum_dir[4] should be small and sum_dir[i] (i=1-3 and 5-7) should be sufficiently larger than sum_dir[4]. For FIG. 8g, sum_dir[4]=0 and sum_dir[i]=2 for i=1-3 and 5-7.

Figure 8H:
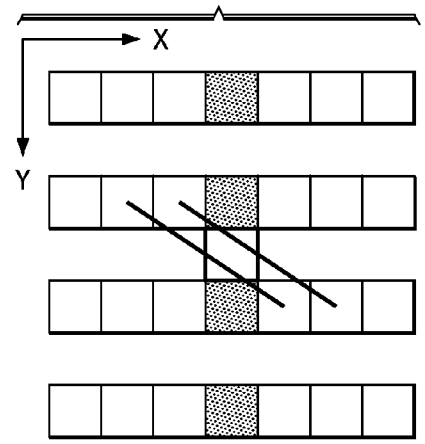
Figures 8E, 8F:
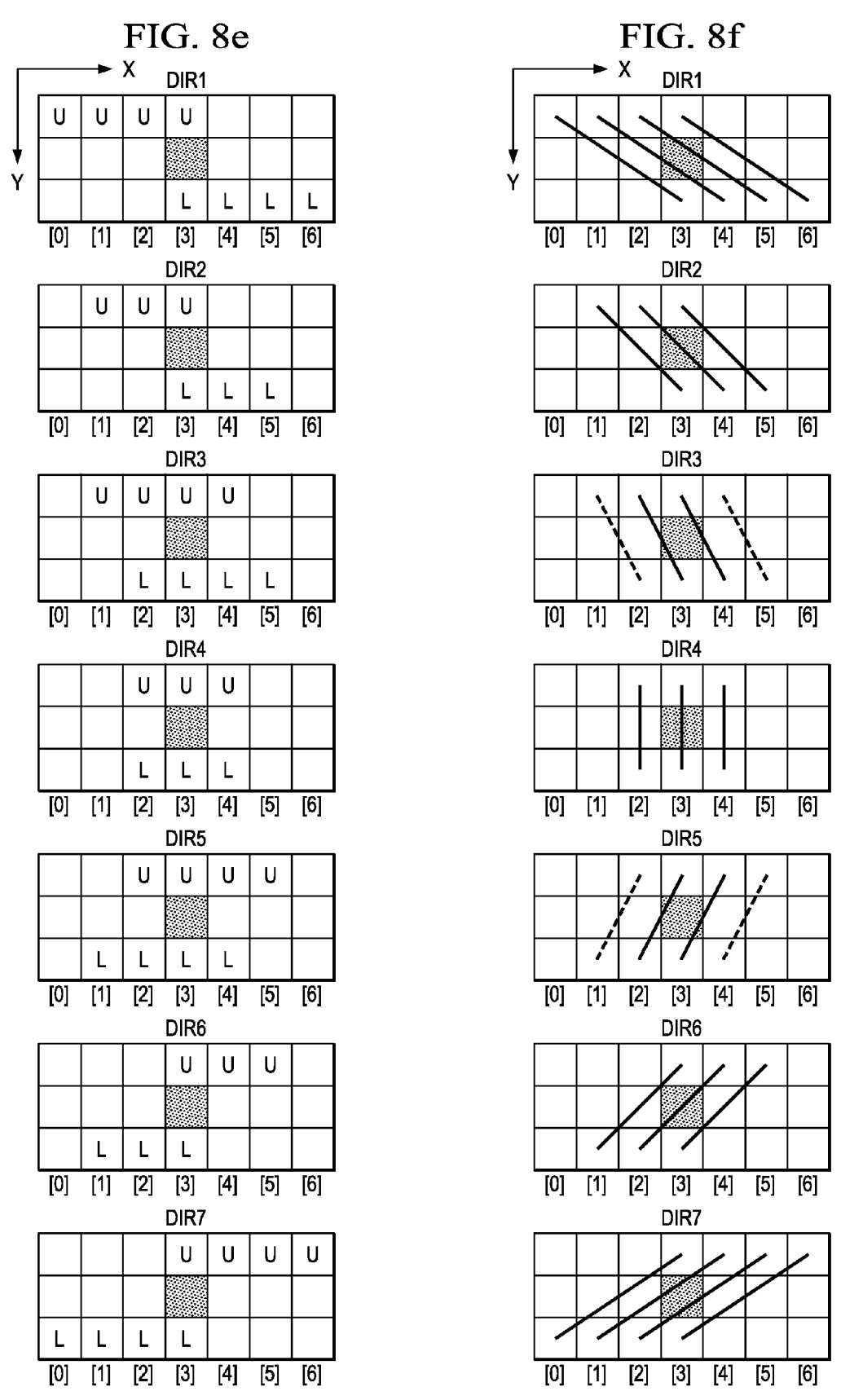

Also, a two-line pattern (two pixels each in upper and lower patterns) does not work for the vertical thin line as shown in FIG. 8h. With a two-line pattern, the index for Dir1, Dir4 and Dir7 would all have the same index value (i.e., =0).

In general, the closer to the horizontal line the edge is, the larger pattern, i.e., more pixel width, is required to detect the edge.

The direction determiner decides the direction as follows;

```
sum_dir_min = minimum value of sum_dir[1], . . . , sum_dir[7]
if      (sum_dir_min = sum_dir[4])
    direction = Dir4
else if (sum_dir_min = sum_dir[5])
    direction = Dir5
else if (sum_dir_min = sum_dir[3])
    direction = Dir3
else if (sum_dir_min = sum_dir[6])
    direction = Dir6
else if (sum_dir_min = sum_dir[2])
    direction = Dir2
else if (sum_dir_min = sum_dir[7])
    direction = Dir7
else
    direction = Dir1
```

In this embodiment, the intra-field interpolator is implemented as follows;

```
if (direction = Dir1)
    ave_dir_y = ((y[1][2] + y[4][4])/2 + (y[2][2] + y[5][4])/2)/2
else if (direction = Dir2)
    ave_dir_y = (y[2][2] +y[4][4])/2
else if (direction = Dir3)
    ave_dir_y = ((y[2][2] + y[3][4])/2 + (y[3][2] + y[4][4])/2)/2
else if (direction = Dir4)
    ave_dir_y = (y[3][2] +y[3][4])/2
else if (direction = Dir5)
    ave_dir_y = ((y[3][2] + y[2][4])/2 + (y[4][2] + y[3][4])/2)/2
else if (direction = Dir6)
    ave_dir_y_8[6] = (y[4][2] + y[2][4])/2
else // direction = Dir7
    ave_dir_y = ((y[4][2] + y[1][4])/2 + (y[5][2] + y[2][4])/2)/2
pixel_dir_ip_y = ave_dir_y
```

Figure 8I:
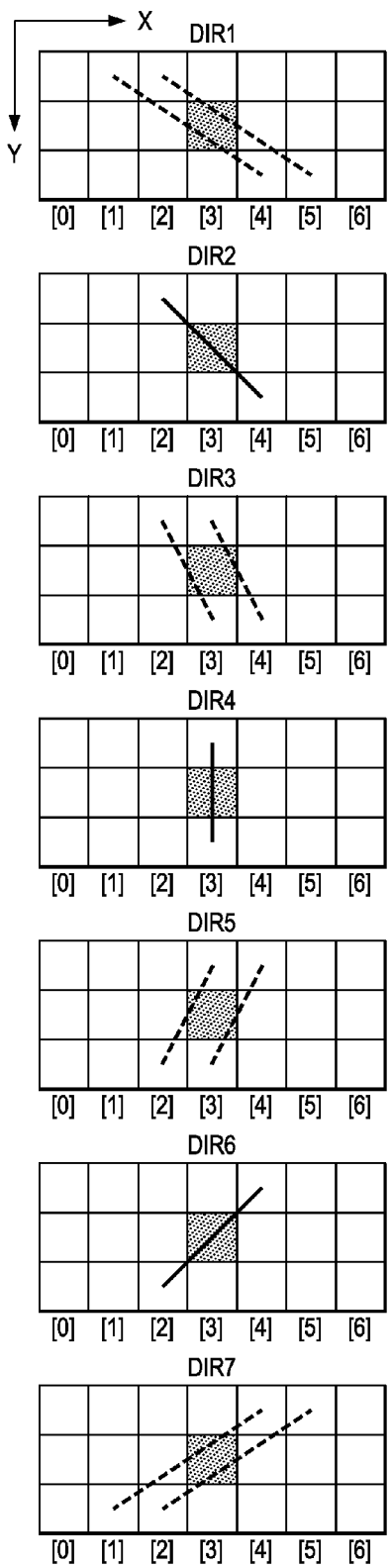

The pixel values on the upper and lower lines in the detected direction are averaged. FIG. 8i illustrates the above calculation. The solid and dotted lines mean averaging the two pixel values. The dotted lines mean the two averaged values are averaged again (second averaging) because the center of the averaged two pixels does not align to the center of the target pixel being interpolated. To eliminate the offset, the second averaging is performed.

Interpolation processing to calculate hue, e.g., Cb (luminance—blue) and Cr (luminance—red) values for color images is done in an analogous manner to the processing for luminance using a direction detected by luminance data.

All functions of the preferred embodiment edge-direction detector described above are included in the preferred embodiment edge-direction and lateral-edge detector of FIG. 8c. The direction determiner has an additional function, i.e., a lateral-edge probability index is calculated. And "sum_dir_min" is used for the index in this embodiment, i.e., the difference between the upper and lower pixel patterns; recall that sum_dir_min lies in the range from 0 to 3 for y[j][k] in the range from 0 to 1.

Intra-field interpolation causes flicker noise as described above, so inter-field interpolation is used for the lateral-edge interpolation. The output of the lateral-edge interpolator for luminance (pixel_lateral_ip_y) is calculated by the following field averaging over time algorithm, $$\text{pixel\_lateral\_ip\_y} = (y_{-1}[3][3] + y_{+1}[3][3])/2$$

Cb (luminance—blue) and Cr (luminance—red) values for color images are calculated in an analogous manner to the processing for luminance.

When a selector is implemented in the selector/blender block, the luminance output of the moving pixel generator (out_mov_ip_y) is determined as follows;

```
if (sum_dir_min<Th_lateral_edge) out_mov_ip_
    y=pixel_dir_ip_y else if
    (sum_dir_min=Th_lateral_edge) out_mov_ip_
    y=pixel_dir_ip_y or pixel_lateral_ip_y (which
    depends on implementation) else out_mov_ip_
    y=pixel_lateral_ip_y
``` where pixel_dir_ip_y is the output of the inter-field interpolator for luminance.

Figure 8J:
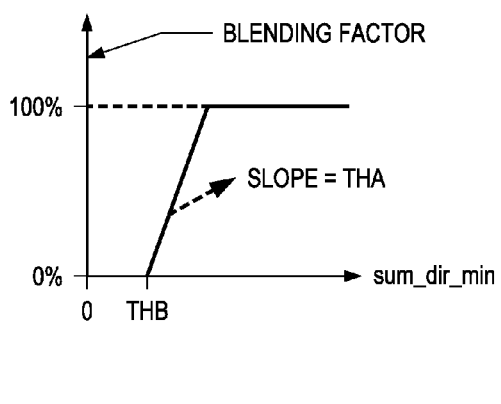

When a blender is implemented in the selector/blender block, the blender works as follows to generate the output of the moving pixel generator. The blending factor (blendingFactor) is generated using the function illustrated in FIG. 8j: "thA" is the slope and "thB" is the intercept. "thA" and "thB" are the tuning parameters for the blending. For example, "thA=1" and "thB=24" work well for 8-bit logic (i.e., when y[j][k] lies in the range 0 to 255, sum_dir_min/4 is used as the horizontal axis (because the maximum value of sum_di_min is 4*255), and blendingFacor=255 represents 100%).

The outputs of the intra-field and lateral-edge interpolators are blended as follows;

$$\text{out\_mov\_ip\_y} = \text{pixel\_dir\_ip\_y}*(100-\text{blendingFactor})/100 + \text{pixel\_lateral\_ip\_y}*(\text{blendingFactor})/100$$

where blendingFactor is expressed in percent.

Cb (luminance—blue) and Cr (luminance—red) values for color images are calculated in an analogous manner to the processing for luminance.

The previous interlaced sample image shown in FIGS. 10a-10d is used here to explain the effect of the preferred embodiment. The conventional motion detector and still pixel generator described in the foregoing are used. A selector is used for the selector/blender block in the moving pixel generator instead of a blender. Th_lateral_edge is low enough for the selector to select the output of the intra-field interpolator only when sum_dir_min is less than or equal to 4 times "variation of the filled black colors of the sample image". In this example, variation of the filled black colors of the sample image are enough smaller than the color difference between black (0) and gray (0.5).

Figure 11A:
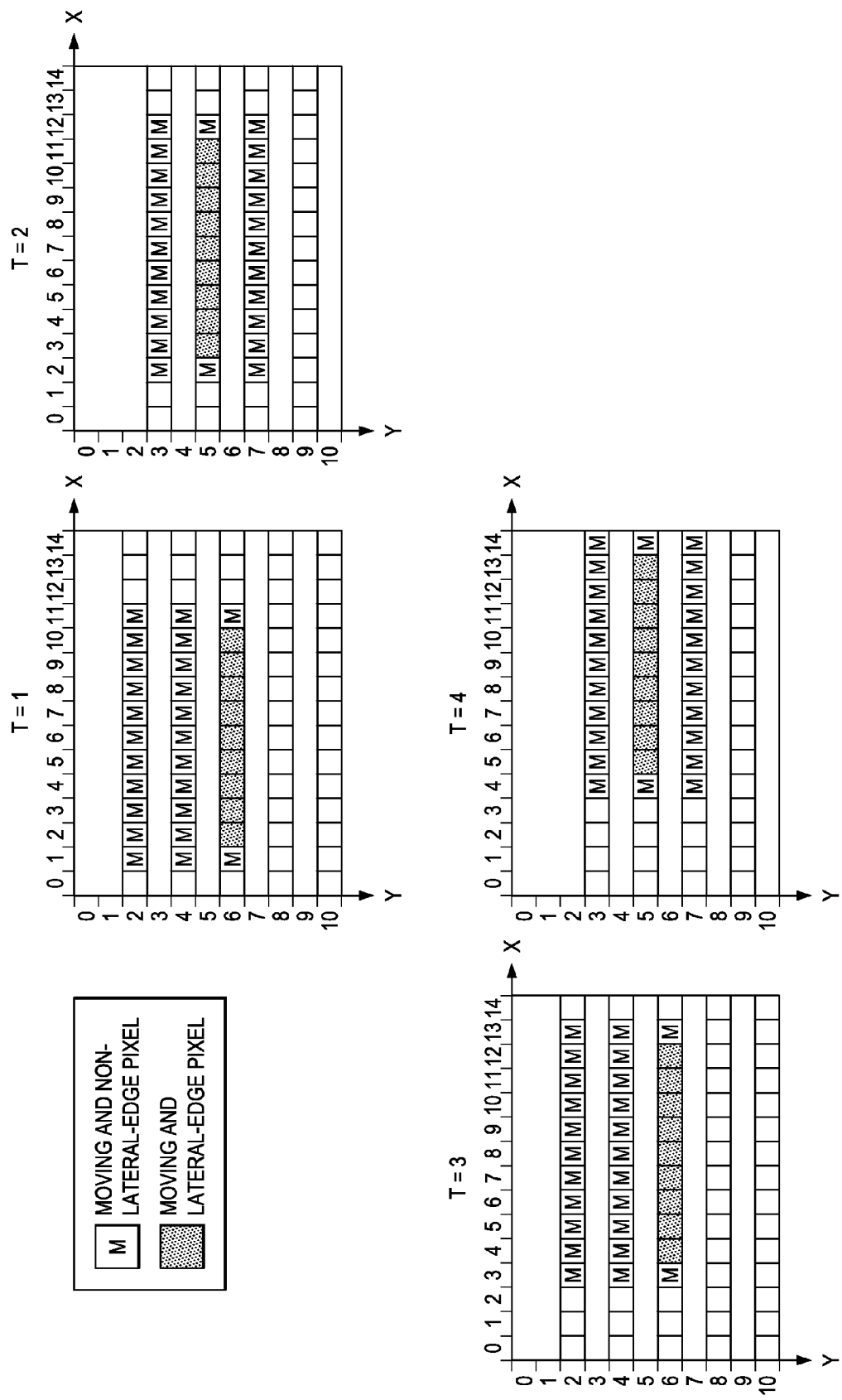

FIGS. 11a-11b shows the results of the motion detection and lateral-edge detection. The pixels marked as "M" are the ones that are Motion_level is not 0 and are not on the lateral-edge, i.e., the output of the intra-field interpolator is selected as that of the IP converter. The filled pixels are Motion_level is not 0 and are on the lateral-edge, i.e., the output of the lateral-edge interpolator is selected as that of the IP converter.

At t=even, the IP converted image is same as the original. At t=odd, the error from the original progressive source is only the bottom corner pixels of the moving box. Thus the preferred embodiment greatly reduces flicker noise at the moving lateral edges.

6A. Uniformity Blending Preliminary Discussion

FIGS. 4a-4e show notation to help explain prior art problems plus preferred embodiment methods to overcome these problems. In particular, FIGS. 4a-4c represent a portion of consecutive fields about a pixel to be interpolated: FIG. 4c shows the current field at time t=t1 and with the shaded pixel in the center of FIG. 4c of t=t1 as the pixel being interpolated; FIG. 4a shows the second previous field (t=t1−2), FIG. 4b the previous field (t=t1−1), FIG. 4d the next field (t=t1+1), and FIG. 4e the second next field (t=t1 +2). Note the alternating parity of the fields in FIGS. 4a-4e. The following description provides pseudo-code expression for calculations to interpolate the shaded (to be interpolated) pixel. The pixels with bold outline in FIGS. 4b and 4d have the same position as the shaded pixel but are in opposite parity fields. The variables y[i][j][k] represent luminance values in the ith field at the (j,k) pixel site with i=0 corresponding to t=t1−2, i=1 to t=t1−1, and so forth, and the shaded pixel at j=2, k=2 is the interpolation target. In the following example, when luminance is black, gray, or white, the values of the variable are defined as 0, 0.5, or 1, respectively. That is, the y[i][j][k] variables may be normalized to the range 0 to 1.

FIG. 14e is a schematic diagram of a conventional motion detector. When the current field is a top-field, the opposite field is a bottom-field, and vice-versa. Motion levels calculated from the current and opposite fields are summed up and output to the blender as Motion_level.

The motion detector calculates the color difference between two fields. The outputs of the Motion_level calculator from the current (Motion_level_c) and opposite (Motion_level_o) fields are calculated as follows;

$$\begin{aligned}\text{Motion\_level\_c} = &|y[0][0][1] - y[2][0][1]| + \\ &|y[0][1][1] - y[2][1][1]| + \\ &|y[0][2][1] - y[2][2][1]| + \\ &|y[0][3][1] - y[2][3][1]| + \\ &|y[0][4][1] - y[2][4][1]| + \\ &|y[0][0][3] - y[2][0][3]| + \\ &|y[0][1][3] - y[2][1][3]| + \\ &|y[0][2][3] - y[2][2][3]| + \\ &|y[0][3][3] - y[2][3][3]| + \\ &|y[0][4][3] - y[2][4][3]|\end{aligned}$$

$$\begin{aligned}\text{Motion\_level\_o} = &|y[1][0][0] - y[3][0][0]| + \\ &|y[1][1][0] - y[3][1][0]| + \\ &|y[1][2][0] - y[3][2][0]| + \\ &|y[1][3][0] - y[3][3][0]| + \\ &|y[1][4][0] - y[3][4][0]| + \\ &|y[1][0][2] - y[3][0][2]| + \\ &|y[1][1][2] - y[3][1][2]| + \\ &|y[1][2][2] - y[3][2][2]| + \\ &|y[1][3][2] - y[3][3][2]| + \\ &|y[1][4][2] - y[3][4][2]| + \\ &|y[1][0][4] - y[3][0][4]| + \\ &|y[1][1][4] - y[3][1][4]| + \\ &|y[1][2][4] - y[3][2][4]| + \\ &|y[1][3][4] - y[3][3][4]| + \\ &|y[1][4][4] - y[3][4][4]|\end{aligned}$$

When the current field being interpolated is the top-field (i.e., bottom lines are being interpolated), Motion_level_c is calculated from the top lines and Motion_level_o is calculated from the bottom lines. When the current field is the bottom-field, Motion_level_c is calculated from the bottom lines and Motion_level_o is calculated from the top lines.

The output of the motion detector (Motion_level) is calculated as follows;

Motion_level=Motion_level_c+Motion_level_o

Motion_level_c and Motion_level_o are summed up, i.e., Motion_level is calculated from both the top-field and the bottom-field.

The output of the inter-field interpolator for luminance (pixel_inter_ip_y) is calculated by field averaging method, i.e., pixel_inter_ip_y=(y[1][2][2]+y[3][2][2])/2

The output of the intra-field interpolator for luminance (pixel_intra_ip_y) is calculated by line averaging method, i.e., pixel_intra_ip_y=(y[2][2][1]+y[2][2][3])/2

Inter-field and intra-field interpolation processing to calculate hue, e.g., Cb (luminance—blue) and Cr (luminance—red) values for color images are performed in an analogous manner to the processing for luminance.

The luminance output of the blender, i.e., the luminance output of the IP converter is pixel_ip_y.

The blending factor for the blender (intra_fraction), which represents fraction of the output of the intra-field interpolator in the blender output, is generated using the function illustrated in FIG. 14f. "thB" and "thC" are tuning parameters; typical values for "thB" and "thC" could be in the ranges 0 to 16 and 8 to 32, respectively, for 8-bit logic where y[i][j][k] lies in the range 0 to 255.

The outputs of the inter-field and intra-field interpolators are blended as follows;

pixel_ip_y=pixel_inter_ip_y*(100−intra_fraction)/100 +pixel_intra_ip_y*(intra_fraction)/100 where intra_fraction is expressed in percent.

Cb (luminance—blue) and Cr (luminance—red) values for color images are calculated in an analogous manner to the processing for luminance.

Using the conventional IP conversion method and notation described above, pixel sites in several sample images are processed as follows. The parameters of the blender are set as follows;

thB=0 thC=13

Figure 13A:
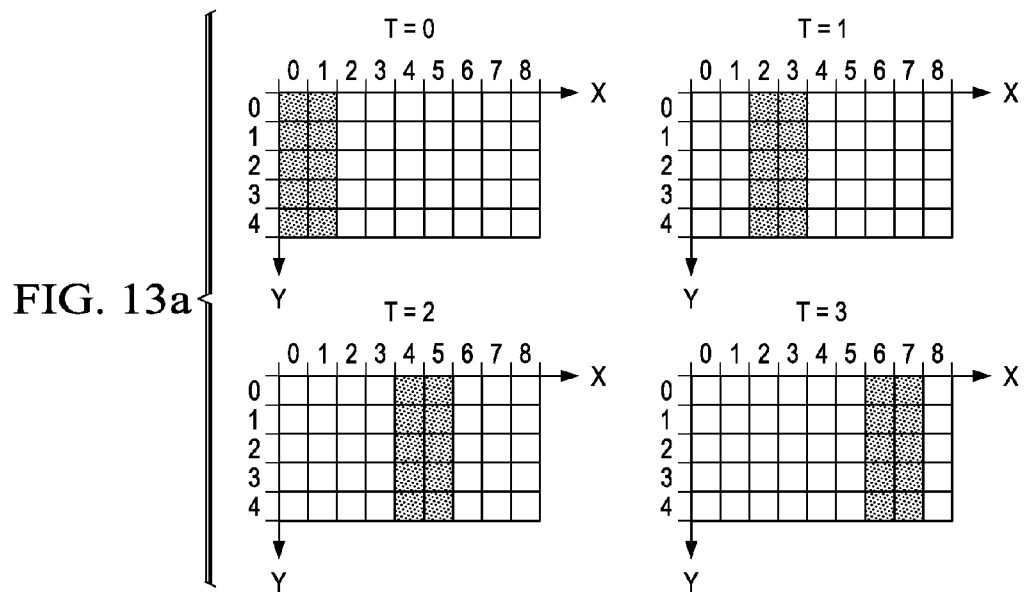
FIGS. 13a-13f are interlace-to-progressive conversion examples.
Figure 13B:
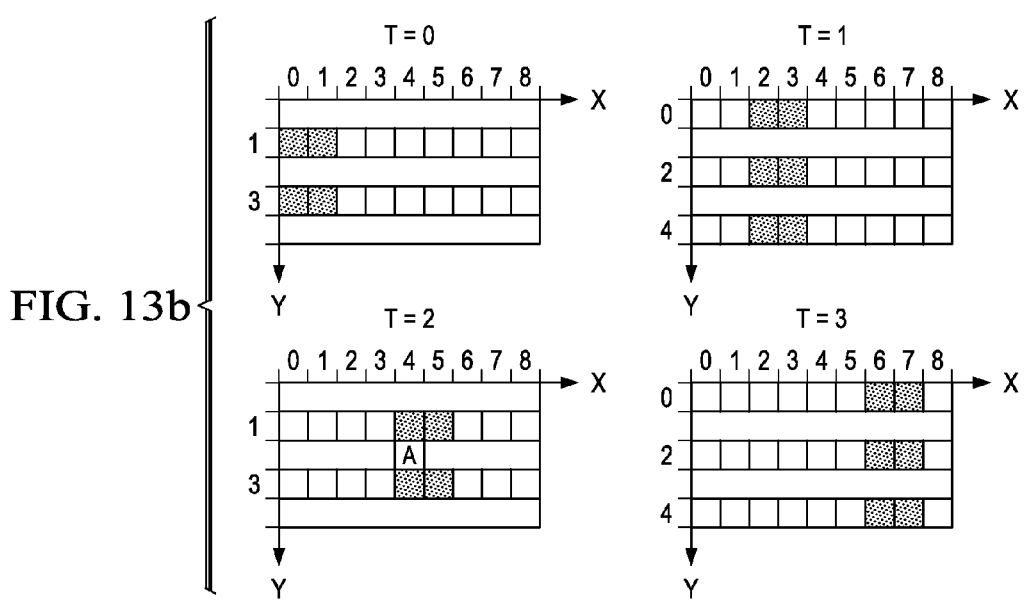

FIG. 13a shows sample image-A in which a black box is moving from the left to the right side. FIG. 13b shows the interlaced sample image-A. Top-fields at t=odd and bottom-fields at t=even. The pixel marked with "A" (pixel-A) is the one being interpolated.

Motion_level=13 pixel_inter_ip_y=1 (white)

pixel_intra_ip_y=0 (black)

intra_fraction=100% pixel_ip_y=0 (black)

The luminance output of the IP converter (pixel_ip_y) is pixel_ip_y) is 0 (black) that matches the original value at the pixel-A, i.e., the IP conversion works well for this case.

Figure 13C:
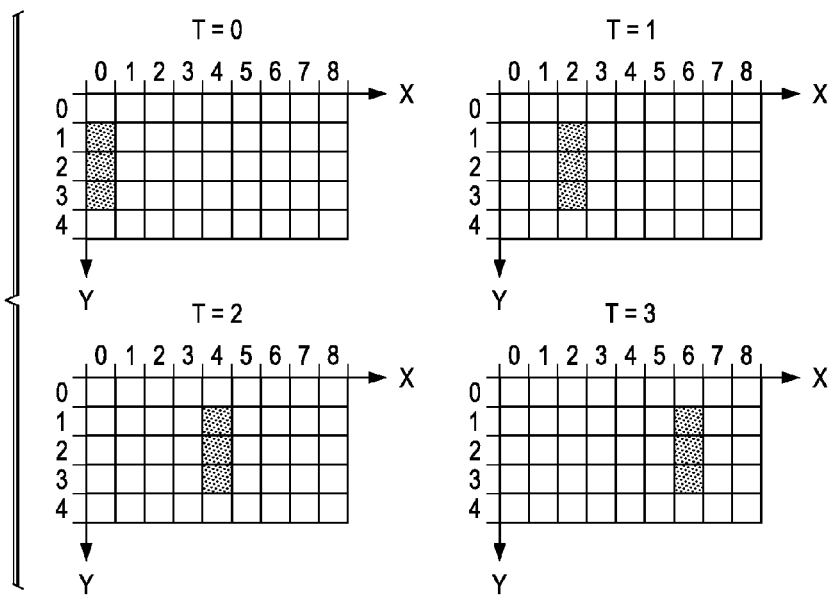
Figure 13D:
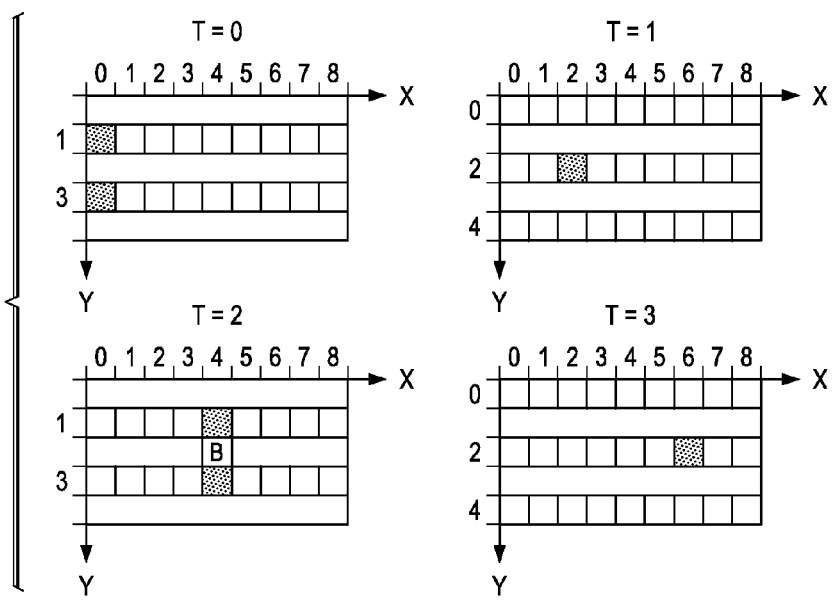

FIG. 13c shows sample image-B in which a black fragment is moving from the left to the right side; and FIG. 13d shows the interlace fields.

Motion_level=4 pixel_inter_ip_y=1 (white)

pixel_intra_ip_y=0 (black)

intra_fraction=31% pixel_ip_y=0.69

The original luminance value of the pixel-B is 0 (black) but pixel_ip_y=0.69, i.e., the IP conversion does not work well in this case.

Figure 13E:
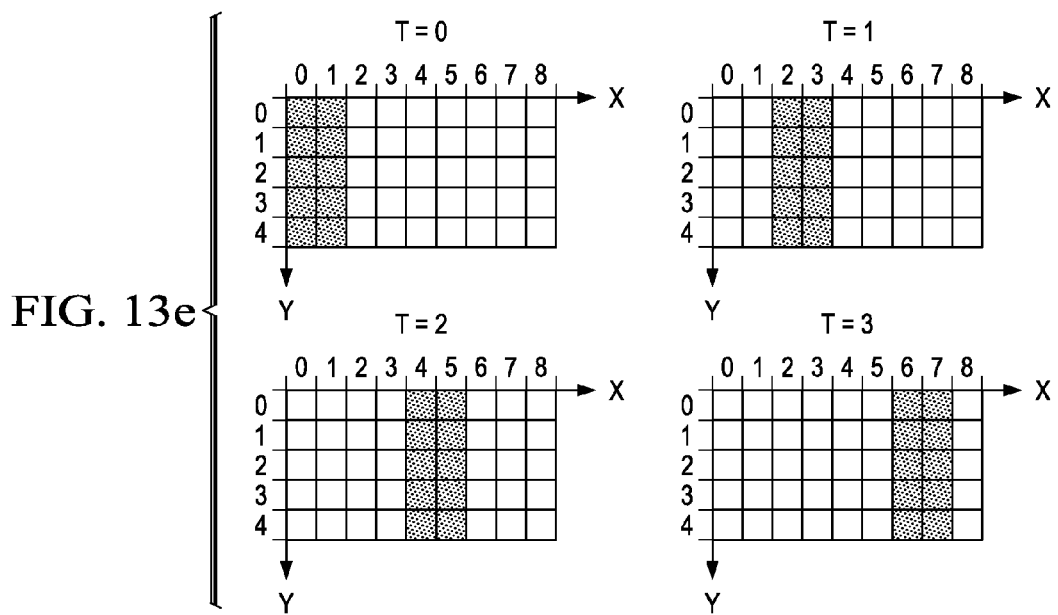
Figure 13F:
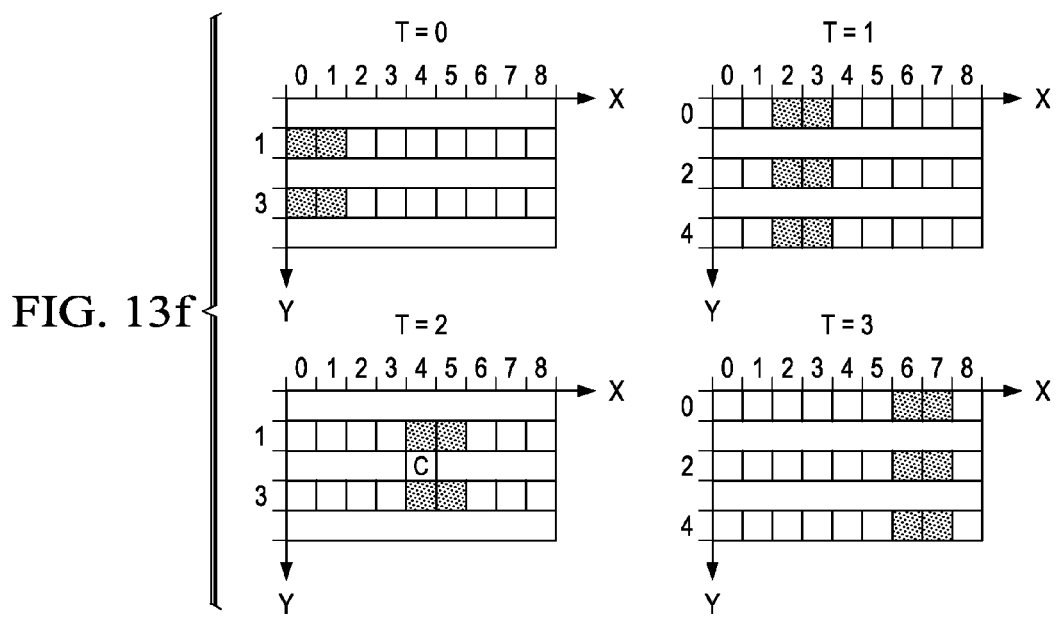

FIG. 13e shows an sample image-C in which a gray fragment is moving from the left to the right side; and FIG. 13f shows the interlace fields.

Motion level =6.5 pixel_inter_ip_y=1 (white)

pixel_intra_ip_y=0.5 (gray)

intra_fraction=50% pixel_ip_y=0.75

The original luminance value of the pixel-B is 0.5 (gray) but pixel_ip_y=0.75 which has about 50% error from the original, i.e., the IP conversion does not work well in this case, either.

As shown above, around a small pixel pattern or a low contrast area, Motion_level detected by the conventional motion detector is not high enough though the target pixel is a part of a moving object and the wrong color is interpolated. If "thB" and "thC" are reduced, intra_fraction becomes 100%, the pixel_intra_y is output, and the interpolation by the wrong color can be avoided. But by the modification, pixel_intra_y that has lower spatial resolution is used at pixel sites having low Motion_level and causes flickering noise at high frequency pattern areas.

6B. Uniformity Blending First Preferred Embodiments

The first preferred embodiments interpolate correct color around a small pixel pattern or a low contrast area plus keep image quality at pixels having low motion levels.

Figure 12A:
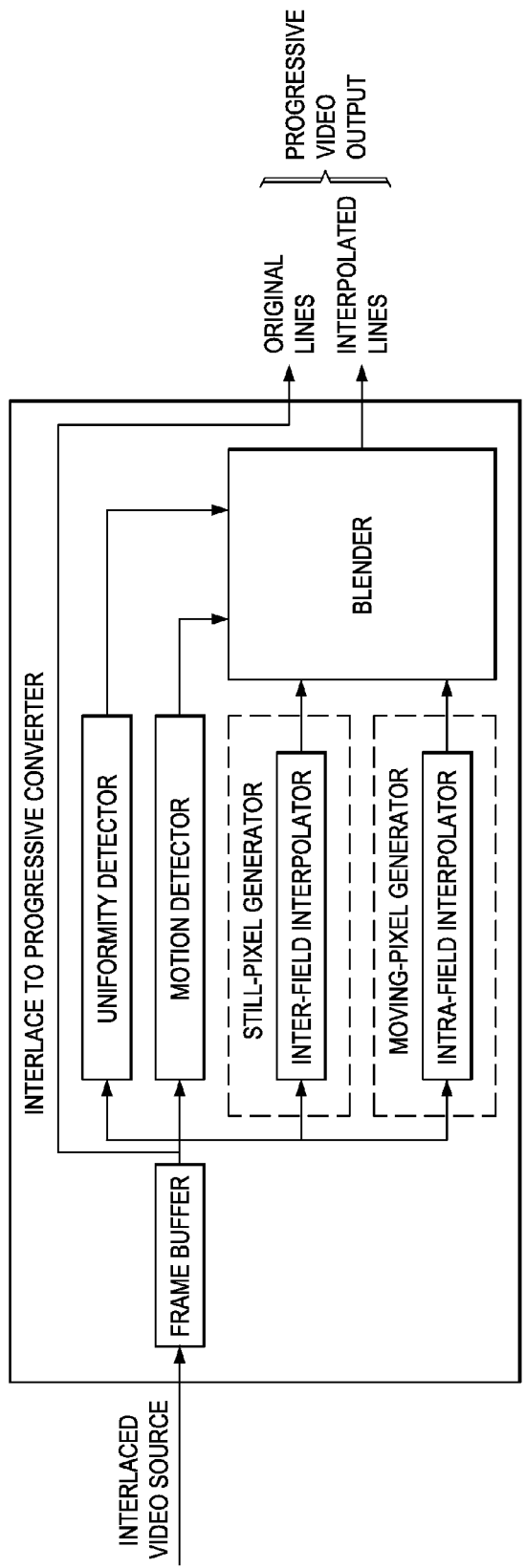
FIGS. 12a-12d illustrate a preferred embodiment interlace-to-progressive converter.

FIG. 12a shows a schematic diagram of the preferred embodiment interlace-to-progressive converter. A uniformity detector is added to the conventional IP converter. The uniformity detector detects uniformity around the target pixel. The output of the detector (intra_diff) is sent to the blender and controls the blending function, i.e., the function to generate intra_fraction.

Figure 12B:
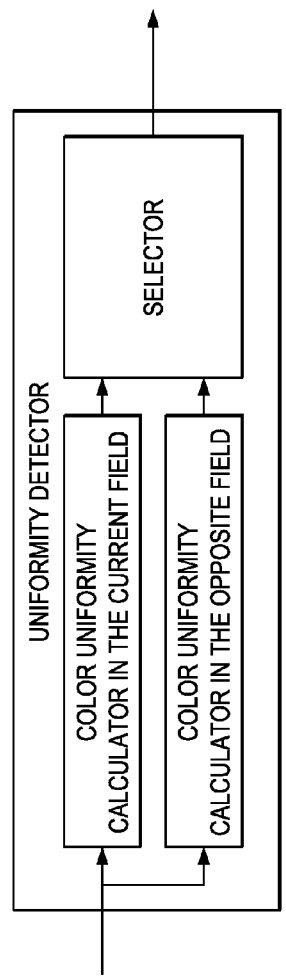

FIG. 12b shows a schematic diagram of the uniformity detector, which consists of the "color uniformity calculator in the current field", "color uniformity calculator in the opposite field" and "selector". The color uniformity calculators detect the variation of color in the area used for the motion detector. The calculation is performed in the current and opposite field, i.e., both top and bottom fields because the motion detector detects motion using the current and opposite fields. The selector selects the outputs of the color uniformity calculator in the current and opposite fields.

Figure 12C:
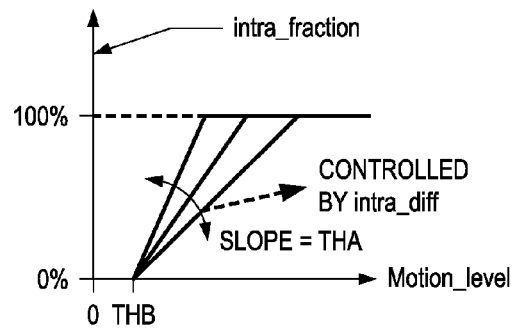

FIG. 12c illustrates how the function to generate intra_fraction works. The slope (thA=100/(thC-thB)) varies (by varying thC) with the output of the uniformity detector intra_diff. When intra_diff is low, i.e., the color of the area is uniform or contrast is low, the slope becomes steep and the blender gets sensitive to Motion_level, i.e., the fraction of the output of the intra-field interpolator becomes higher with smaller Motion_level.

The disadvantage of the present approach is that at still (i.e., Motion_level is low) areas having little pattern or low contrast, the output of the moving-pixel generator tends to be selected instead of that of still-pixel generator. The output of the still-pixel generator has a higher resolution than that of the moving-pixel generator. But at such areas, the resolution difference between the outputs of the two pixel generators is not distinguishable.

The color (luminance) uniformity calculator sums up the differences of color in a field. When there is no edge or the patterns have low contrast in the area used for the motion detection, the output of the uniformity detector (intra_diff) becomes low.

The output of the color uniformity calculator in the opposite field (intra_diff_pre) is calculated as follows;

$$\begin{aligned}\text{intra\_diff\_pre} = &|y[1][2][2] - y[1][0][0]| + \\ &|y[1][2][2] - y[1][1][0]| + \\ &|y[1][2][2] - y[1][2][0]| + \\ &|y[1][2][2] - y[1][3][0]| + \\ &|y[1][2][2] - y[1][4][0]| + \\ &|y[1][2][2] - y[1][0][2]| + \\ &|y[1][2][2] - y[1][1][2]| + \\ &|y[1][2][2] - y[1][3][2]| + \\ &|y[1][2][2] - y[1][4][2]| + \\ &|y[1][2][2] - y[1][0][4]| + \\ &|y[1][2][2] - y[1][1][4]| + \\ &|y[1][2][2] - y[1][2][4]| + \\ &|y[1][2][2] - y[1][3][4]| + \\ &|y[1][2][2] - y[1][4][4]|\end{aligned}$$

The output of the color uniformity calculator in the current field (intra_diff_now) is calculated as follows;

$$\begin{aligned}\text{intra\_diff\_now} = &|y[2][2][1] - y[2][0][1]| + \\ &|y[2][2][1] - y[2][1][1]| + \\ &|y[2][2][1] - y[2][3][1]| + \\ &|y[2][2][1] - y[2][4][1]| + \\ &|y[2][2][1] - y[2][0][3]| + \\ &|y[2][2][1] - y[2][1][3]| + \\ &|y[2][2][1] - y[2][2][3]| + \\ &|y[2][2][1] - y[2][3][3]| + \\ &|y[2][2][1] - y[2][4][3]|\end{aligned}$$

Figure 12D:
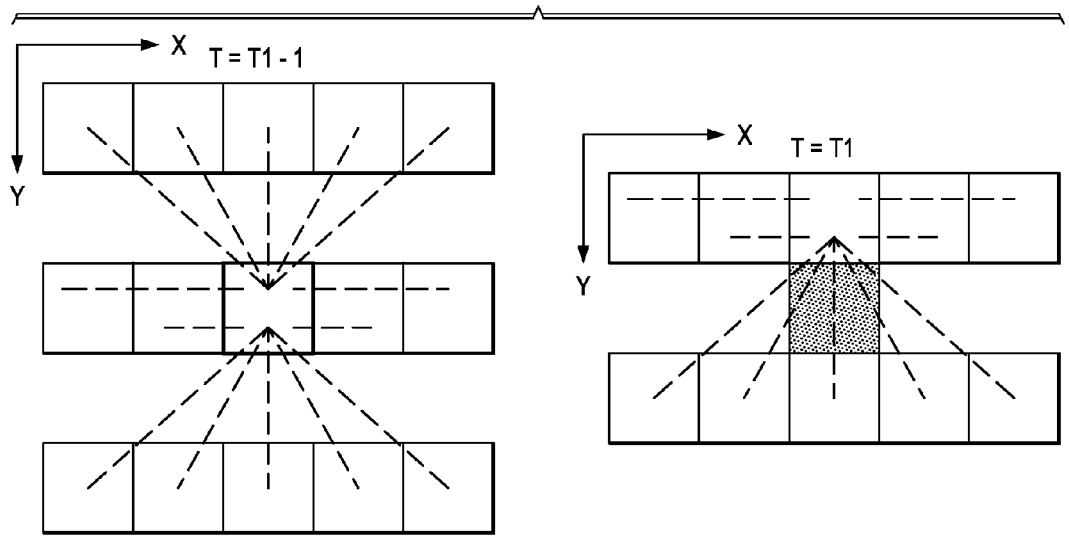

FIG. 12d illustrates the above calculations; the shaded pixel is the target pixel being interpolated and the pixel with bold outline is the same position with the shaded pixel but on the previous field. The dotted lines represent absolute calculation of the difference of two pixel values.

The selector works as follows;

intra_diff_now15=intra_diff_now×1.5 if
   (intra_diff_pre<intra_diff_now15)
   intra_diff=intra_diff_pre else
   intra_diff=intra_diff_now15 intra_diff_now15 is used instead of intra_diff_now because the number of pixels used for t=t1−1 is larger than that for t=t1. The selector selects the smaller output from the two color uniformity calculators, i.e., if intra_diff_pre or intra_diff_now15 is low, the slope of the function to generate intra_diff gets steep.

The blender works as follows;

if (intra_diff≦th1_uniform_area) thA=4*thA0 else if
   (intra_diff≦th2_uniform_area) thA=3*thA0 else
   if (intra_diff≦th3_uniform_area) thA=2*thA0
   else thA=thA0 where th1_uniform_area, th2_uniform_area, and th3_uniform_area are threshold values, th1_uniform_area<th2_uniform_area<th3_uniform_area; and thA0 is the slope when intra_diff is large enough.

When natural images are IP converted, thA0=4, thB=0, th1_uniform_area=4, th2_uniform_area=8, th3_uniform_area=12 work well for 8-bit logic when the maximum value of Motion_level=255, the maximum value of intra_diff=255, and intra_fraction=255 represents 100%.

The thresholds th1_uniform_area=1, th2_uniform_area=2 and th3_uniform_area=3 are used for the sample images. And thA0=100%/13 corresponds to the thC described above. The preferred embodiment works fine for the sample images image-A, image-B, and image-C as shown below.

The calculated value of intra_diff for pixel-A of the sample image-A of FIGS. 13a-13b is 6. The thA does not change from thA0 but this is acceptable because image-A is well IP converted by the conventional method.

The calculated value of intra_diff for pixel-B of the sample image-B of FIGS. 13c-13d is 1.

thA=4×thA0 thC=3.25 intra_fraction=100% pixel_ip_y=0 (black)

pixel_ip_y matches the original color (black).

The calculated value of intra_diff for pixel-C of the sample image-C of FIGS. 13e-13f is 3.

thA=2×thA0 thC=6.5 intra fraction=100% pixel_ip_y=0 (black)

pixel_ip_y matches the original color (black). Thus the preferred embodiment method overcomes the problems of the conventional.

6D. Modifications

The preferred embodiments may be modified in various ways while retaining the feature of adjusting the blending function for the inter and intra interpolation according to a uniformity of the color (luminance) in an area about the target pixel being interpolated.

For example, the thresholds could all be varied; the tuning parameter thB could be varied in a range of −8 to 8; the tuning parameter thA0 could be varied in a range of 2 to 12; the tuning parameter th1_uniform_area cold be varied in a range of 2 to 8; the tuning parameter th2_uniform_area could be varied in a range of 3 to 16; the tuning parameter th3_uniform_area could be varied in a range of 4 to 16; the number of selections for thA determination by intra_diff might be reduced or increased; thA could be changed according to the following function:

if (intra_diff<thM0) thA=thM1; else if
   (thM2<intra_diff) thA=thM3; else thA=(thM3−
   thM1)/(thM2−thM0)*intra_diff+thM1 where typical threshold values for 8-bit data are:

thM0=0 (0 to 8)

thM1=16 (8 to 64)

thM2=12 (4 to 16)

thM3=4 (2 to 32);

the shape of the piecewise-linear curve for intra_fraction could be changed to a non-linear curve; the selector might be removed for simplification and sum up the output of the color uniformity calculators for the current and opposite fields; one of the two color uniformity calculators can be removed for simplification or when more fields than two are used.

7. Further Modifications

One or more of the preferred embodiment features (3-2 pulldown detection, pre-filtering, motion detection with feedback, edge detection with patterns, and blending of moving pixel and still pixel interpolations using uniformity) can be combined into new preferred embodiments.

Further modifications include the tuning parameters for blendingFactor could be varied and the even the shape of the piecewise linear curve could be changed, such as to a non-linear curve; the lines used for pixel patterns could be extended to upper pixels from two lines above the target and lower pixels from two lines below the target; the number of edge directions detected could be increased, such as to 9 with pixel patterns in a 9×2 array; the number of horizontal pixels of the generated patterns could be changed, such as increased from 3 pixels for Dir2-6 to 4 pixels; and so forth

What is claimed is:

1. A method of 3-2 pulldown detection executed by a processor, comprising:
   (a) applying a low pass filter on an input image and computing, via the processor, at least one difference between successive fields of the same parity using the maximum of the absolute pixel differences averaged over a small number of pixels;
   (b) comparing said differences for a sequence of differences for determining repeated fields by utilizing a safety coefficient and excluding still fields from the determination, wherein the safety coefficient is implemented utilizing a multiplication operation;
   (c) when the maximum of two of said differences offset by a predetermined threshold that is less than the minimum of the other of said differences, determining that said input sequence of fields is a 3-2 pulldown sequence.

2. A method of a processor for motion detection in a sequence of fields, comprising:
   (a) for a pixel (x,y) not in a first field, computing a difference between the values of pixels in a neighborhood of (x,y) in the field preceding said first field and the values of corresponding pixels in the field following said first field;
   (b) computing a motion degree for at least one pixel in said first field by combining said difference from (a) with a motion degree for said pixel from a second field, said second field of the same parity as said first field and preceding said first field, wherein said motion detection pre-filters fields about said target pixel and compares differences of filtered pixels in said filtered fields.

3. A method of a processor for interlace-to-progressive conversion, comprising:
(a) providing a still-pixel interpolation and a moving-pixel interpolation for a target pixel to be interpolated utilizing an edge direction angle detection;
(b) blending said still-pixel interpolation and said moving-pixel interpolation with a factor which depends upon both a motion level at and a uniformity about said target pixel, wherein the moving pixel interpolation uses the edge direction angle detection method, comprising:
generating an upper pattern of pixels in a field, said upper pattern including at least three pixels in a line above a pixel to be interpolated;
generating a lower pattern of pixels in said field, said lower pattern including at least three pixels in a line below said pixel to be interpolated;
computing a sum of differences of pixels in said upper pattern and pixels in said lower pattern;
generating a second upper pattern of pixels in a field, said second upper pattern including at least three pixels in a line above said pixel to be interpolated;
generating a second lower pattern of pixels in said field, said second lower pattern including at least three pixels in a line below said pixel to be interpolated;
computing a sum of differences of pixels in said second upper pattern and pixels in said second lower pattern; and
determining an edge direction at said pixel to be interpolated utilizing said sum of differences of pixels in said second upper pattern and pixels in said second lower pattern.

* * * * *